US011842321B1

(12) United States Patent
Zou et al.

(10) Patent No.: US 11,842,321 B1
(45) Date of Patent: Dec. 12, 2023

(54) IMAGE-BASED DETECTION OF PLANOGRAM PRODUCT SPACES

(71) Applicant: Amazon Technologies, Inc., Seattle, WA (US)

(72) Inventors: Chuhang Zou, Seattle, WA (US); Behjat Siddiquie, Seattle, WA (US); Abhay Mittal, Seattle, WA (US); Jean Laurent Guigues, Seattle, WA (US); Chris Broaddus, Sammamish, WA (US)

(73) Assignee: Amazon Technologies, Inc., Seattle, WA (US)

(*) Notice: Subject to any disclaimer, the term of this patent is extended or adjusted under 35 U.S.C. 154(b) by 442 days.

(21) Appl. No.: 17/204,406

(22) Filed: Mar. 17, 2021

(51) Int. Cl.
*G06Q 10/087* (2023.01)
*G06V 20/64* (2022.01)

(52) U.S. Cl.
CPC .......... *G06Q 10/087* (2013.01); *G06V 20/64* (2022.01)

(58) Field of Classification Search
CPC .............................. G06Q 10/087; G06V 20/64
See application file for complete search history.

(56) References Cited

U.S. PATENT DOCUMENTS

| | | | |
|---|---|---|---|
| 7,460,730 B2 * | 12/2008 | Pal | H04N 23/698 382/284 |
| 9,117,106 B2 | 8/2015 | Dedeoglu et al. | |
| 9,235,928 B2 | 1/2016 | Medioni et al. | |
| 9,317,775 B2 * | 4/2016 | Moraleda | G06F 18/2178 |
| 9,473,747 B2 | 10/2016 | Kobres et al. | |
| 9,594,980 B1 * | 3/2017 | Graham | A61B 8/5253 |
| 10,127,438 B1 | 11/2018 | Fisher et al. | |
| 10,133,933 B1 | 11/2018 | Fisher et al. | |
| 10,387,996 B2 * | 8/2019 | Cohen | G06T 3/0006 |
| 10,438,165 B2 * | 10/2019 | Findlay | G06Q 10/087 |
| 10,565,548 B2 * | 2/2020 | Skaff | G06F 18/24 |
| 10,863,105 B1 * | 12/2020 | Rosengaus | G06F 18/22 |
| 11,093,785 B1 * | 8/2021 | Siddiquie | G06V 20/52 |
| 11,481,746 B2 * | 10/2022 | Wu | G06Q 10/087 |
| 2009/0059270 A1 * | 3/2009 | Opalach | G06V 20/64 358/1.15 |
| 2013/0033568 A1 * | 2/2013 | Kim | H04N 23/698 348/36 |
| 2013/0284806 A1 | 10/2013 | Margalit | |
| 2014/0324642 A1 * | 10/2014 | Winkel | G06Q 10/087 705/28 |

(Continued)

OTHER PUBLICATIONS

Melek, Ceren Gulra, Elena Battini Sonmez, and Songul Albayrak. "A survey of product recognition in shelf images." 2017 International Conference on Computer Science and Engineering (UBMK). IEEE, 2017. (Year: 2017).*

(Continued)

*Primary Examiner* — Nathan A Mitchell
(74) *Attorney, Agent, or Firm* — Lee & Hayes P.C.

(57) ABSTRACT

This disclosure describes techniques for determining product volumes associated with products in a facility. These product volumes may be used to update planogram data associated with a facility, with the planogram data indicating inventory locations within the facility for various types of items supported by product fixtures. The planogram data may be used, in some instances, to update virtual carts of users interacting with the items in the facility.

20 Claims, 32 Drawing Sheets

(56) References Cited

U.S. PATENT DOCUMENTS

| | | | | |
|---|---|---|---|---|
| 2015/0193909 | A1* | 7/2015 | Maayan | G06T 3/20 |
| | | | | 345/648 |
| 2016/0171707 | A1* | 6/2016 | Schwartz | G06F 18/22 |
| | | | | 382/180 |
| 2016/0180533 | A1* | 6/2016 | Pavani | G06T 7/74 |
| | | | | 382/103 |
| 2016/0224857 | A1* | 8/2016 | Zhang | G06F 18/253 |
| 2016/0342863 | A1* | 11/2016 | Kwon | G06V 10/454 |
| 2016/0371634 | A1* | 12/2016 | Kumar | G06V 10/462 |
| 2017/0147900 | A1* | 5/2017 | Booth | G06T 7/136 |
| 2017/0178227 | A1* | 6/2017 | Graham | G06Q 30/0643 |
| 2017/0178310 | A1* | 6/2017 | Gormish | G06T 7/30 |
| 2017/0178372 | A1* | 6/2017 | Gormish | G06T 11/60 |
| 2017/0286901 | A1* | 10/2017 | Skaff | G06Q 10/087 |
| 2018/0005176 | A1* | 1/2018 | Williams | G06Q 10/087 |
| 2018/0107999 | A1* | 4/2018 | Rizzolo | H04W 4/30 |
| 2018/0260767 | A1* | 9/2018 | Findlay | G06Q 10/087 |
| 2019/0102686 | A1* | 4/2019 | Yang | G06N 5/04 |
| 2019/0149725 | A1* | 5/2019 | Adato | H04N 1/00 |
| | | | | 348/158 |
| 2020/0005225 | A1* | 1/2020 | Chaubard | H04N 23/57 |
| 2020/0286032 | A1* | 9/2020 | Bogolea | H04N 23/698 |
| 2020/0293992 | A1* | 9/2020 | Bogolea | G06T 7/74 |
| 2020/0339354 | A1* | 10/2020 | Soto Arriaza | B65G 1/1375 |
| 2021/0012272 | A1* | 1/2021 | Dugar | G06T 7/0008 |
| 2021/0073574 | A1* | 3/2021 | Yoruk | G06T 7/74 |
| 2021/0409648 | A1* | 12/2021 | Kallakuri | G06N 20/20 |
| 2022/0051179 | A1* | 2/2022 | Savvides | G06F 16/583 |
| 2022/0075907 | A1* | 3/2022 | Vellasques | G06V 20/10 |
| 2022/0083959 | A1* | 3/2022 | Skaff | G06T 7/70 |
| 2022/0284384 | A1* | 9/2022 | Chaubard | G06V 20/52 |
| 2022/0335726 | A1* | 10/2022 | Paverman Kashani | |
| | | | | G06V 10/22 |
| 2022/0415012 | A1* | 12/2022 | Karmakar | G06T 7/73 |

OTHER PUBLICATIONS

Kejriwal, Nishant, Sourav Garg, and Swagat Kumar. "Product counting using images with application to robot-based retail stock assessment." 2015 IEEE international conference on technologies for practical robot applications (TePRA). IEEE, 2015. (Year: 2015).*

Rosado, Luís, et al. "Supervised learning for Out-of-Stock detection in panoramas of retail shelves." 2016 IEEE International Conference on Imaging Systems and Techniques (IST). IEEE, 2016. (Year: 2016).*

Selvam, Prabu, and Joseph Abraham Sundar Koilraj. "A deep learning framework for grocery product detection and recognition." Food Analytical Methods 15.12 (2022): 3498-3522. (Year: 2022).*

* cited by examiner

IMAGE-BASED DETECTION OF PLANOGRAM PRODUCT SPACES

BACKGROUND

Retailers, wholesalers, and other product distributors often manage physical stores that utilize cashiers or dedicated self-checkout stands to finalize transactions with customers. During these traditional checkout processes, customers may have to carry and use physical objects for payment or identification, such a credit card or debit card, a driver's license, a phone, and so forth. In the future, physical stores may utilize several types of sensors to allow users to acquire and pay for items without cashiers or dedicated self-checkout stands. For example, cameras and/or other sensors may be used to detect when a customer picks product items from shelves and to automatically charge an account of the customer when the customer leaves the store. In store such as this, as well as traditional physical stores, it may be desirable to have a planogram of the store indicating the locations of products within the store.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
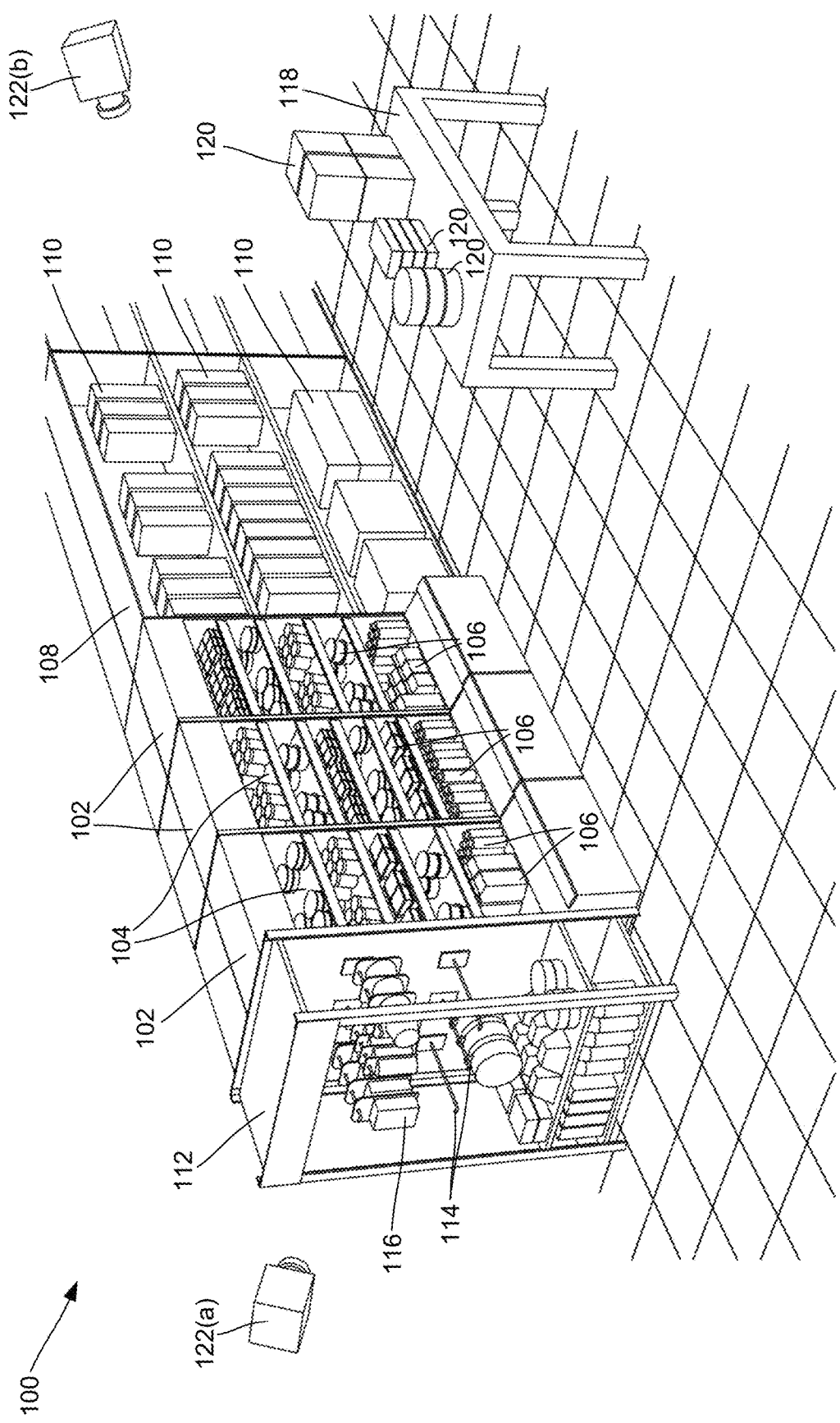
FIG. 1 illustrates an example environment in which cameras produce image data of various product fixtures. This image data may be analyzed to identify product volumes—or portions within the environment that are associated with respective products offered within the environment. After identifying these product volumes, planogram data may be generated and used to update virtual carts of users that acquire items within these product volumes.

Described herein are techniques for creating and maintaining a planogram of a facility. A planogram is a data structure that indicates locations in a facility of product items that are held by different fixtures such as racks, shelves, hooks, counters, etc. Specifically, the planogram indicates the locations of multiple different products as well as which product will be found at any given location.

As an example, envision a facility that includes numerous aisles and fixtures for holding arrays of different product items for acquisition. Fixtures may be of various types, and may include, as examples, shelves, counters, hooks, cases, racks, kiosks, stands, easels, bins, table tops, and other types of supports and holders. Some fixtures, such as refrigerated fixtures, may have glass or other transparent doors. Typically, a fixture supports groups of products, where each group has multiple instances of a given product. As an example, multiple candy bars of a particular brand and flavor may be held by a hook. As another example, a shelf may have lanes that extend rearward, where each lane holds multiple cans of a particular brand and flavor of soft drink. In some cases, a number of contiguous locations, such as adjacent hooks or lanes, may contain instances of the same product. For example, three adjacent lanes of a shelf may hold a particular brand and type of milk.

In embodiments described herein, a planogram specifies coordinates of a product space that contains a group of instances of a single product. For example, such a product space might comprise an area of a countertop or shelf having multiple instances of a particular product. As another example, a product space might comprise a shelf lane that has multiple instances of a particular product. As another example, a product space might comprise a number of adjacent or otherwise contiguous shelf lanes that hold the same product. As yet another example, a product space might correspond to multiple instances of a particular product that are held on a hook or on a number of adjacent hooks.

In some embodiments, a planogram may specify a product space using three-dimensional (3D) coordinates relative to a facility within which the products are located. For example, 3D coordinates of one or more points corresponding to a product area or volume might be specified. In some embodiments, a product space may be specified as 3D coordinates of multiple points that define an area or volume that contain a product group. In some cases, a product space may correspond to an organizational unit of a fixture, such as a lane or set of adjacent lanes, even though one or more of the lanes may have empty space. For example, the product volume may extend to the rear of the shelf, even though product instances do not extend to the rear of the shelf.

In order to determine coordinates of product spaces within a store or other facility, cameras are positioned at multiple locations in the store so that each product group is within the field of view of at least one camera. Images of the entire store may be captured at any time and analyzed to identify product groups, to identify the products of the product groups, and to determine physical coordinates of product spaces corresponding to the product groups.

A process of identifying product spaces within a facility may include segmenting camera images to identify image segments corresponding to visible portions of respective product groups. For each identified image segment, corresponding image data may be analyzed to determine the physical coordinates of visible surfaces of the corresponding product group.

In some cases, coordinates of a product group represented by an image segment may be determined based on depth information provided by a 3D camera such as a time-of-flight camera. In these cases, 3D coordinates of any image point may be determined based on its X-Y coordinates within the image in combination with the corresponding depth, assuming knowledge of camera characteristics such as position, orientation, and focal length.

Physical coordinates of a product group may also be determined by comparing two or more image segments, corresponding to the same product group, that has been obtained from different cameras. For matching points of two such image segments, triangulation can be performed to determine three-dimensional coordinates of the surface point represented by the matching points, based on the X-Y coordinates of the points within the images and the known orientations, positions, and optical characteristics of the cameras.

Having identified physical coordinates of visible surfaces of a product group, further processing may be performed to estimate a corresponding product volume. In some embodiments, a front-facing or outward-facing portion of the visible surface of a product group may be identified and the product volume may be defined as extending rearward from that surface. For a product group on a shelf, for example, the corresponding product volume may be assumed to extend rearward from front-facing surfaces of the visible instances of the product group.

In some embodiments, store-wide analysis of camera images may be performed to identify planes formed by the visible portions of product instances held by different types of fixtures, and product volumes may be assumed to extend from those planes. For example, an analysis such as this may identify a vertical plane that is generally formed by the faces of product instances held by a row of shelf fixtures. For a product group in that row of shelf fixtures, the front of the corresponding product volume can be assumed to be at the identified plane and the product volume is assumed to extend orthogonally rearward from there. As another example, the store-wide analysis may identify a horizontal plane that is generally formed by the visible surfaces of product instances supported on a counter or other horizontal surface. For a product group on such a horizontal surface, the front of the corresponding product volume can be assumed to be at the identified horizontal plane and the product volume is assumed to extend orthogonally downward from the identified horizontal plane.

Camera images may be analyzed using object recognition techniques to obtain product identifications of the products held by each product space. Upon identifying a product space, planogram data is updated to indicate the product held by that product space and the three-dimensional coordinates of the product space. For example, planogram data may be updated to reflect the product space coordinates of a new location of a product and/or to reflect that a different product has been placed in a particular product space.

The techniques described herein allow product spaces to be identified and updated without human involvement. Based on this, a planogram can be created and updated to reflect the position, area, and/or volume occupied by any recognized product.

In some embodiments, a planogram may be updated using this process every morning before a store opens to obtain accurate planogram data for the entire store. The process may also be performed multiple times throughout a day, even while the store is open for business. In some cases, the process may be performed in response to detected events, such as when products are moved from one location to another or when store personnel indicate that a planogram update is needed.

Planogram data may be used for inventory, for directing customers to product locations, and/or for other management functions. In automated-checkout stores, where sensors are used to detect when customers pick product items from shelves, planogram data may be used to identify the product items that are being picked by a customer so that a virtual shopping cart of that customer may be updated to indicate the purchase of the product items.

In some instances, described below, a product-volume detection component of a system may perform some or all of the processes for determining products spaces (or product volumes). The product-volume detection component may receive, as inputs, at least fixture-volume data, merchandising-volume data, and calibration data indicating the correlation between cameras in the environment, such as their location and orientation relative to one another. The fixture-volume data may represent 3D coordinates of the different fixtures in the environment, such as the different racks, hooks, tables, and the like. The merchandising-volume data may represent 3D coordinates of the where the products are configured to reside on or adjacent to these fixtures, such as space within racks, adjacent and outwards to hooks, and so forth. In some instances, the fixture-volume data and merchandising data may be determined by analyzing image data of the environment, while in other instances this data may be manually determined and stored as input for the product-volume detection component.

Upon receiving these inputs, the product-volume detection component may be configured to determine the product volumes within the environment. To begin, the product-volume detection component may receive image data and analyze the image data to determines segments of the image data corresponding to a single group of products. That is, the product-volume detection component may determine a segment of the image data that corresponds to multiple adjacent instances of a common product. Coordinates of these segment may be stored as a "product mask" for a particular product. In some instances, a rack may include multiple shelves, which in turn may include multiple adjacent lanes of products. In some instances, the product-volume detection component may be determined to identify a product mask within each lane of each shelf.

In some instances, the product-volume detection component may receive at least first image data from a first camera in an environment having a field-of-view (FOV) towards a particular fixture, as well as second image data from a second camera in the environment having an FOV towards the fixture. The product-volume detection component may analyze the first image data to identify first product masks and second image data to identify second product masks and may then compute correspondences between these respective masks (or "segments"). For instance, and as described below, the product-volume detection component may determine respective epipolar lines and may identify which masks from the first image data reside on the same epipolar line as masks from the second image data. The product-volume detection component may then use computer-vision algorithms to compare feature data of the product masks along the same epipolar lines to determine which masks correspond to one another. The product-volume detection component may then store data representing these pairwise correspondences.

In addition to determining pairwise correspondences between respective product masks, the product-volume detection component may determine whether certain groups of products on a fixture belong to a common 3D group. That is, the product-volume detection component may use techniques described herein to determine whether products associated with different product masks should be grouped together for purposes of determining a location or orientation of the product volumes ultimately determined for these products. A group of 3D products may represent groups of products that rest on a same shelf or hang from a common hook or horizontal line of hooks. For instance, the product-volume detection component may identify groups of products having respective bottom-surface coordinates (e.g., in the case of shelves) or top-surface coordinates (e.g., in the case of hooks) that are within a threshold value from one another and, thus, should be grouped together. For instance, the techniques may determine that a first product group is associated with a first bottom point and that a second product group is associated with a second bottom point that is within a threshold value of the first bottom point and, thus, that the first and second product groups should be stored as part of a common 3D product group.

In order to determine these 3D product groups, the product-volume detection component may use the indication of the pairwise correspondence between a first product mask from first image data a second product mask from second image data to compute a convex hull of the product masks. Thereafter, the product-volume detection component may determine a convex visual hull of the convex hull by casting rays from a perspective of each camera towards the product(s). That is, a viewing cone from the perspective of each camera having a view of the product(s) may be defined towards the product(s), with the intersection of these viewing cones defining a convex visual hull of the product(s). The convex visual hull may represent a smallest set of coordinates that encapsulates the product(s) from the collective perspectives of the cameras.

In some instances, however, an environment may include cameras mounted to a ceiling and, thus, the generated image data may generally not include or represent a bottom surface of the products on the fixtures. Thus, after computing the convex visual hull of one or more products, the coordinates associated with the bottom surface may still be unknown. The product-volume detection component may then determine those faces of the convex visual hulls that are visible, compute the visible vertices, and estimate a bottom surface, face or point of the convex visual hull. In some instances, the product-volume detection component will determine whether at least a portion of a bottom curve of a convex visual hull is in view of at least two cameras and, if so, the minimum "z" value of the vertices of this visible face may provide an estimate of the lowest point of the product(s). If that is not the case, however, the product-volume detection component may estimate this lowest point, which may result in an overestimation (i.e., a lower estimated bottom point than an actual bottom point of the product(s)). Of course, while this example describes determining a minimum "z" value for products on a shelf-based fixture, the product-volume detection component may determine a maximum "z" value for products hanging from a hook-based fixture.

At this point, the product-volume detection component may store a 3D volume of a convex visual hull and a minimum "z" value. The product-volume detection component may then compute a maximum "z" value as a maximum "z" value of the vertices of the convex visual hull. The product-volume detection component may then build a product adjacency graph, indicating that two convex visual hulls are neighbors within the graph if: (i) these hulls overlap sufficiently in their respective "z" values (e.g., $\min(z_{max}(A), z_{max}(B))-\min z_{min}(A), z_{min}(B))$>overlap threshold, where A and B are respective convex visual hulls), and (ii) the distance (e.g., in 2D) between the two visual hulls are less than a distance threshold.

After determining the product adjacency graph, the product-volume detection component may perform clustering techniques on this graph to determine the 3D product groups. For instance, and as described in detail below, the product-volume detection component may operate on the product adjacency graph to identify clusters of convex visual hulls that are determined to likely be situated on a common bottom surface (in the case of shelf-based fixtures) or at a generally common top coordinate (in the case of hook-based fixtures). The indications of these 3D product groups may then be stored for later use, as described below.

After, before, or while determining the 3D product groups, the product-volume detection component may perform product-space modeling. This process may include: (i) performing single-view product space modeling, (ii) performing multi-view 3D triangulation (potentially using the 3D groups as input), (iii) performing multi-view 3D merging, (iv) performing product-volume refinement, (v) performing multi-view rotation refinement, and (vi) performing 3D post-processing.

Performing single-view product space modeling may first include determining, for each of multiple product masks that have been determined to correspond to one another, a 2D projection of a 3D bounding box of the product mask. To do so, the product-volume detection component may first determine a merchandising volume associated with a fixture on which the product(s) associated with the product mask reside and may cast six rays from the three directions defined by the merchandising volume. That is, the merchandising volume may define a cuboid whose faces define X-Y-Z directions. The product-volume detection component may cast, in 2D, two rays in a direction determined from each of the respective three directions to determine a respective vanishing point at which the two rays intersect. This may result in three vanishing points.

Thereafter, the product-volume detection component may cast two rays from these respective vanishing points as tangent lines to the product mask that resides within the product volume. The intersection of these six tangent lines may define a contour representing the respective 2D projection of the 3D bounding box. After determining this 2D projection, the product-volume detection component may also cast a ray from each respective vanishing point to a point that is within the contour defining the 2D projection and at which each of these three rays intersect with one another. This point, along with three points from the determined contour, may be used to define a particular face of a bounding box generated from the 2D projection, such as a top face or a bottom face. This face and the 2D projection of the 3D bounding box may be used to generate a bounding box that generally encapsulates the products associated with the product mask.

After performing this single-view product-space modeling for each representation of the product mask (each determined from a respective viewpoint of a camera), the product-volume detection component may perform multi-view 3D triangulation. This operation may first include determining a predefined point on each of the resulting bounding boxes. For instance, if the bounding boxes represent products residing on a shelf, the predefined point may represent a point that is on the front face of the bounding box and is at the bottom of the front face in the Y direction and is centered on the front face in the X direction. For products residing on a hook, the predefined point may comprise a point that is on the front face, at a top of the front face in the Y direction, and centered on the front face in the X direction. For products on a table, this predefined point may comprise a point that is on a top face, at a front of the top face in the Y direction, and centered on the top face in the X direction. Of course, while a few examples are described, any other predefined point may be used.

After determining the predefined point in each bounding box, the product-volume detection component may determine a value of a triangulated point using the respective values of these predefined points. For instance, the value of the triangulated point may comprise an average of the respective values (in X-Y-Z) of the predefined points of the bounding boxes.

Thereafter, the product-volume detection component may perform multi-view 3D merging, which may comprise aligning the bounding boxes of the product mask about the triangulated point and then determining a bounding box that encapsulates each of these aligned bounding boxes. That is, the product-volume detection component may determine a cuboid that most tightly encapsulates each of the "n" number of bounding boxes aligned about the triangulated point. The product-volume detection component may then store an indication of this bounding box (e.g., by storing the X-Y-Z coordinates of the bounding box).

Thereafter, the product-volume detection component may perform product-volume refinement to obtain an even tighter bounding box that encapsulates the products associated with the determined product masks. For instance, the product-volume detection component may alter coordinates associated with each of the six faces of the determined bounding box to determine whether these faces can be altered without overlapping the product mask of the product(s) associated with the bounding box. For instance, the product-volume detection component may project the bounding box determined as part of multi-view merging on each image data from which the product mask was determined. For instance, if first image data generated by a first camera was used to determine a first product mask and second image data generated by a second camera was used to determine a second product mask, the product-volume detection component may project the bounding box onto the first and second image data. The product-volume detection component may then determine whether a face of the current bounding box already overlaps a product mask in one or both of the first and second image data. If so, then the product-volume detection component may move the face outwards until the face no longer overlaps the mask in either image data. That is, the product-volume detection component may stop movement of the face as soon as the face does not overlap the product mask in any view.

If, however, the initial bounding box does not overlap the product mask in any view, then the product-volume detection component may move the face inwards in each view until the face touches the product mask in any view. The product-volume detection component may then perform this process for each of the six faces of the bounding box to determine a refined bounding box that comprises a cuboid that most tightly encloses the product masks in each view. As will be appreciated, determining this bounding box may comprise storing an indication of 3D coordinates of the bounding box. Further, moving a face of the bounding box may comprise altering 3D coordinates of a plane of the bounding box corresponding to the current face being analyzed.

In some instances, the products on the fixture may reside on a shelf at a known platform. For instance, the platform may include a sensor (e.g., a load cell) that is associated with a known angle or plane in the environment. In these instances, the product-volume detection component may perform multi-view rotation refinement by performing the afore-mentioned rotation refinement after rotating the bounding box determined via multi-view 3D merging. In some instances, multi-view rotation refinement may generate a bounding box that even more tightly encapsulates the product(s).

Finally, the product-volume detection component may perform one or more 3D post-processing techniques before storing the bounding box, and other bounding boxes associated with other product(s), as the planogram data. For instance, the product-volume detection component may use the determined 3D product groups to identify those bounding boxes associated with a common group. After doing so, the product-volume detection component may use determine a bottom (for shelf-based fixtures) or top (for hook-based fixtures) plane upon which these bounding boxes should be aligned. For instance, the product-volume detection component may determine that three bounding boxes are associated with a common group and that these products reside on a shelf. The product-volume detection component may then determine a median bottom plane by averaging the values of the bottom planes of the three bounding boxes and may set align these three bounding boxes along this median plane. In other instances, meanwhile, the product-volume detection component may determine a bottom plane of these three example bounding boxes by determining coordinates associated with a sensor that resides in the platform upon which the corresponding products reside.

In addition, the operation of 3D post-processing may include altering coordinates of the bounding box(es) to extend to a back surface of the merchandising volume within which the bounding boxes reside. For instance, if a particular refined bounding box ends before the back surface of the merchandising volume, or extends beyond the back surface of the merchandising volume, the coordinates of the back surface of the bounding box may be altered to correspond to the coordinates of the back surface of the merchandising volume.

In addition, the 3D post-processing may include altering front faces of one or more bounding boxes similar to the altering of the back or bottom faces of these bounding boxes. For instance, the 3D post-processing may determine a median value of the front faces of the bounding boxes of a particular 3D group and may assign this median value as coordinates of the front face of each of the bounding boxes. In another example, the product-volume-detection component may alter (e.g., extend or retract) the value of each front face of the bounding boxes to correspond to the front face of the merchandising volume.

In addition, the 3D post-processing step may include generating bounding boxes for empty spaces in the merchandising volume having a threshold size or expanding existing bounding boxes when the empty spaces are not of the threshold size. For instance, if a first bounding box associated with first product(s) is adjacent (e.g., bottom- or top-surface aligned) to a second bounding box associated with second product(s), the product-volume detection component may determine whether a distance between these bounding boxes is greater than a threshold distance. If not, then the product-volume detection component may alter one or both of the first and second bounding boxes to include this empty space. That is, the product-volume detection component may change the coordinates of one or both of the side faces of the bounding boxes that face the empty space so as to "stretch" these bounding boxes to include the empty space. If, however, the distance between the first and second bounding boxes is greater than the threshold distance, than the product-volume detection component may generate a new bounding box corresponding to the empty space. For instance, the created bounding box may be defined by coordinates corresponding to side faces that touch the side faces of the first and second bounding boxes, a bottom and front face that corresponds, respectively, to the aligned bottom and front faces of the first and second bounding boxes, a top face that is based on one or both of the first or second bounding boxes (and/or the merchandising volume), and a back face that is defined by the back surfaces of the merchandising volume.

Although certain techniques are described herein in the context of a retail store or other materials handling facility, the techniques are generally applicable to any other environment. Other examples may include inventory management systems, automating the intake of new shipments of item inventory, libraries for processing returned books and/or identifying books obtained by a user during a library session, video-rental facilities for processing and sorting returned movies, and so forth.

The facility described herein may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of materials (inventory) handling. In other implementations, the techniques described herein may be implemented in other facilities or situations.

Certain implementations and embodiments of the disclosure will now be described more fully with reference to the accompanying figures, in which various aspects are shown. However, the various aspects may be implemented in many different forms and should not be construed as limited to the implementations set forth herein. The disclosure encompasses variations of the embodiments, as described herein.

FIG. 1 illustrates an example environment 100 in which the described techniques may be performed. The environment 100 might be part of a physical store, for example, that has multiple fixtures holding product instances to be picked up and taken by a customer or other person. In some embodiments, the environment 100 may be part of an automated checkout store. The described techniques may also be used in other situations and facilities.

FIG. 1 shows examples of different types of store fixtures that may be used within a facility to hold product instances. In this example, the fixtures are positioned end-to-end, in an arrangement that might be found in a grocery store, for example, where the fixtures might be lined up along one side of an aisle or along a wall.

The fixtures include several shelf fixtures 102 having multiple shelves 104 upon which products may be placed. The shelves are used to support product instances, several of which have been designated in FIG. 1 by the reference numeral 106. In this example, the product instances 106 are arranged in single file lanes that extend from the front of the shelves 104 to the rear of the shelves 104. Each lane is defined by a depthwise column of product instances.

The fixtures also include a shelf fixture 108 in which product groups extend sideways on shelves, rather than extending rearward. In some cases, product instances may also be stacked vertically on a shelf. In this example, the stack fixture 108 supports product packages 110 such as boxes or cases of soda, as examples.

The fixtures further include a hook fixture 112, which is positioned as an endcap relative to the shelf fixtures 102 and 108. The hook fixture 112 has an array of multiple hooks or rods 114 upon which product instances 116 may be hung. Each hook 114 may support a number of product instances 116. Each hook 114 typically contains instances of a single product.

The fixtures further include a table fixture 118 having an upper surface or counter upon which stacks 120 of product instances may be placed. In this example, each stack 120 has instances of a single product.

FIG. 1 shows a first camera 122(a) and a second camera 122(b), which are representative of multiple cameras (referred to collectively as cameras 122) are positioned throughout the store and oriented to capture and provide images of the various fixtures and the product instances supported or held by the fixtures. For example, the facility may include overhead cameras, in-shelf cameras, or other cameras. In some embodiments, it may be desirable for the cameras 122 to be above the fixtures so that tops of the product instances are visible to the cameras. Cameras may also be positioned at lower heights for better views of the front horizontal surfaces of product instances. In some embodiments, cameras might be distributed throughout the facility so that every fixture is within the field of view of at least one of the cameras 122. In some embodiments, each product instance may be within the field of view of at least two of the cameras 122 so that triangulation can be used to determine physical coordinates of surfaces that are visible to the cameras.

In the embodiment of FIG. 1, the cameras 122 are configured to capture still images of the fixtures and to provide the still images to one or more computer systems for processing. The computer systems may use the images for performing tasks related to inventory, checkout, payroll, time scheduling, and/or other aspects of store management. In addition, the computer systems may use the images to create and maintain a planogram that indicates the locations of different products and/or product spaces within the store.

A planogram associated with a store may associate a particular product with a location at which instances of the product are located. The location may be specified and referred to as a product space or item space, which may correspond to an area or volume within which a group of products or other items having the same product or item identification are contained. A product space may be specified as a set of three-dimensional (3D) coordinates, such as 3D coordinates defining a cuboidal-shaped bounding box. As described above, instances within a product space may be supported by any of various types of fixtures, including shelves, counters, hooks, cases, racks, kiosks, stands, easels, bins, tabletops, and other types of supports and holders. A product space might correspond to a shelf lane, multiple adjacent shelf lanes, a horizontal row of product instances, a vertical stack of product instances, multiple adjacent vertical stacks of product instances, a line of product instances supported by a hook, multiple lines of product instances supported by adjacent hooks, etc.

In an automated checkout environment, a planogram may be used to identify products that a customer is picking up. In other environments, planograms may be used as a reference for store personnel and/or customers. For example, store personnel may use a planogram when restocking, in order to find locations for particular products. Similarly, customers may be given access to a map or other information based on a planogram to guide the customers to desired products. As another example, a shopping service may use a planogram as a guide or map when picking products on behalf of a customer. In some cases, a planogram may be used to calculate an optimum sequence or route for picking a list of items. In some environments, smartphone applications or other computer applications may be provided to shoppers and store personnel to assist in finding specified products based on a planogram.

Although a particular fixture and camera configuration is illustrated in FIG. 1, in practice the described techniques may be implemented in environments having various layouts, which may include different types of fixtures and supports.

Note that as used herein, the term "product" corresponds to a product identity, such as might be defined by a brand/model combination and/or a unique product identifier such as a UPC (Universal Product Code). The terms "product instance," "item," and "product item" are used when referring to a single article of a product.

Figure 2:
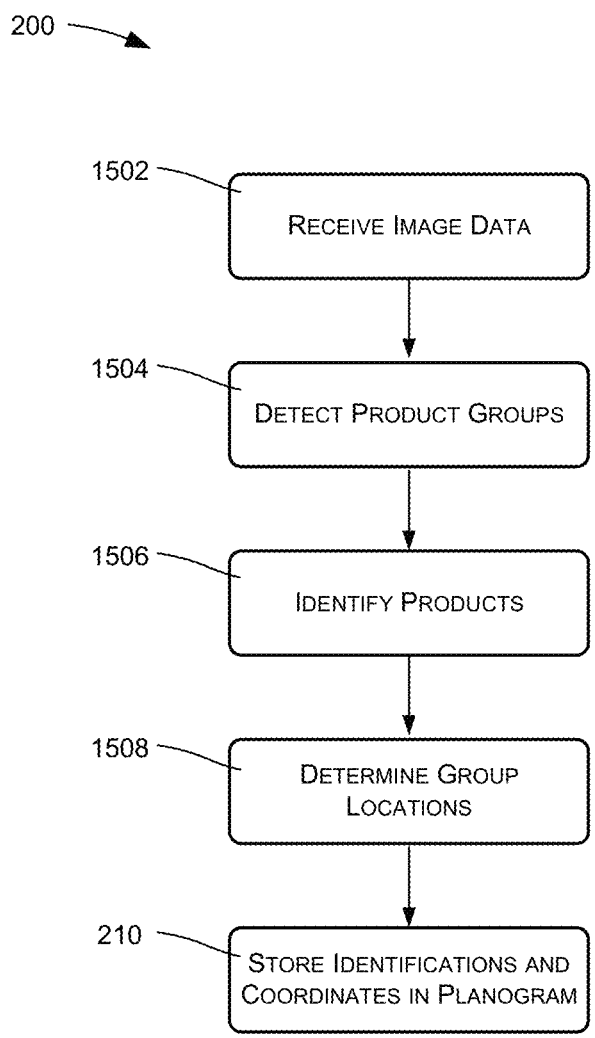
FIG. 2 is a flow diagram illustrating an example process for determining product locations based on the image data produced by the cameras of FIG. 1.

FIG. 2 illustrates an example process 200 for identifying the locations of products and/or product spaces within a facility in which cameras are positioned to capture images of product instances that are supported by one or more fixtures. The process 200 may be performed by computer systems and/or computer devices associated with a business or facility, such as the remote system described below with reference to FIG. 10 and other systems and components described with reference to FIGS. 30 and 31. FIG. 2 will be described in conjunction with FIGS. 3-5, which are used to illustrate certain of the actions of shown by FIG. 2.

An operation 202 comprises receiving image data from one or more cameras within the facility. The image data represents images of the product instances captured by the cameras. The image data may be received from one or more cameras that are positioned throughout the facility, such as one of the cameras 122 of FIG. 1. Each camera image may be of a fixture or a portion of a fixture having multiple product groups, each of which may have one or more instances of the same product.

Figure 3:
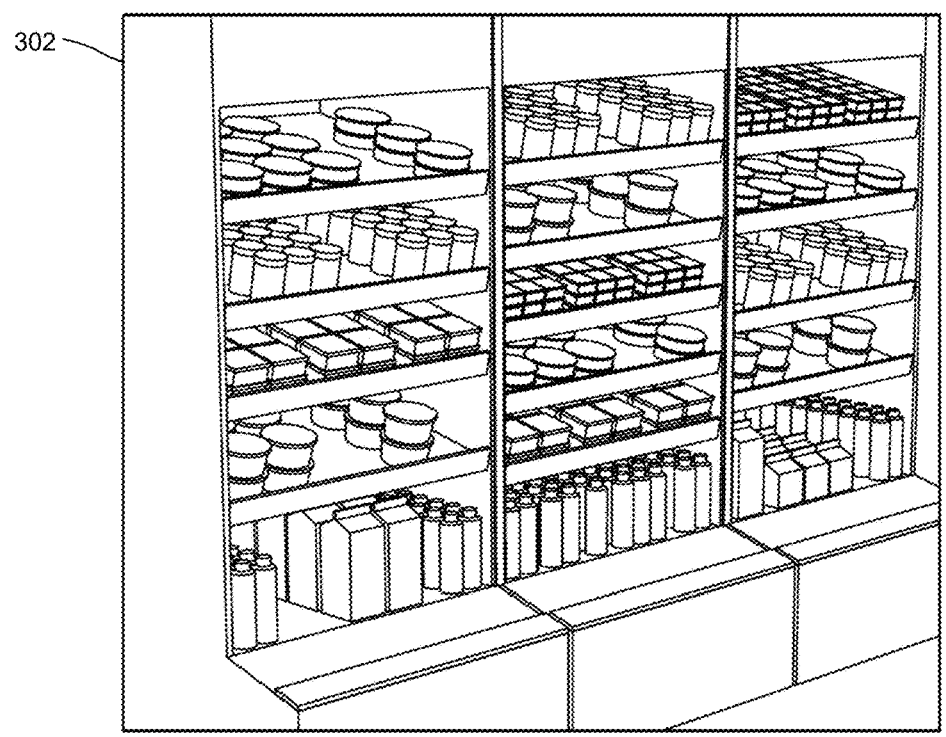
FIG. 3 is an example of a camera image of product fixtures, which is to be analyzed to determine locations of product groups visible in the camera image.

FIG. 3 is an example of a camera image 302 that might be received in the action 202. The image 302 is of a fixture and its product instances. More specifically, in this example the camera image 302 is of several shelf fixtures, each having multiple shelves that support multiple product instances. Note, however, that the described techniques may be performed to determine product spaces for various different types of fixtures, not limited to shelf fixtures.

An operation 204 comprises analyzing the image data to detect product groups represented by the camera image 302, wherein a product group comprises a contiguous group of product instances that have a common product identification, such as a common UPC. Product instances within a shelf lane are an example of a product group. A product group may also comprise product instances of the same product that are in adjacent shelf lanes. As a more specific example, a product group may be one or more contiguously adjacent cans of a particular brand and flavor of soft drink, regardless of the type of fixture they are on. A different product group may comprise one or more contiguously adjacent boxes or cases of a particular brand and flavor of soft drink.

In some embodiments, the operation 204 may comprise segmenting the camera image 302 to detect segments of the image 302 that corresponds to respective product groups. Each segment comprises a group of image points that together represent a group of product instances of a single product. A group of image points such as this may be referred to herein as a product mask, item mask, or point group.

Figure 4:
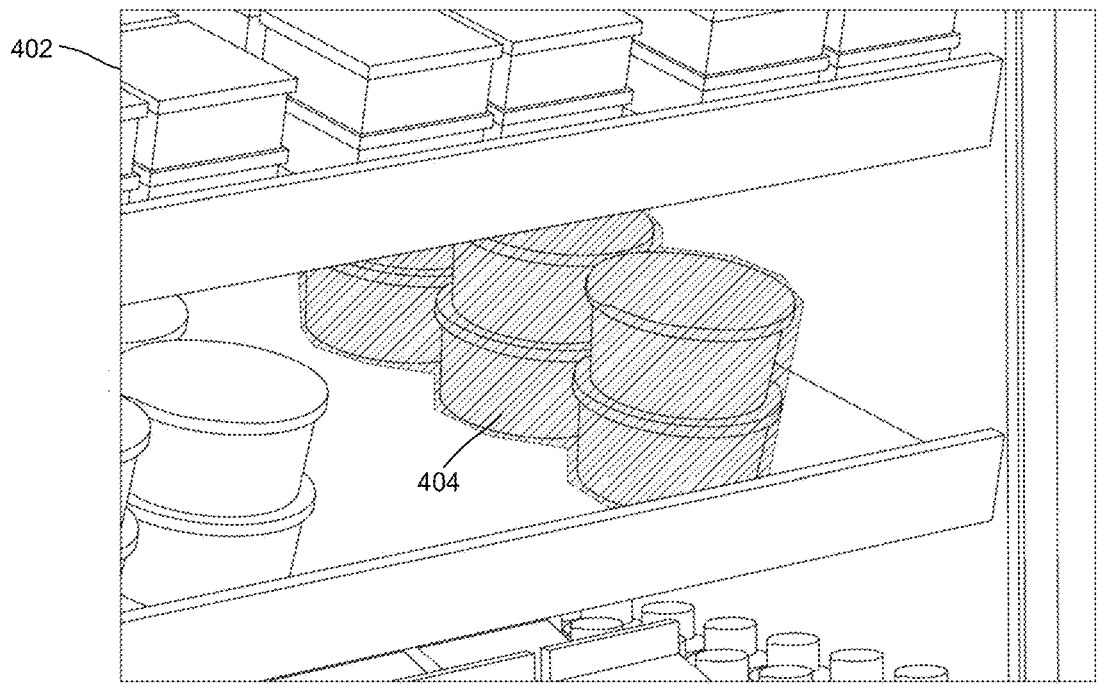
FIG. 4 is a portion of a camera image that illustrates a product group and corresponding image segment.

FIG. 4 shows a result of segmentation as might be achieved in an example environment. FIG. 4 shows an image portion 402 that contains multiple product instances arranged in lanes as already described. Within the image portion 402, a segment 404 has been identified. The segment 1 is illustrated as a cross-hatched mask corresponding to a group of product instances. The image segment 404 comprises the image points underlying the illustrated mask. In the described example, the image segment 404 includes all contiguous instances of a single product. Although only a single image segment 404 is illustrated in FIG. 4, in practice each group of product instances is represented as a distinct segment.

Figure 5:
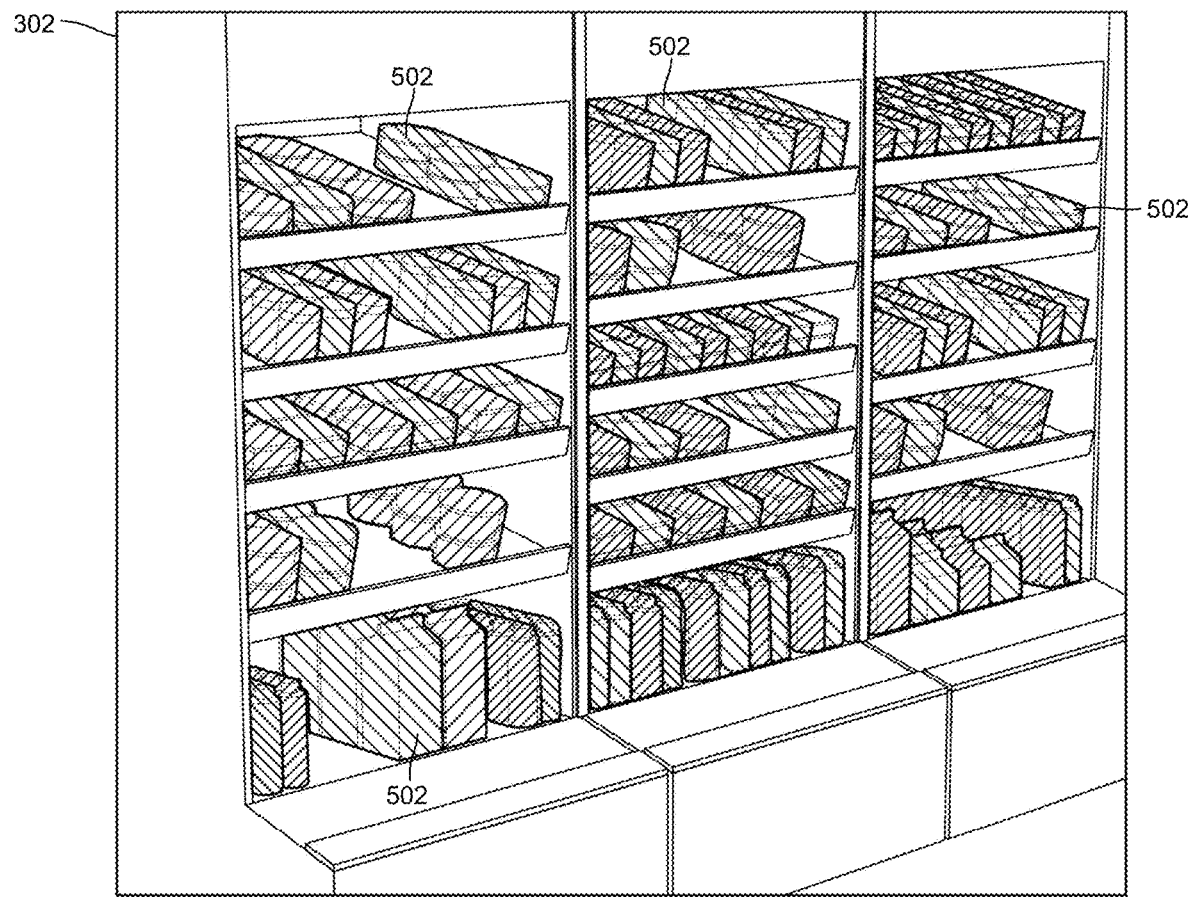
FIG. 5 represents image data within which lane segments have been identified.

FIG. 5 illustrates segments 502 that have been identified in the image 302 of FIG. 3. In FIG. 5, each segment 502 corresponds to a group of product instances and is illustrated as a separately hatched region. For purposes of illustration, only four of the segments 502 are labeled in FIG. 5.

The operation 204 may use a trained classifier to identify image segments corresponding to product instances and/or to groups of product instances. The classifier can be trained using supervised learning, based on training images that have been manually annotated to show image segments corresponding to product instances or groups. The classifier, as well as each classifier described throughout, may comprise a convolutional neural network (CNN), a support vector machine (SVM), or any other type of computer-vision-based classifier. Some implementations may use the Mask R-CNN (Regional Convolutional Neural Network) framework for object instance segmentation.

Returning again to FIG. 2, an operation 206 comprises further analyzing the image data to determine product identifications of the product instances of the product groups, as represented by the corresponding image segments. In some embodiments, this may comprise performing image recognition to obtain identifications of the products represented by the image segments of the camera image 302. Specifically, for each identified image segment, image recognition is performed to identify the product instances shown by the image segment. Product identification may utilize various types of object recognition and identification, such as techniques that compare detected features of a segment to the known features of different products. In some cases, classifiers may be trained on manually annotated images to identify different items.

An operation 208 comprises further analyzing the image data to determine locations of the product groups. More specifically, the operation 208 may comprise determining coordinates of a product space corresponding to each product group, where a product space may comprise an area or volume containing the instances of the product group. The coordinates of a product space may be specified as three-dimensional coordinates of the facility within which the products are located. For example, a product space may comprise a cube or rectangular volume specified by coordinates of its corners relative to the facility.

In some embodiments, physical coordinates of a product group may be determined by comparing two different camera images, taken from different viewpoints, each of which includes a representation of the product group. In particular, two such images may be analyzed to identify a product group that is shown in both image, and triangulation can be used to determine coordinates of visible points of the product group based on image coordinates of the points in the two images and on known positions, orientations, and other characteristics of the cameras that produced the images.

In other embodiments, physical coordinates of points represented by an image or image segment may be determined based on depth information included in the 3D camera images, such as might be produced by a time-of-flight, stereoscopic, RGB-D, predictive depth techniques, or other 3D cameras and techniques.

In some embodiments, identifying a product space corresponding to a product group may comprise identifying image points that are on front-facing surfaces of the instances of the product group, and using those points to identify a front-facing rectangle or other area of the product space. The front-facing is then be extended rearward, using an assumed depth, to define a product volume.

An operation 210 may comprise storing, in one or more datastores, planogram data indicating product locations within a facility. The operation 210 may be performed with respect to a previously stored planogram or a newly created planogram. For example, the action 210 may comprise storing planogram data in a network-accessible database that is being used for the planogram. In particular, the operation 210 may comprise updating the planogram with the product identifications and location coordinates determined by the previous actions of FIG. 2. In some embodiments, each product location may be defined as coordinates of a product space or product volume as described above, in three-dimensional space.

The process 200 may be performed periodically to update a facility planogram. For example, the process 200 may be performed at least once a day, such as every morning after nighttime stocking activities and before store opening. Alternatively, the process 200 may be performed when stocking activity has been detected and/or when shelves and/or items are rearranged within the facility. In some cases, the process 200 may be performed even during times when items are being accessed by customers or other persons. For example, the process 200 may be performed multiple times a day, during times that a store is open. Further, while the process 200 illustrates one high-level example for generating and updating planogram data, FIGS. 10-29 and accompanying figures described additional and/or supplementary techniques for generating or updating this data.

In some cases, additional data may be available and used for determining group locations. For example, facility personnel may at times perform manual barcode scanning of items as they are being stocked, and this information may be used to qualify or augment the process 200. As another example, a facility blueprint may be available and may be used to determine fixture locations.

Figure 6:
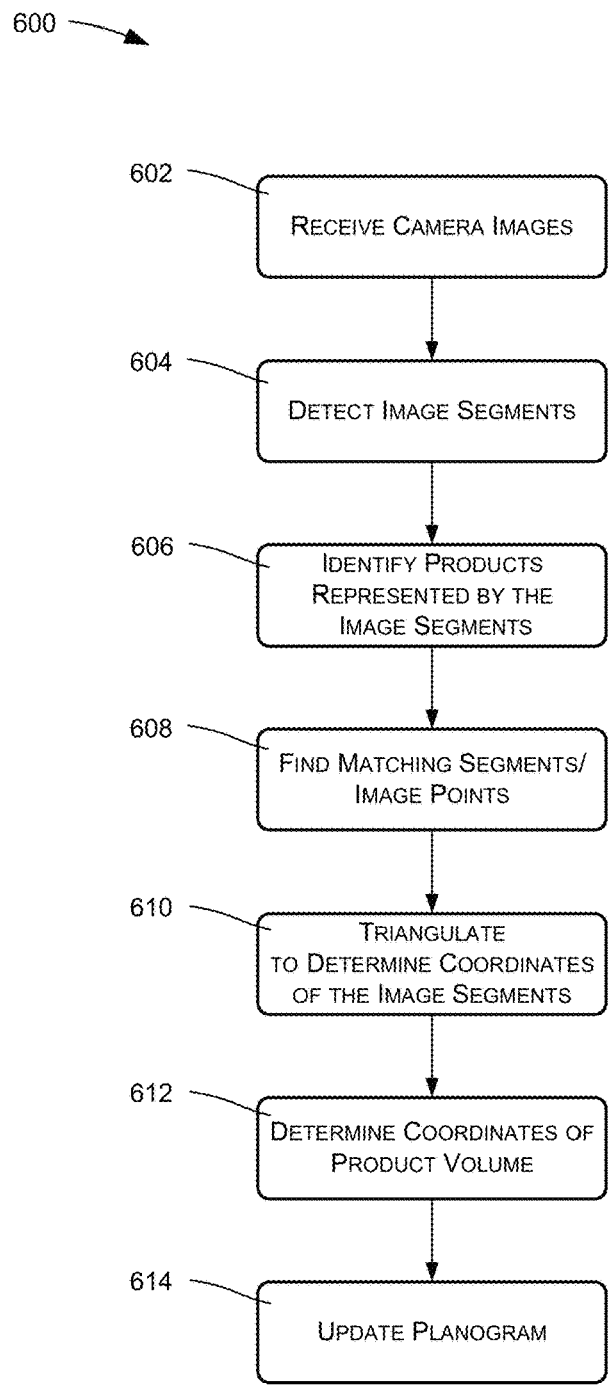
FIG. 6 is a flow diagram illustrating another example process for determining product locations based on image data.

FIG. 6 illustrates another example process 600 that may be used in certain embodiments and environments for identifying the locations of products and/or product lanes. The process 600 may be performed by computer systems and/or computer devices associated with a facility or business within which the products are located.

An operation 602 comprises receiving first and second image data representing product items or other items supported by one or more fixtures within the facility. The first image data represents a first camera image of multiple product items or other items that are stored on shelves of one or more fixtures. The second image data represents a second camera image of the multiple product items from a different camera viewpoint. The two camera images are used in subsequent actions determining positions of product groups using triangulation. Note that although FIG. 6 references first and second cameras, any number of one or more cameras and corresponding camera images may be analyzed, using the same procedures, to identify the locations of products and/or product spaces.

Figure 7:
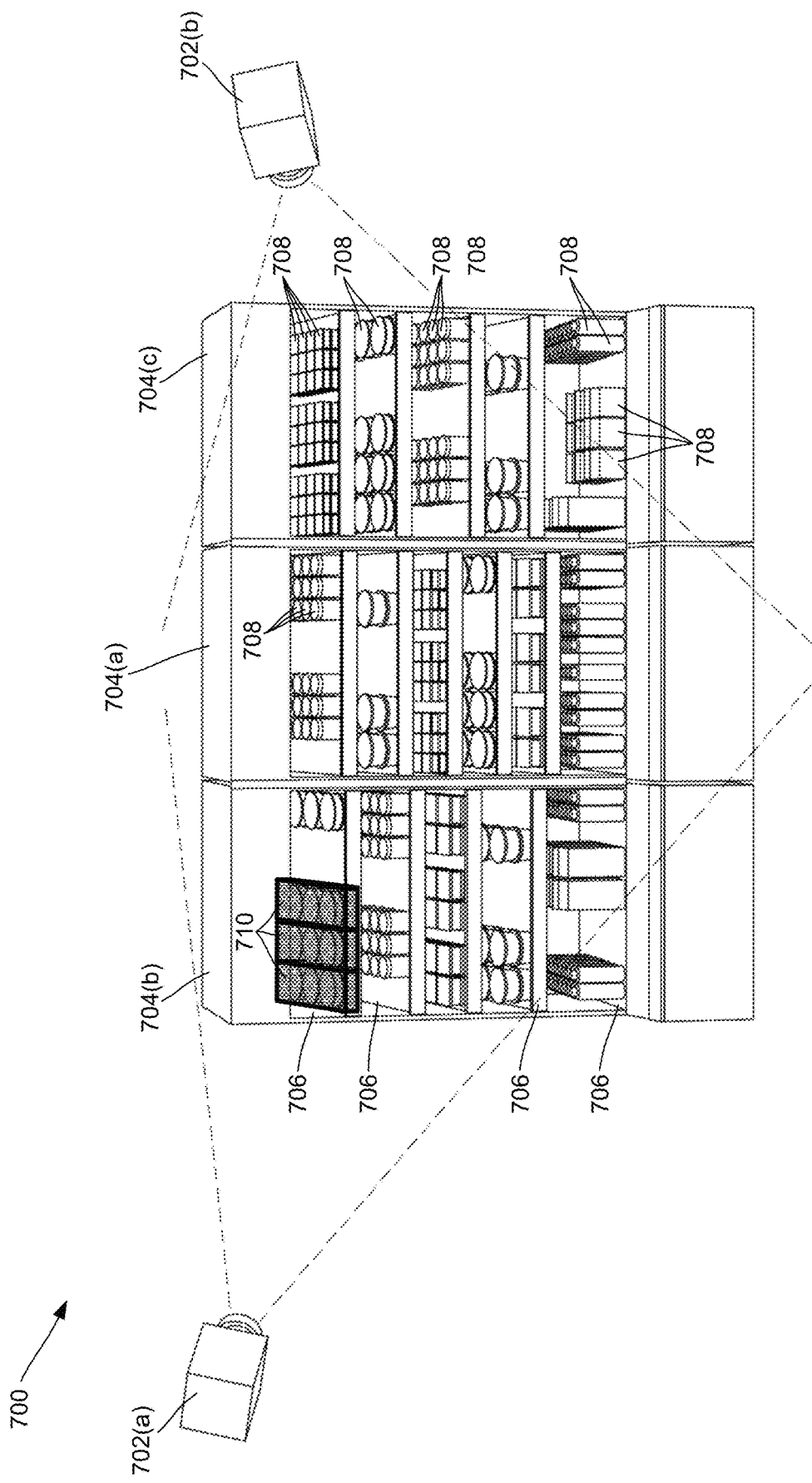
FIG. 7 illustrates an example environment in which two cameras produce image data representing an overlapping portion of a product fixture.

FIG. 7 shows an environment 700 in which two cameras 702(a) and 702(b) are positioned provide respective camera images captured from different viewpoints, such as might be used in the example process 600. The cameras 702(a) and 702(b) are positioned in different locations and in different orientations to view product instances supported by product fixtures 704, which includes a center fixture 704(a), a left fixture 704(b), and a right fixture 704(c). The fixtures 704 have multiple horizontal shelves 706 that hold multiple product instances, several of which have been designated in FIG. 1 by the reference numeral 708. In this example, the product instances 708 are arranged in single file lanes 710 that extend from the front of the shelves 706 to the rear of the shelves 706. Although FIG. 1 highlights three lanes 710 for purposes of illustration, the depicted product instances 708 can be seen to form multiple single file lanes that extend from front to back. Each lane is defined by a depthwise column of product instances.

In this example, each lane 710 contains multiple instances 708 of the same product. For example, a particular lane 710 might contain cheese wheels of a particular size, type, and brand. As another example, a lane 710 may contain cans of soda of a particular size, brand, and flavor. Generally, the product instances in a lane will all have the same UPC.

The cameras 702(a) and 702(b) are oriented so that their fields of view encompass at least an overlapping portion of the fixtures 704. In this example, it will be assumed that the cameras 702(a) and 702(b) are at respective first and second locations and that the center fixture 704(a) is within the view of both of the cameras 702(a) and 702(b). In some embodiments, it may be desirable for the cameras 702(a) and 702(b) to be above the fixtures 704 so that tops of the product instances 708 are visible to the cameras. In some situations, the cameras 702(a) and 702(b) may be at the same height. In other embodiments, the cameras 702(a) and 702(b) may be at different heights. In some cases, the cameras may be oriented in different directions, as in the example of FIG. 7. Further, while FIG. 7 illustrates an example of two cameras having respective fields of view that at least partly overlap, in other instances the techniques may apply to any other number of cameras having partially-overlapping fields of view.

Although a particular fixture and camera configuration is illustrated in FIG. 7, in practice the process 600 may be implemented in environments having various layouts, which may include different types of fixtures and different kinds of product holders, such as the example fixtures shown in FIG. 1. For example, fixtures may have hooks or rods instead of shelves, and the hooks or rods may be arranged irregularly rather than in rows or columns. In some cases, products may lie or be stacked on a shelf, table, or countertop. Generally, fixtures may include shelves, counters, hooks, cases, racks, kiosks, stands, easels, bins, table tops, and other types of supports and holders.

Figure 8:
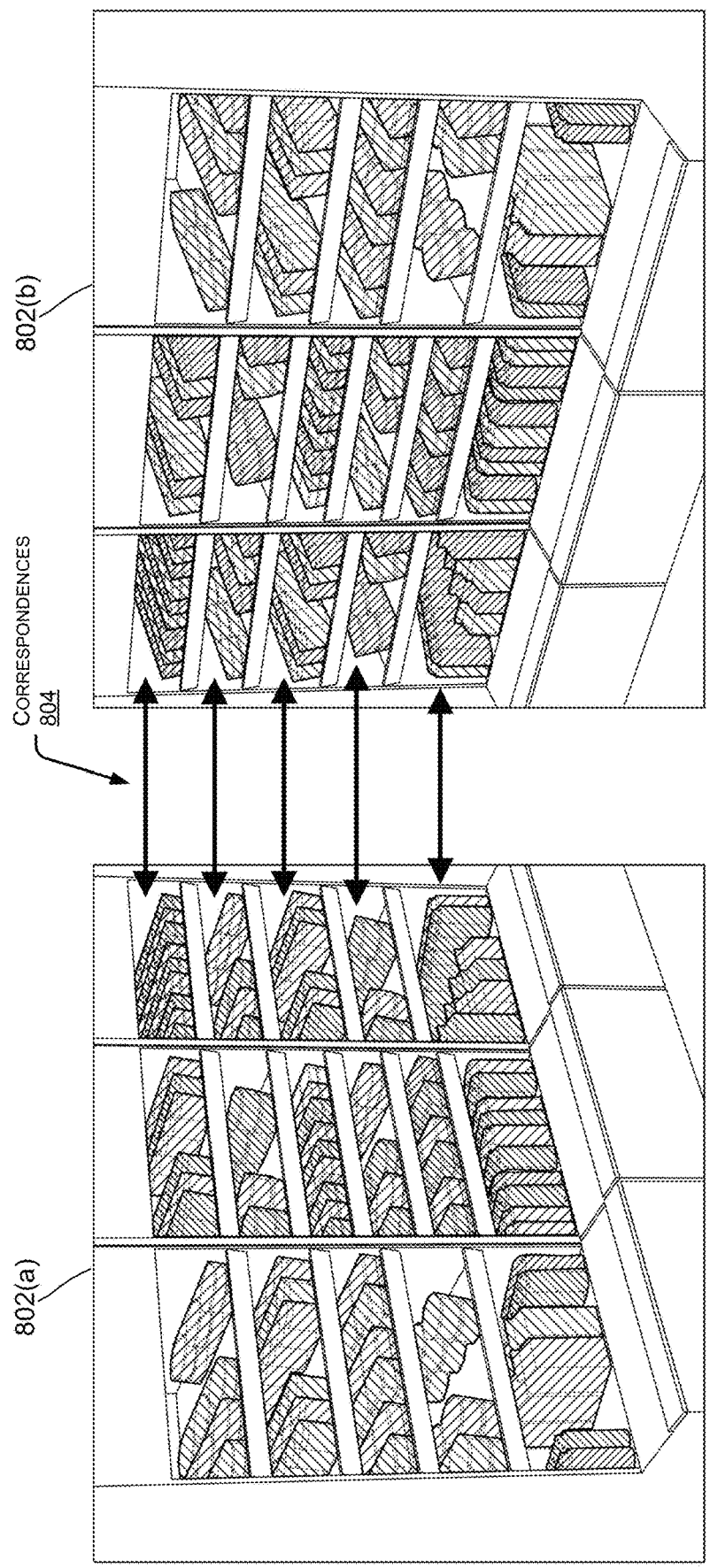
FIG. 8 illustrates example images data captured by the cameras of FIG. 7. As illustrated, product segments have been identified within each image data and respective correspondences between the image data have been determined.

FIG. 8 shows an examples of a first image 802(a) and a second image 802(b) that have been captured by the cameras 702(a) and 702(b) of FIG. 7. The images 802(a) and 802(b) are from the different viewpoints of the two cameras. The images 802(a) and 802(b) include an overlapping portion of the product fixtures 704, which in this example include at least the center product fixture 704(a).

Returning again to FIG. 6, an operation 604 comprises segmenting each of the first and second camera images 802(a) and 802(b) to detect segments of each image 802(a) and 802(b) that correspond to individual product instances or product groups. More specifically, image segmentation is performed to detect first image segments, of the first image 802(a), that correspond to product instances or product groups. Image segmentation is performed to detect second image segments, of the second image 802(b), that correspond to the same product instances or product groups. Each segment comprises a group of image points that together represent a product instance or product group. A group of image points such as this may be referred to herein as a product mask, item mask, lane mask, or point group. FIGS. 4 and 5, discussed above, show example results of image segmentation such as this.

The operation 604 may use a trained classifier to detect image segments corresponding to product instances and/or to lanes of product instances. The classifier can be trained using supervised learning, based on training images that have been manually annotated to show image segments corresponding to product instances or product lanes. The classifier, may comprise a convolutional neural network (CNN), a support vector machine (SVM), or any other type of computer-vision-based classifier. Some implementations may use the Mask R-CNN (Regional Convolutional Neural Network) framework for object instance segmentation.

An operation 606 comprises performing image recognition to obtain identifications of the products represented by the image segments of the first camera image 802(a) and the second camera image 802(b). Specifically, for each identified image segment, image recognition is performed to identify the product represented by the image segment. Product identification may utilize various types of object recognition and identification, many of which compare detected features of a segment to the known features of different products. In some cases, classifiers may be trained on manually annotated images to identify different items.

An operation 608 comprises comparing segments of the first and second camera images 802(a) and 802(b) to find correspondences 804, also referred to herein as mappings, between the segments of the first and second camera images 802(a) and 802(b). Each mapping associates one of the segments of the first camera image 802(a) with a corresponding one of the segments of the second camera image 802(b), wherein corresponding segments represent the same product instance or group of product instances.

In some embodiments, the operation 608 may be performed based on the identifications of the products as determined in the operation 606. More specifically, the action 608 may comprise, for an image segment of the first camera image 802(a) that represents a particular product, identifying a segment of the second camera image 802(b) that represents the same product.

In other embodiments, the operation 608 may comprise analyzing and/or comparing the first and second camera images 802(a) and 802(b) with each other to find the mappings. That is, the action 608 may include evaluating point similarities between the first camera image 802(a) and the second camera image 802(b). More specifically, the operation 608 may comprise, for each point group of the first camera image 802(a), finding a similar point group of the second camera image 802(b), where a point group comprises the points represented by an image segment. A point group mapping associates a segment and corresponding point group of the first camera image 802(a) with a respective segment and corresponding point group of the second camera image 802(b).

In some embodiments, a homography may be calculated to translate between the coordinate systems of the first and second camera images 802(a) and 802(b), based on the mappings of the action 608, and then used to update the mappings. In some instances, the techniques may utilize a local homography, which involves matching points at a shelf level. In other instances, the techniques may utilize a global homography, which involves matching points on a fixture level. A technique involving use of a homography will be described below with reference to FIG. 9.

An operation 610 comprises triangulating between corresponding segments, points, or point groups of the first and second camera images 802(a) and 802(b) to determine one or more coordinates of the product or product group represented by each segment or point group. The operation 610 may comprise determining geographic point coordinates for all matching points of each pair of matching image segments. For matching points of a pair of camera images, triangulation is based the X-Y coordinates of the points in the two images and on known positions, orientations, and lens characteristics of the cameras.

An operation 612 may comprise determining the coordinates of a product space, based on the point coordinates determined in the operation 610. The operation 612 may comprise first identifying a front surface of one of the product instances represented by a segment in either the first or second camera image. In some embodiments, this may be performed by first identifying points of an image segment that are shown by both of the first and second camera images 802(a) and 802(b). These points are further analyzed to identify the coordinates of the front surface of a product item represented by the image segment. In some embodiments, this may be performed by projecting the intersecting points into two dimensions in the X-Y plane (i.e., top-down view). In a top-down view, a vertically aligned product surface will be shown as a straight or curved line, defined by a relatively high concentration of points. These points are identified by applying the Hough Transform to the two-dimensional projection. A vertically aligned, two-dimensional bounding box is then constructed around the identified surface points and the box is extended rearward with an assumed depth to generate the three-dimensional coordinates of an overall product volume.

In some embodiments, the operation 612 may be performed by first conducting a facility-wide analysis, using cameras through the facility, and building a 3D point cloud of surface points visible to the cameras. The 3D point cloud is then analyzed to detect planar product arrangements. For example, the 3D point cloud may be analyzed to detect vertical planes such as might be formed by the front surfaces of products supported by a row of shelf fixtures. Product spaces along a vertical plane such like this are then modeled using horizontal bounding boxes whose front faces are aligned with the vertical plane. The same process can be repeated for horizontal and slanted planes as well as curved surfaces formed by some product layouts.

In order to identify vertical planes formed by vertical arrangements of products, such as presented by a shelf fixture, the 3D point cloud of the entire facility may be transformed into two dimensions in a horizontal (i.e., X-Y) plane, creating a top-down view of the point cloud. In the top-down view, a vertical surface will appear as concentrations of point that form lines. That is, points will be concentrated around lines that correspond to the front faces of vertical product arrangements. Horizontal planes corresponding to horizontal product arrangements may be detected using the same process, except that the 3D point cloud is transformed into two dimensions in a vertical plane. Slanted arrangements may be detected by transforming into slanted two-dimensional planes. Curved surfaces may be detected by detecting curves formed in the two-dimensional planes by concentrations of points.

An operation 614 may comprise storing, in one or more datastores, planogram data indicating product locations within a facility. The operation 614 may be performed with respect to a previously stored planogram or a newly created planogram. Generally, the operation 614 may comprise storing planogram data in one or more datastores to indicate the product locations within the facility. For example, the operation 614 may comprise storing planogram data in a network-accessible database that is being used for the planogram. In particular, the operation 614 may comprise updating the planogram with the product locations determined by the previous actions of FIG. 6. In some embodiments, each product location may be defined as a product area or volume as described above, in three-dimensional space.

The process 600 may be performed periodically to update a facility planogram. For example, the process 600 may be performed at least once a day, such as every morning after nighttime stocking activities and before store opening. Alternatively, the process 600 may be performed when stocking activity has been detected and/or when shelves and/or items are rearranged within the facility. In some cases, the process 600 may be performed even during times when items are being accessed by customers or other persons. For example, the process 600 may be performed multiple times a day, during times that a store is open.

Figure 9:
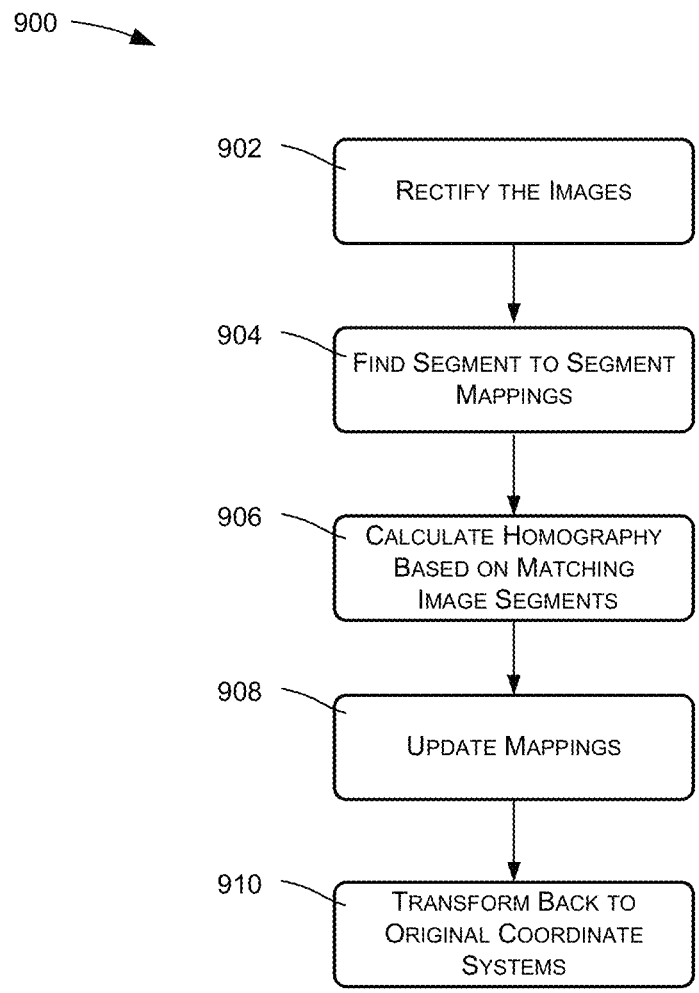
FIG. 9 is a flow diagram illustrating an example process for matching points and/or segments of two images.

FIG. 9 illustrates an example process 900 that may be used in some embodiments to match image segments and/or image points between two camera images of the same product instances, such as between the first and second camera images 802(a) and 802(b).

An action 902 comprises performing image stereo rectification of the first and second images 802(a) and 802(b). Image stereo rectification creates projections of the first and second images 802(a) and 802(b) on a common image plane. The projected images may be referred to as rectified images. In the rectified images, epipolar lines are horizontal. In addition, both of the rectified images have the same vertical scale so that any part of one rectified image will be at the same or approximately the same image height in the other rectified image.

Figure 10:
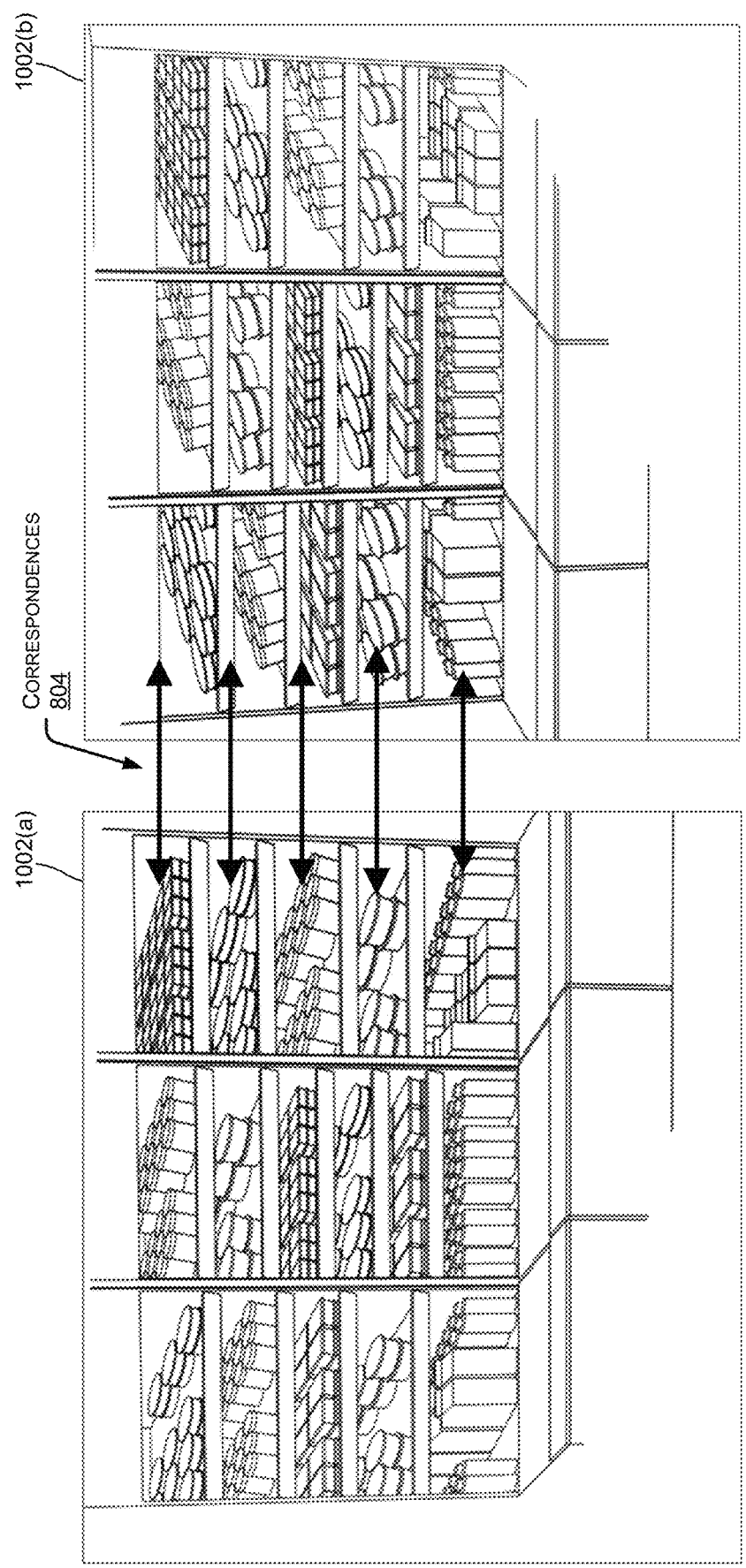
FIG. 10 illustrates example rectified images described with reference to FIG. 9.

FIG. 10 shows rectified images 1002(a) and 1002(b) that might be produced in the action 902 based on the camera images 802(a) and 802(b), respectively. In these examples, the original camera images 802(a) and 802(b) have been warped so that the shelves of the racks are along epipolar lines and therefore appear horizontal in the transformed images. In addition, any point or item of the first rectified image 1002(a) is at the same height as the same point or item of the second rectified image 1002(b).

More specifically, image stereo rectification may be performed by finding a linear transformation that is subject to the following constraints (a) epipolar lines are parallel to the horizontal axis of the rectified images and (b) corresponding points of the rectified images have the same vertical coordinates. These constraints are satisfied using a linear transform that rotates, skews, and scales the images.

Either calibrated or non-calibrated image stereo rectification may be used to produce the rectified images 1002(a) and 1002(b) based on the camera images 802(a) and 802(b). Calibrated rectification is based on known characteristics of the cameras and on known geometric relationships between the cameras. Non-calibrated rectification may be performed based on point correspondences between the two camera images 802(a) and 802(b). In some cases, non-calibrated calibration may additionally rely on the anticipated presence of shelves and/or other image lines that can be assumed to be horizontal.

Previously identified image segments are also transformed into the coordinate systems of the rectified images, so that the image segments are defined relative to the rectified images.

Returning to FIG. 9, an operation 904 comprises comparing the segments of the first and second rectified images 1002(a) and 1002(b) to find correspondences 1004, also referred to herein as mappings, between the segments of the first and second rectified images. Each mapping associates one of the segments of the first rectified image 1002(a) with a corresponding one of the segments of the second rectified image 1002(b), wherein corresponding segments are intended to represent the same product instance or lane of product instances.

In some embodiments, the operation 904 may be performed based on previous identifications of products represented by the image segments. More specifically, the operation 904 may comprise, for an image segment of the first rectified image 1002(a) that represents a particular product, identifying a segment of the second rectified image 1002(b) that represents the same product.

In other embodiments, the operation 904 may comprise analyzing and/or comparing the first and second rectified images 1002(a) and 1002(b) with each other to find the mappings. That is, the operation 904 may include evaluating point similarities between the first rectified image 1002(a) and the second rectified image 1002(b). More specifically, the operation 904 may comprise, for each point group of the first rectified image 1002(a), finding a similar point group of the second rectified image 1002(b), where a point group comprises the points of an image segment. A point group mapping associates a segment and corresponding point group of the first rectified image 1002(a) with a respective segment and corresponding point group of the second rectified image 1002(b).

Because of the previously performed image rectification, corresponding points, point groups, and image segments will be at approximately the same heights in the first and second rectified images 1002(a) and 1002(b). Specifically, searching is constrained to points, point groups, or image segments that are at approximately the same height (e.g., along a common epipolar line) in each of the first and second rectified images 1002(a) and 1002(b). The search for matching segments between images is constrained and simplified by this characteristic of the two rectified images.

Any search for matching points, point groups, and/or image segments may also be constrained by the horizontal ordering of the image segments or point groups in each of the first and second rectified images 1002(a) and 1002(b). Specifically, it can be assumed that product instances that are along any horizontal, epipolar line will appear in the same horizontal order in the two images. Thus, given a first row of image segments having a horizontal ordering in the first rectified image 1002(a), the analyzing of the operation 904 is constrained to mappings that recognize the same horizontal ordering of image segments in the second rectified image 902(b).

In some embodiments, the operation 904 may be performed using dynamic programming or other recursion techniques, which are constrained by the horizontal ordering of the point groups in the first and second rectified images 1002(a) and 1002(b). Furthermore, in some implementations, the mappings found in the operation 904 may be referred to as preliminary mappings, because they may be updated in subsequent actions.

An operation 906 comprises calculating a homography between the first and second rectified images 1002(a) and 1002(b). A homography may be calculated based on matching points or point groups of the two images, which in this example are identified by the previously determined mappings between point groups of the first and second rectified images 1002(a) and 1002(b). In some instances, meanwhile, the correspondences 804 and/or 1004 are identified, and the processes are performed, without calculating a homography between images.

In examples where a homography is computed, the homography is an equation or matrix that maps between points of the first and second images rectified images 1002(a) and 1002(b). For any given point of the first rectified image 1002(a), the homography can be applied to find a point of the second rectified image 1002(b) that corresponds in position to the given point of the first rectified image 1002(a).

An operation 908 comprises updating or revising the previously determined mappings, based on the homography. For each segment or point group of the first rectified image 1002(a), the homography is applied to determine the segment or point group of the second rectified image 1002(b) that corresponds in position to the segment or point group of the first rectified image.

In an operation 910, the mappings are transformed back to the coordinate systems of the original camera images 802(a) and 802(b). Generally, either or both of the operations 906 and 908 may be performed either in the coordinate systems of the original camera images 802(a) and 802(b) or in the coordinate systems of the rectified camera images 1002(a) and 1002(b). For example, prior to the operation 906 the preliminary mappings of the action 904 may be transformed back to the coordinate systems of the original camera images 802(a) and 802(b), the homography may be calculated between the original camera images 802(a) and 802(b), and reevaluating the mappings in the action 614 may be based on the this homography.

Figure 11:
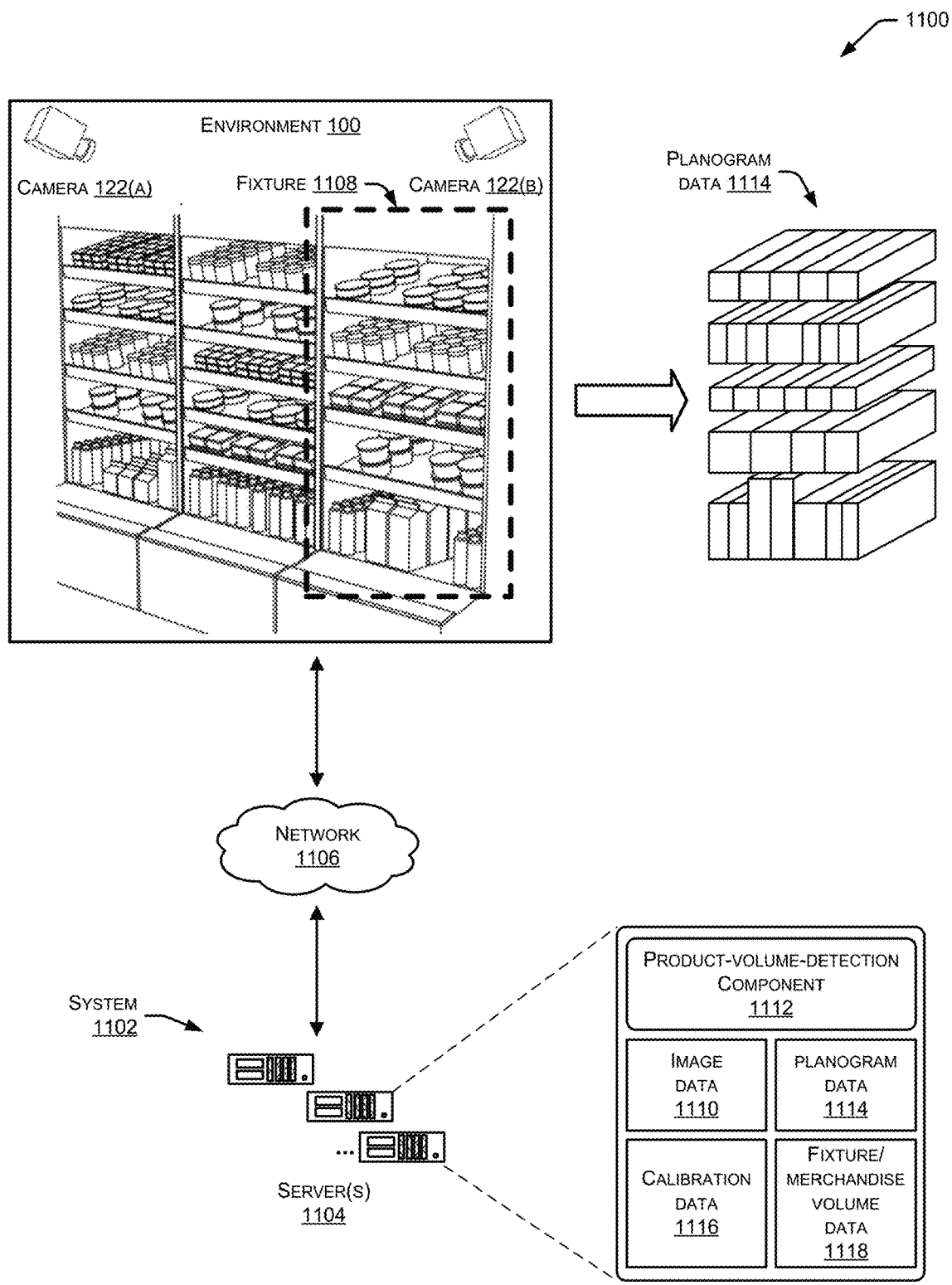
FIG. 11 illustrates planogram data that a remote system may generate in response to receiving image data of the fixtures shown in FIG. 1. This planogram data may then be used to identify interactions between users and items within the environment for the purpose of maintaining accurate virtual carts of users within the environment.

FIG. 11 illustrates an example architecture 1100 that includes the environment 100 communicatively coupled to a system 1102, comprising one or more servers 1104, via one or more networks 1106. The system may reside in or near the environment 100, or may reside in a remote environment. As illustrated, the environment 100 includes the example cameras 122(a) and 112(b), which may provide the generated image data over the network 1106. In some instances, the image data may represent image data of an example fixture 1108, which in this example comprises a rack having multiple shelves, with each shelf including multiple lanes of products thereon.

As illustrated, the remote system 1102 may receive and store image data 1110 received from the cameras 122 and may analyze the image data 1110, using a product-volume-detection component 1112, to generate planogram data 1114. The product-volume-detection component 1112 may generate this planogram data using any of the processes or techniques described above or below. In some instances, the product-volume-detection component 1112 uses the image data 1110, along with calibration data 1116 indicating locations of the cameras 122 relative to one another and fixture/merchandising volume data 1118, to determine and generate the planogram data 1114. As noted above, this planogram data 1114 may then be used to identify interactions between users and items within the environment 100 for the purpose of maintaining accurate virtual carts of users within the environment 100, directing users within the environment 100, or the like.

Figure 12:
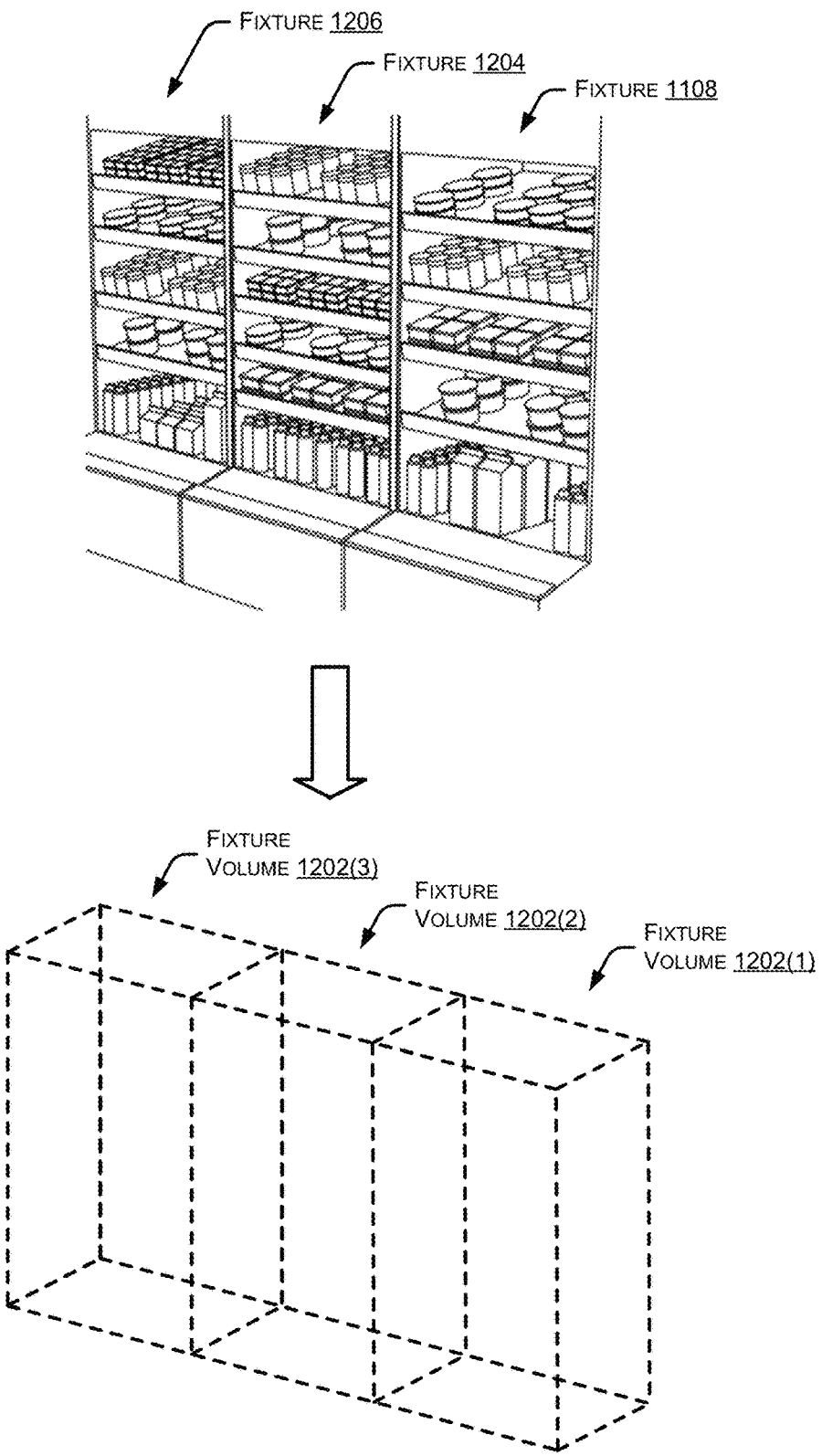
FIG. 12 illustrates example fixture-volume data that a product-volume-detection component of the system of FIG. 11 may use as input for determining the product volumes described herein. This fixture-volume data may indicate location data associated with fixtures within the environment.

FIG. 12 illustrates example fixture-volume data 1202(1) that the product-volume-detection component 1112 may use as input for determining the product volumes and, thus, the planogram data 1114. As illustrated, the fixture-volume data 1202(1) may indicate location data within the environment corresponding to the fixture 1108. That is, the fixture-volume data 1202(1) may comprise a bounding box (e.g., 3D coordinates) corresponding to the space occupied by some or all of the fixture 1108. In some instances, this bounding box may be determined using one or more trained classifiers similar to the determination of other bounding boxes described herein, while in other instances this data may be manually determined and stored as input for use by the product-volume-detection component 1112. For instance, the location of each camera within the environment 100 may be known, and image data may be captured from these known camera locations. Thereafter, the image data may be labeled (manually or otherwise) as corresponding to certain fixtures and the 3D location of these fixtures may be translated from their locations within the image data to 3D locations (e.g., 3D coordinates) based at least in part on the known locations of the cameras. FIG. 12 further illustrates that additional example fixtures 1204 and 1206 may be associated with example fixture volumes 1202(2) and 1202 (3), respectively.

Figure 13:
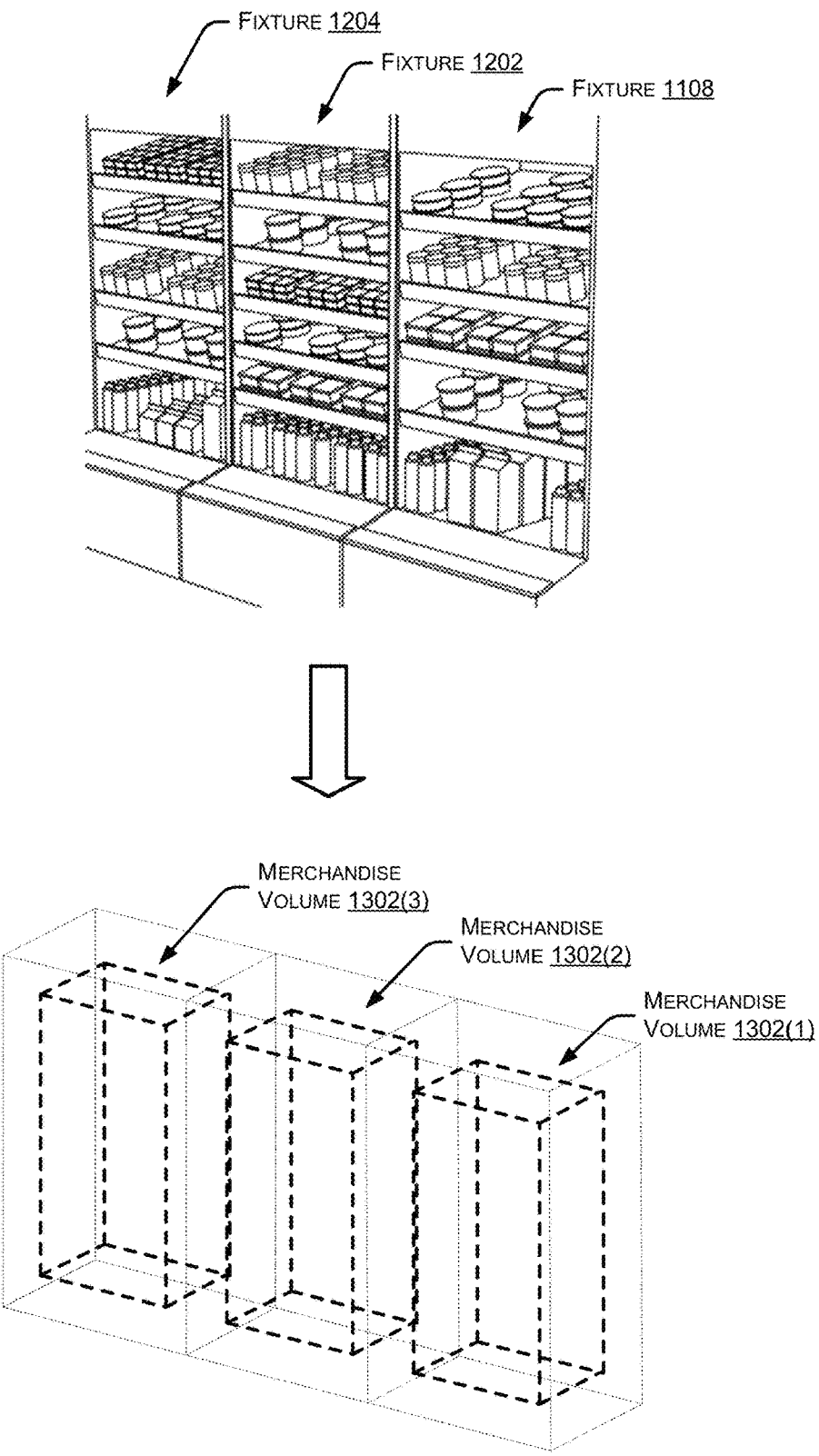
FIG. 13 illustrates example merchandising-volume data that the product-volume-detection component may also use as input for determining the product volumes described herein. This merchandising-volume data may indicate location data associated with products located on or proximate the fixtures within the environment.

FIG. 13, meanwhile, illustrates an example merchandising volume 1302(1) comprising a space within the environment 100 in which products may couple to, rest on, or otherwise be associated with the example fixture 1108. For example, the merchandising volume 1302(1) in this example comprises the space in which products may reside on shelves of the fixture 1108. Thus, in this example the merchandising volume 1302(1) resides within the fixture volume 1202(1). In instances where the fixture comprises a table, however, the merchandising volume may reside "atop" the corresponding fixture volume, while a merchandising volume associated with a hook-based fixture may reside "in front of" or otherwise adjacent to the corresponding fixture volume. In either instance, the product-volume-detection component 1112 may use the merchandising volume 1302(1) as input for determining the product volumes and, thus, the planogram data 1114. Again, each camera within the environment 100 may be known, and image data may be captured from these known camera locations. Thereafter, the image data may be labeled (manually or otherwise) as corresponding to certain merchandising space within the fixtures and the 3D location of these volumes may be translated from their locations within the image data to 3D locations (e.g., 3D coordinates) based at least in part on the known locations of the cameras. In addition, or in the alternative, location data associated with in-shelf sensors may be known and stored and used to determine the merchandising volumes.

Like the fixture volume 1202(1), the merchandising volume 1302(1) may comprise a bounding box (e.g., 3D coordinates), which may be determined using one or more trained classifiers similar to the determination of other bounding boxes described herein. In other instances, meanwhile, this data may be manually determined and stored as input for use by the product-volume-detection component 1112. FIG. 12 further illustrates that additional example fixtures 1204 and 1206 may be associated with example merchandising volumes 1302(2) and 1302(3) associated with fixture volumes 1202(2) and 1202(3), respectively.

Figure 14:
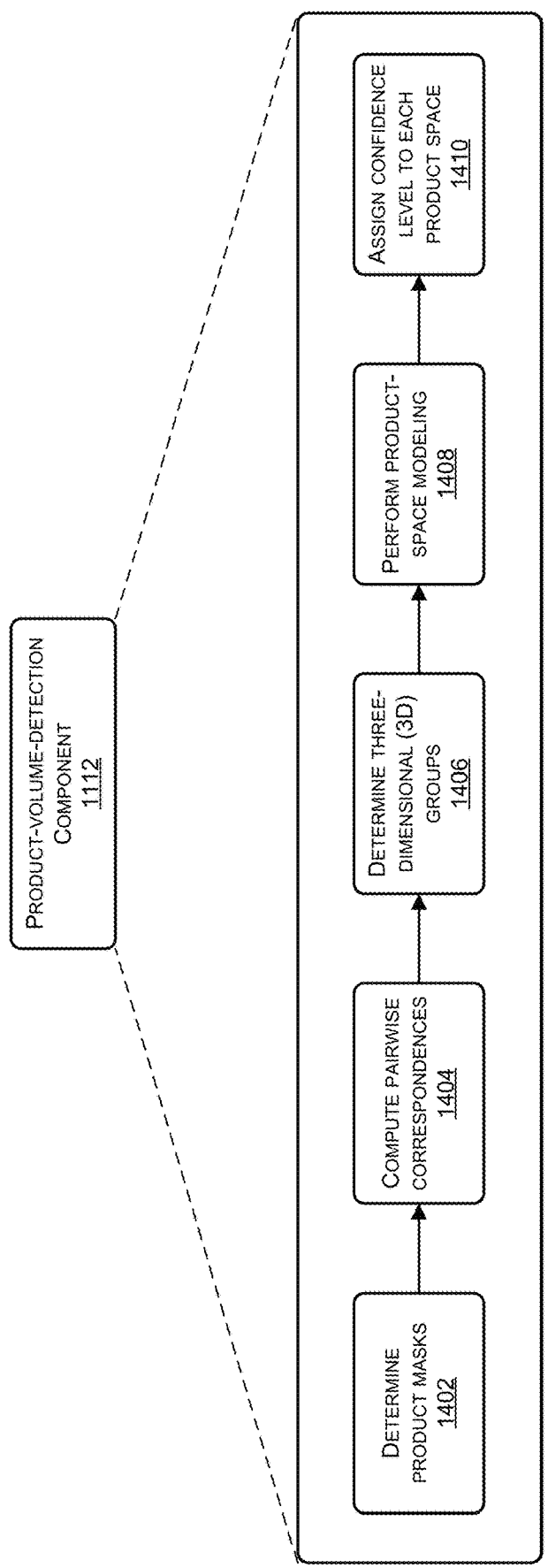
FIG. 14 illustrates an example sequence of operations that the product-volume detection component may perform for identifying the product volumes described herein. As illustrated, the sequence of operations include determine product masks, computing correspondences between the masks, determining three-dimensional (3D) product groups, performing product-space modeling, and assigning a confidence level to each determined product space.

FIG. 14 illustrates an example sequence of operations that the product-volume detection component 1112 may perform for identifying the product volumes for generating planogram data, such as the product volumes that make up the example planogram data 1114. As illustrated, the sequence of operations includes, at 1402, the product-volume detection component 1112 determining product masks corresponding to groups of one or more products residing within a merchandising volume, such as residing within each lane of the example merchandising volume 1302(1). In some instances, the operation 1402 may comprise any of the operations described above with reference to identifying portions of images corresponding to respective product masks.

At an operation 1404, the product-volume detection component 1112 may compute correspondences between the identified product masks. For instance, this operation may comprise rectifying two images of a common fixture such that the products are aligned along epipolar lines between the two images and comparing the image data along the epipolar lines to identify correspondences between the product masks of the first image and the product masks of the second image. Again, this operation may comprise any of the operations described above with reference to determining correspondences between product masks.

At an operation 1406, the product-volume detection component 1112 may determine three-dimensional (3D) product groups, or products that are to be associated or grouped with one another based on the products residing on a common shelf, hanging from a common hook or along a common horizontal line, residing on a common table, or the like. FIGS. 15-18 describe this operation in further detail below.

At an operation 1408, the product-volume detection component 1112 may perform product-space model, which may include generating the bounding boxes corresponding to the product volumes or spaces that make up the planogram data. FIGS. 19-29 describe this operation in further detail below.

Finally, an operation 1410 represents the product-volume detection component 1112 assigning a confidence level to each product volume or space. If the determined product volumes or spaces are determined with a confidence level that is greater than a threshold, then the product-volume detection component 1112 may store the product volumes or spaces as the planogram data 1114.

Figure 15:
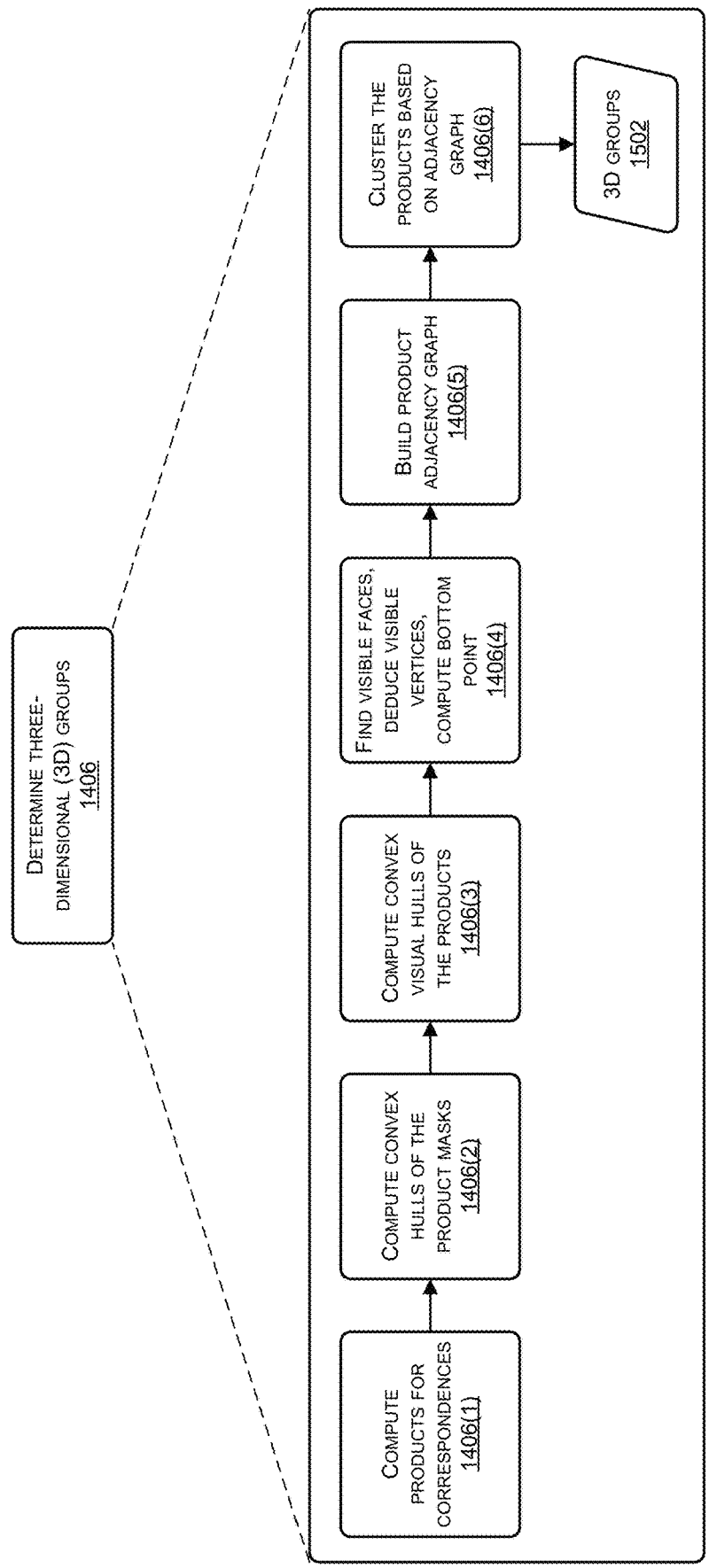
FIG. 15 illustrates an example sequence of operations for performing the operation of determining 3D product groups from the sequence of operations illustrated in FIG. 14. As illustrated, the operations for determining 3D product groups include computing products for correspondences, computing convex hulls of the product masks, computing convex visual hulls of the products, finding visible faces, vertices and bottom faces, building a product adjacency graph, and clustering the product adjacency graph.

FIG. 15 illustrates an example sequence of operations for performing the operation 1406 of determining 3D product groups from the sequence of operations illustrated in FIG. 14. The operation 1406 of determining the 3D product groups may be performed using, as inputs, the calibration data 1116 of the cameras, the detected product masks, and the correspondences determined between these product masks.

As illustrated, the operation 1406 may include, at an operation 1406(1), computing the products for correspondences. In some instances, a product may be associated with one or more masks, which may be associated with different respective views of the product. Further, in some instances a product may be associated with multiple masks in a single view. Nevertheless, a product may be determined as corresponding to each mask that has been associated with the product in a given view.

Figure 16:
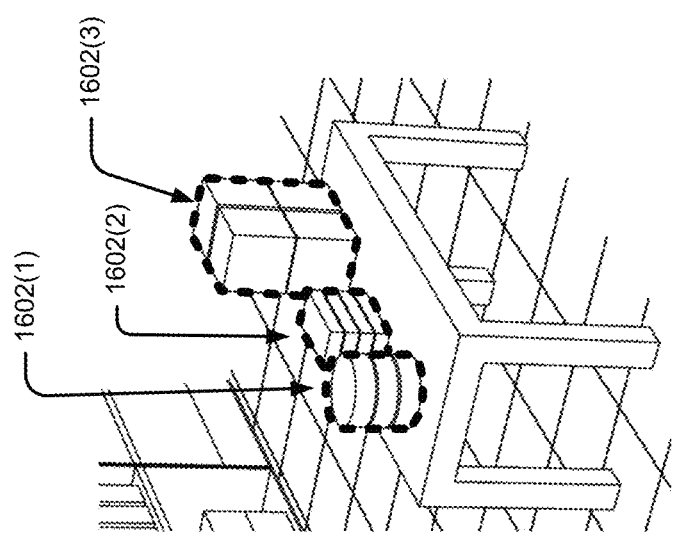
FIG. 16 illustrates example convex hulls of respective product masks for determining a 3D product group.

At an operation 1406(2), the product-volume detection component 1112 may compute convex hulls of the product masks. FIG. 16, for instance, illustrates three example convex hulls 1602(1), 1602(2), and 1602(3) that the product-volume detection component 1112 may compute using respective product masks for these products. Each convex hull may comprise a 2D polygon of the product mask in the respective image data.

Figure 17:
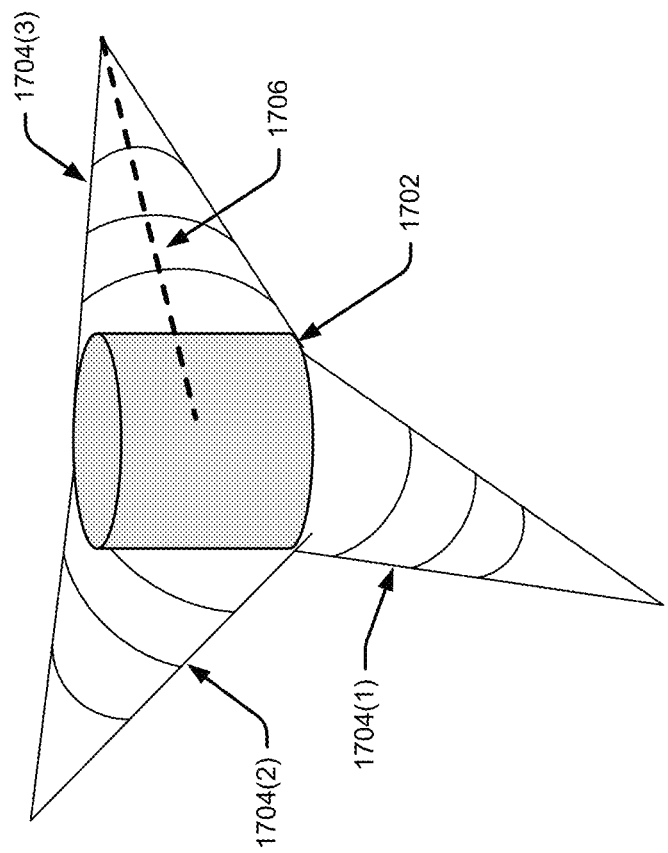
FIG. 17 illustrates an example convex visual hull that may be generated by casting optical rays towards an example visual hull from FIG. 16 from respective perspectives of different cameras in the environment.

At an operation 1406(3), the product-volume detection component 1112 may compute convex visual hulls using the convex hulls and the calibration data 1116 indicating the location data of the cameras that have generated image data that includes the particular product(s). In some instances, the convex visual hulls comprise a 3D volume of the product(s). FIG. 17, for instance, illustrates an example convex visual hull 1702 corresponding to one of the convex hulls 1602(1) illustrated in FIG. 16. As is known, the convex visual hull 1702 may be generated by casting rays from a location of each camera towards the convex hull, with each of these sets of rays defining a viewing cone. For instance, FIG. 17 illustrates example viewing cones 1704(1), 1704(2), and 1704(3) in the example of three cameras having a vantage point of this object. In each case, the apex of the respective viewing cone corresponds to the optical center of the respective camera and its generator lines represent the optical rays passing through the mask contour points (also known as viewing lines, such as example viewing line 1706). If the product mask represents a polygon, then the sides of the cones are 3D triangles passing through the segments of the polygon. Given the masks of a particular product or other object in multiple views, the convex visual hull 1702 of the product or other object is the intersection of each of the viewing cones 1704.

In some instances, there are at least two algorithms for computing a convex visual hull 1702, known as 3D polyhedron intersection and voxel reprojection, respectively. 3D polyhedron intersection may generate a highly accurate 3D mesh, but may be computationally expensive. Voxel reprojection, meanwhile, comprises re-projecting the voxels of a discretized 3D volume in the images and keeping those points which fall in each of the masks in each view. This operation, however, may be computationally slow and, and thus, a hybrid approach may be used in some instances. Here, a slice of a visual hull by a plane can be computed by polygon intersection. Further, each of the viewing cones may be intersected by the pane, resulting in polygons in this plane that may be used to determine a polygonal description of the intersection of the visual hull with the plane. Horizontal plans with predefined spacing may be used and the polygons may be combined to generate the convex visual hulls, such as the example convex visual hull 1702. Thus, this operation is a hybrid of multiple approaches in that it is discretized in one direction (the plane's normal direction) but exact (resulting in a polygon) in the other two directions (in the planes themselves).

Next, an operation 1406(4) represents finding visible faces of the convex visual hulls, deducing visible vertices, and computing bottom points of the products. To being, the convex visual hull 1702 may represent an overestimate of the actual volume of the product or other object in instances where the cameras 122 each reside above the product, resulting in each computed convex visual hull extending below the respective product. Thus, the bottom point of the object (in the "Z" direction), which may be used for determining the grouping of products, might not be highly accurate. Nevertheless, a much more accurate $Z_{min}$ may be determined for each convex visual hull, as descried immediately below.

To begin, an assumption may be made that the product is resting on a planar surface (corresponding to the bottom face or surface of the product) and that the cameras 122 are located above the surface. In addition, it is noted that the bottom curve is an occluding edge such that whenever a part of it is visible in a camera view then it belongs to the silhouette of the product in that view. Thus, whenever two views include a common portion of the bottom curve of the product, then this common portion generates an edge in the convex visual hull. Furthermore, a criterion may be used by the product-volume detection component 1112 to determine whether an edge of the convex visual hull may corresponding to the bottom curve, based on the face's visibility from the cameras 122. The faces of the convex visual hull may be classified into two sets: those that are visible from at least one view (normal pointing towards the camera optical center) and the ones that are invisible in each of the views. The last case corresponds to a fact generated by some plane of a viewing cone, whose normal is orthogonal to the viewing direction of the corresponding camera, but which is pointing away from each other camera. Thus, a product or other object is imaged by multiple cameras 122 from above, each of the faces below the bottom curve are invisible. Thus, if some part of the bottom curve is visible by at least two of the cameras then the minimum "Z" of the vertices of the visible faces provides an estimate of the lowest point of the product. If no portion of the bottom curve is visible in two views, meanwhile, then minimum "Z" may be overestimated.

At an operation 1406(5), the product-volume detection component 1112 may generate a product adjacency graph. At this stage, the product-volume detection component 1112 may store a 3D volume and minimum "Z" value for each product. In addition, each convex visual hull may be analyzed to determine a maximum "Z" value for each product (comprising a maximum "Z" of the vertices of the respective convex visual hull). In some instances, the $Z_{max}$ may comprise an overestimate. The operation 1406(5) then builds an adjacency graph according to the following rules: two product (A and B) are neighbors in the graph if: (i) these hulls overlap sufficiently in their respective "z" values (e.g., $\min(z_{max}(A), z_{max}(B)) - \min z_{min}(A), z_{min}(B)) >$ overlap threshold, and (ii) the distance (e.g., in 2D) between the two visual hulls are less than a distance threshold.

At an operation 1406(6), the product-volume detection component 1112 may cluster the products using the adjacency graph to determine one or more 3D product groups 1502. As noted above, a 3D product group may comprise a group of products that are adjacent to one another and rest on the same surface (e.g., a shelf or table) or hang from the same hook or on a hook at a common vertical elevation from the floor. Therefore, for products resting on a surface, each product having a $Z_{min}$ that is within a threshold value of $Z_{mins}$ associated with other adjacent products may be deemed to be part of a common 3D group. For hanging products, each product's $Z_{max}$ may be analyzed to make this determination. Further, and as noted above, in some instances a shelf may include a sensor residing along a known plane. In these instances, the coordinates of this plane may be used to identify products having $Z_{min}$ values corresponding to the Z value of the plane and, thus, the 3D groups may be determined using this information.

Figure 18:
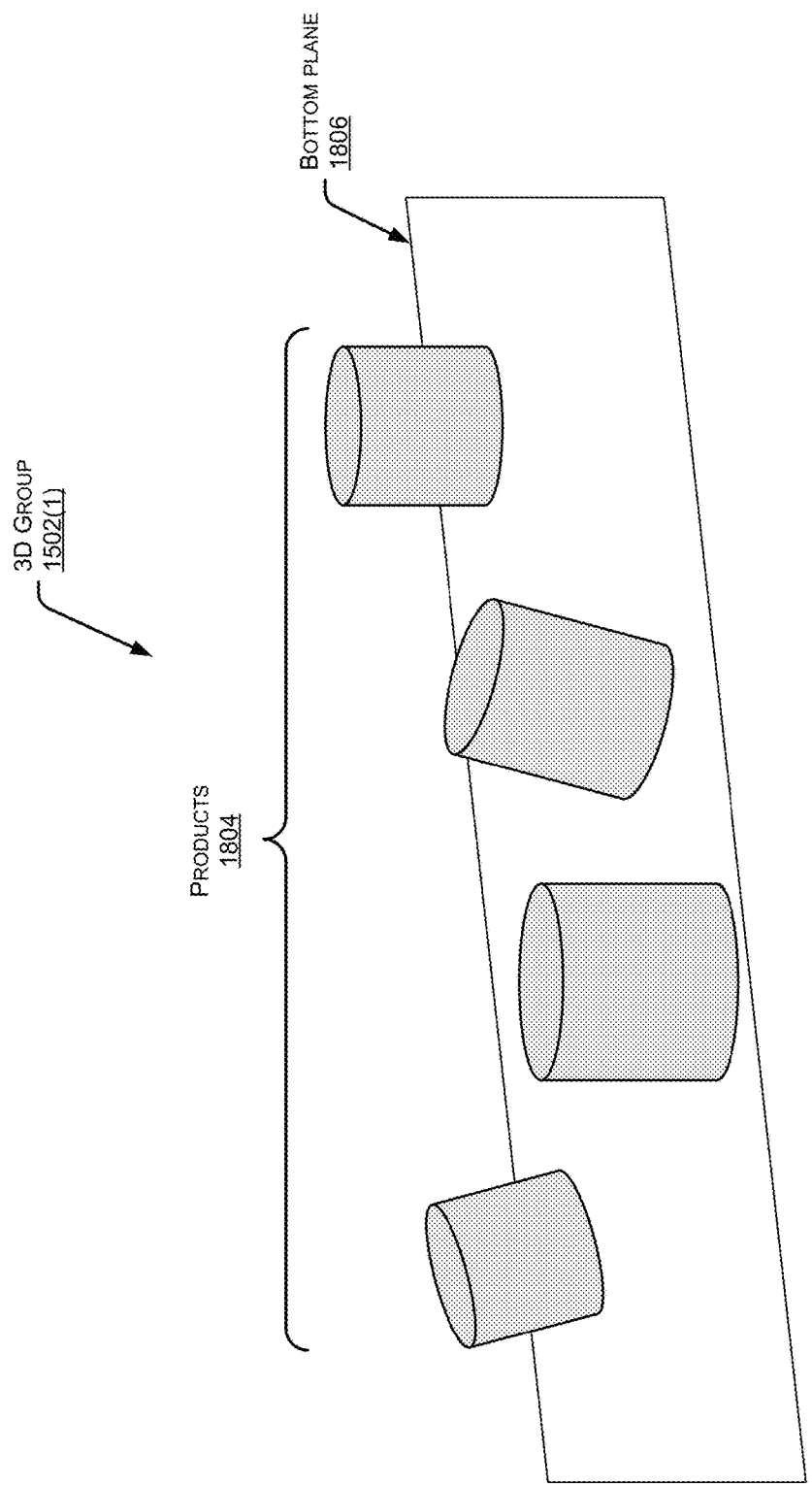
FIG. 18 illustrates an example 3D product group that may be determined using the example sequence of operations of FIG. 15, as well as a plane that has been fitted to bottom points of the products of the 3D group.

FIG. 18 illustrates an example 3D group 1502(1) of multiple products 1804. As illustrated, each of the convex visual hulls of the respective products is associated with the a $Z_{min}$ value that within a threshold value of one another and/or within a threshold value of a common bottom plane 1806. In either instance, each product may be grouped into the 3D group 1502(1) and associated with the Z value of the bottom plane 1806.

Figure 19:
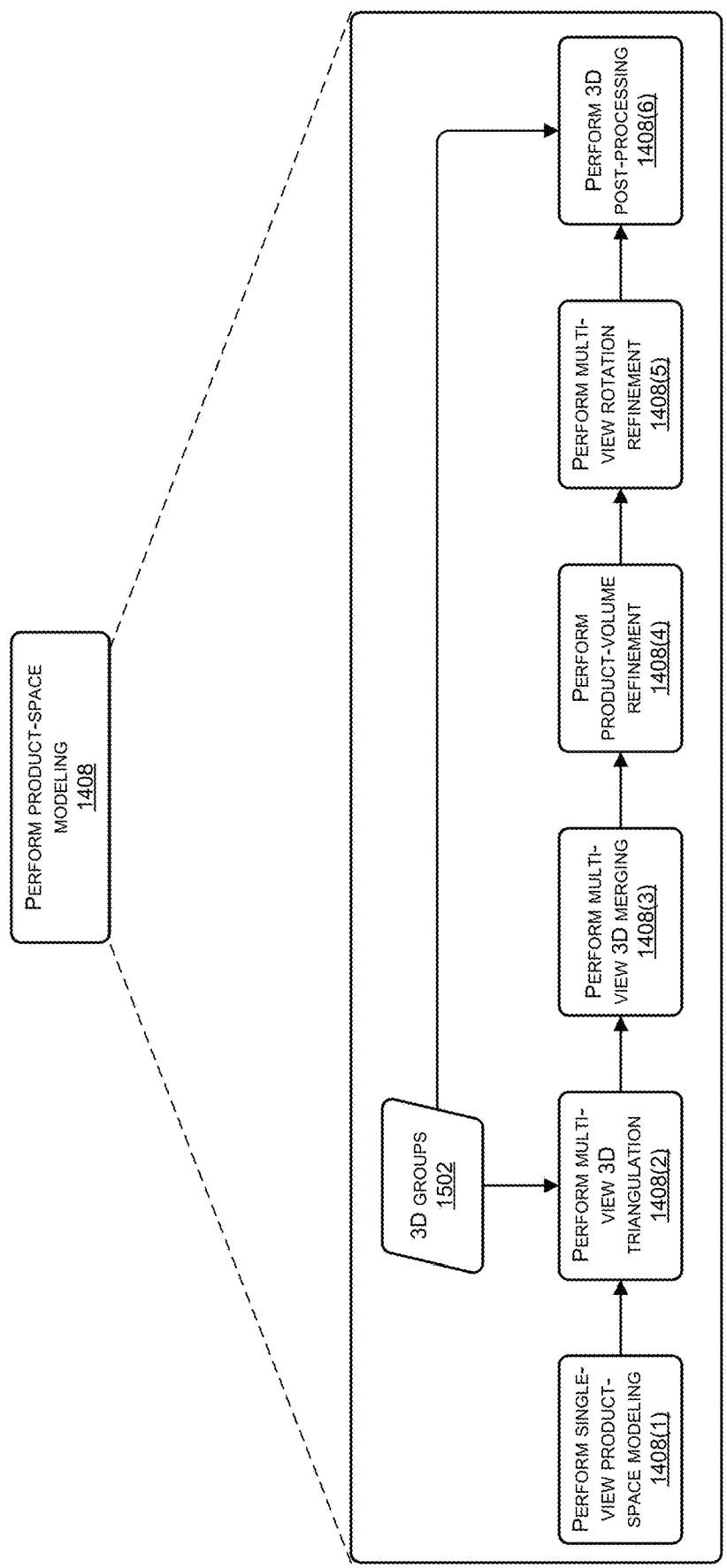
FIG. 19 illustrates an example sequence of operations for performing the operation of performing product-space modeling from the sequence of operations illustrated in FIG. 14. As illustrated, the operations for performing product-space modeling include performing single-view product-space modeling, performing multi-view 3D triangulation, performing multi-view 3D merging, performing product volume refinement, performing multi-view rotation refinement, and performing 3D post-processing.

FIG. 19 illustrates an example sequence of operations for performing the operation 1408 of performing product-space modeling from the sequence of operations illustrated in FIG. 14. To begin, this operation 1408(1) includes, at performing single-view product space modeling. Performing single-view product space modeling may first include determining, for each of multiple product masks that have been determined to correspond to one another, a 2D projection of a 3D bounding box of the product mask. To do so, the product-volume detection component may first determine a merchandising volume associated with a fixture on which the product(s) associated with the product mask reside and may cast six rays from the three directions defined by the merchandising volume. That is, the merchandising volume may define a cuboid whose faces define X-Y-Z directions. The product-volume detection component may cast, in 2D, two rays in a direction determined from each of the respective three directions to determine a respective vanishing point at which the two rays intersect. This may result in three vanishing points.

Figure 20:
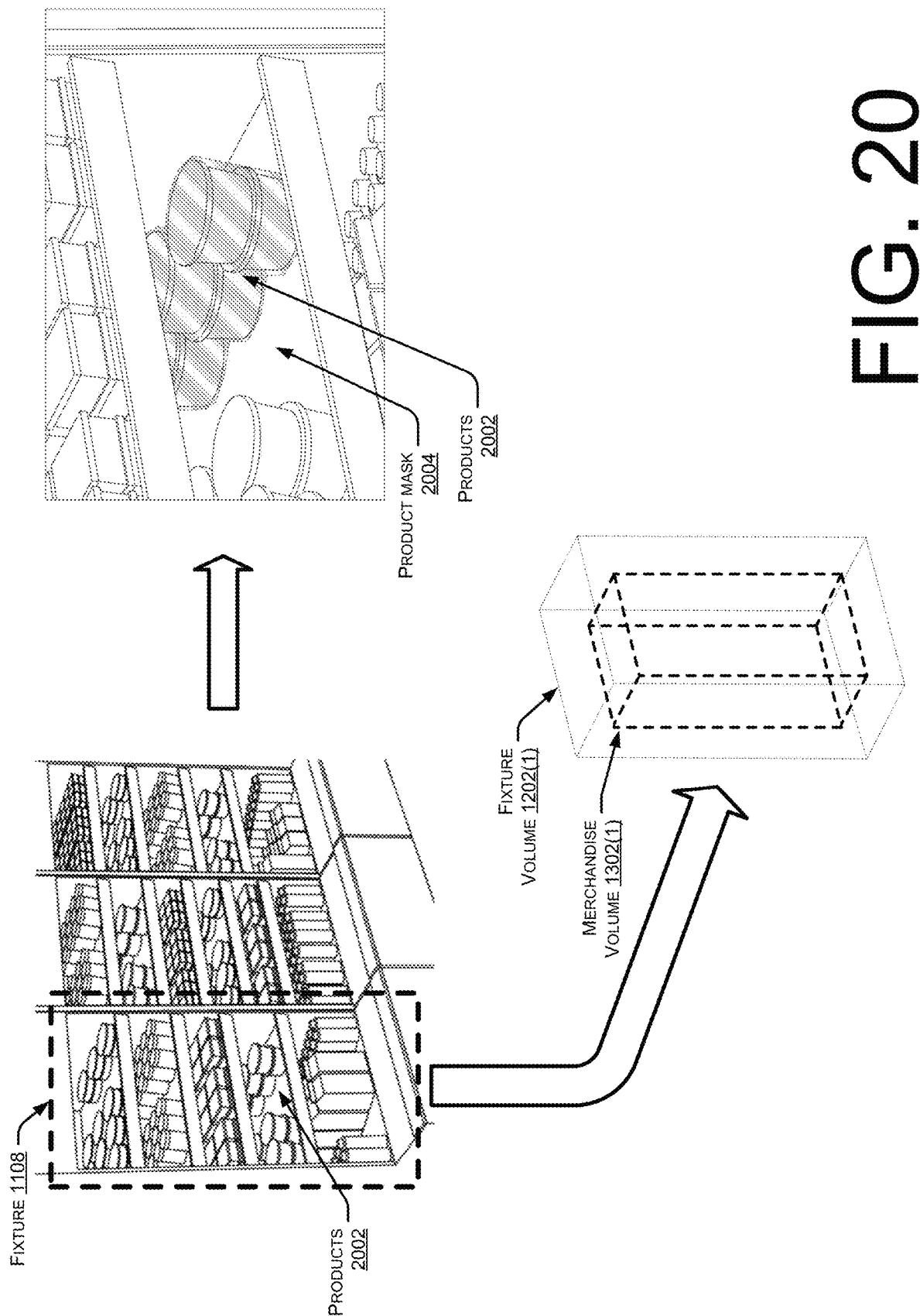
FIG. 20 illustrates inputs that may be used for performing single-view product-space modeling, such as a merchandising volume and a product mask.

FIG. 20, for instance, illustrates an example merchandise volume 1302(1) (within an example fixture volume 1202(1)) that is associated with an example fixture 1108 that holds multiple lanes of products. For ease of discussion, the single-view product space modeling will be described with reference to example products 2002, associated with a product mask 2004 in this view, although it is to be appreciated that this operation may occur for each lane of products on the shelf and on other shelves of the fixture 1108.

Figure 21:
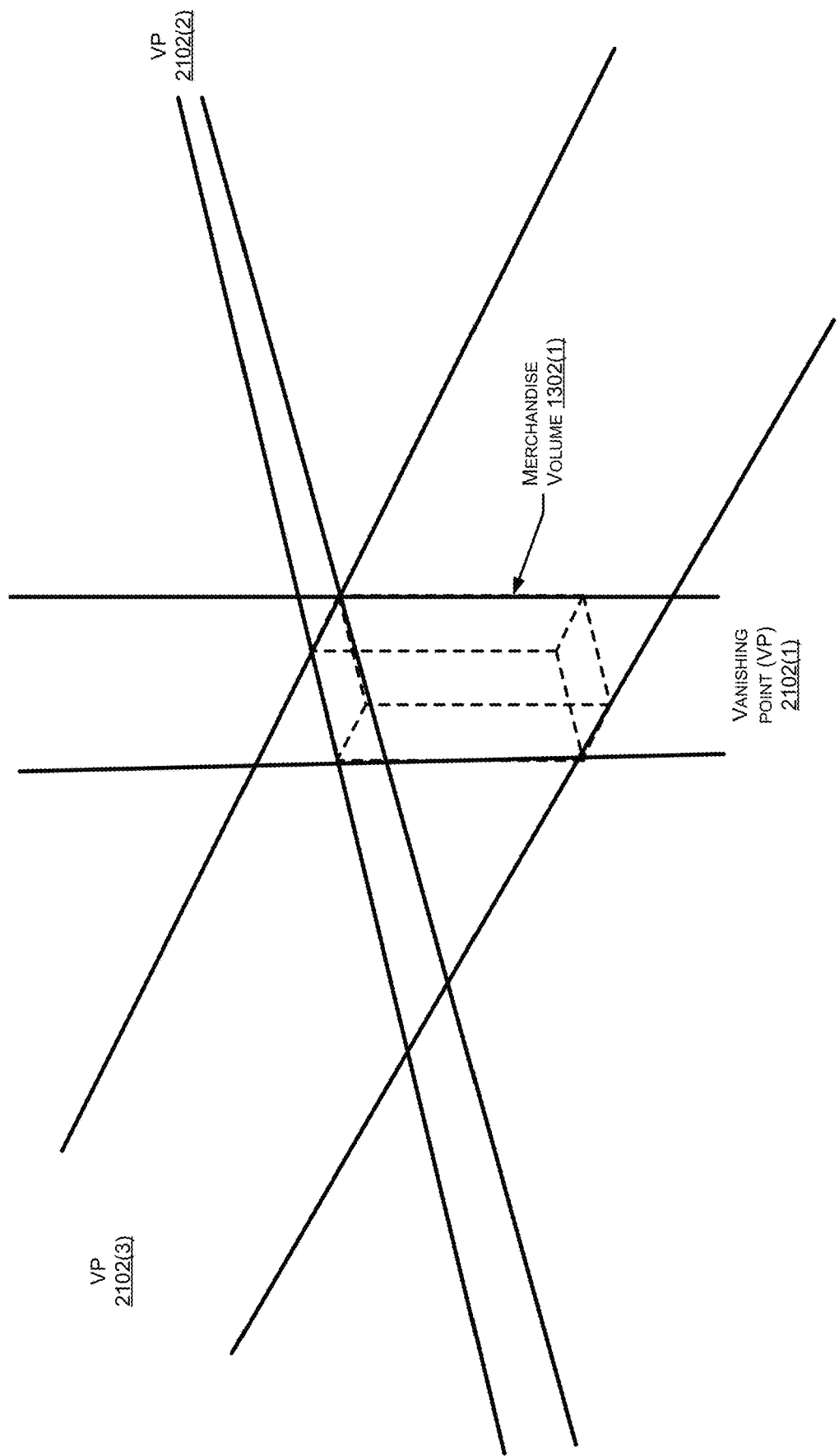
FIG. 21 illustrates determining three vanishing points by casting six rays in three directions defined by the merchandising volume of FIG. 20.

FIG. 21 illustrates determining three example vanishing points 2102(1), 2102(2), and 2102(3) by casting six rays in three directions defined by the merchandising volume 1302(1) of FIG. 20. That is, the merchandising volume 1302(1) includes three sets of parallel faces (front/back, top/bottom, and left/right), and these sets may define three directions within the view of the image data. The product-volume detection component 1112 may cast rays that are tangent to these faces and in these three directions in order to determine where each of the two sets of lines intersect, each of which may comprise a respective vanishing point. It is to be appreciated that "casting rays" to determine the three vanishing points may comprise the product-volume detection component 1112 computing the lines and using these computations to compute the intersection of each of the three sets of lines to determine these vanishing points.

Figure 22:
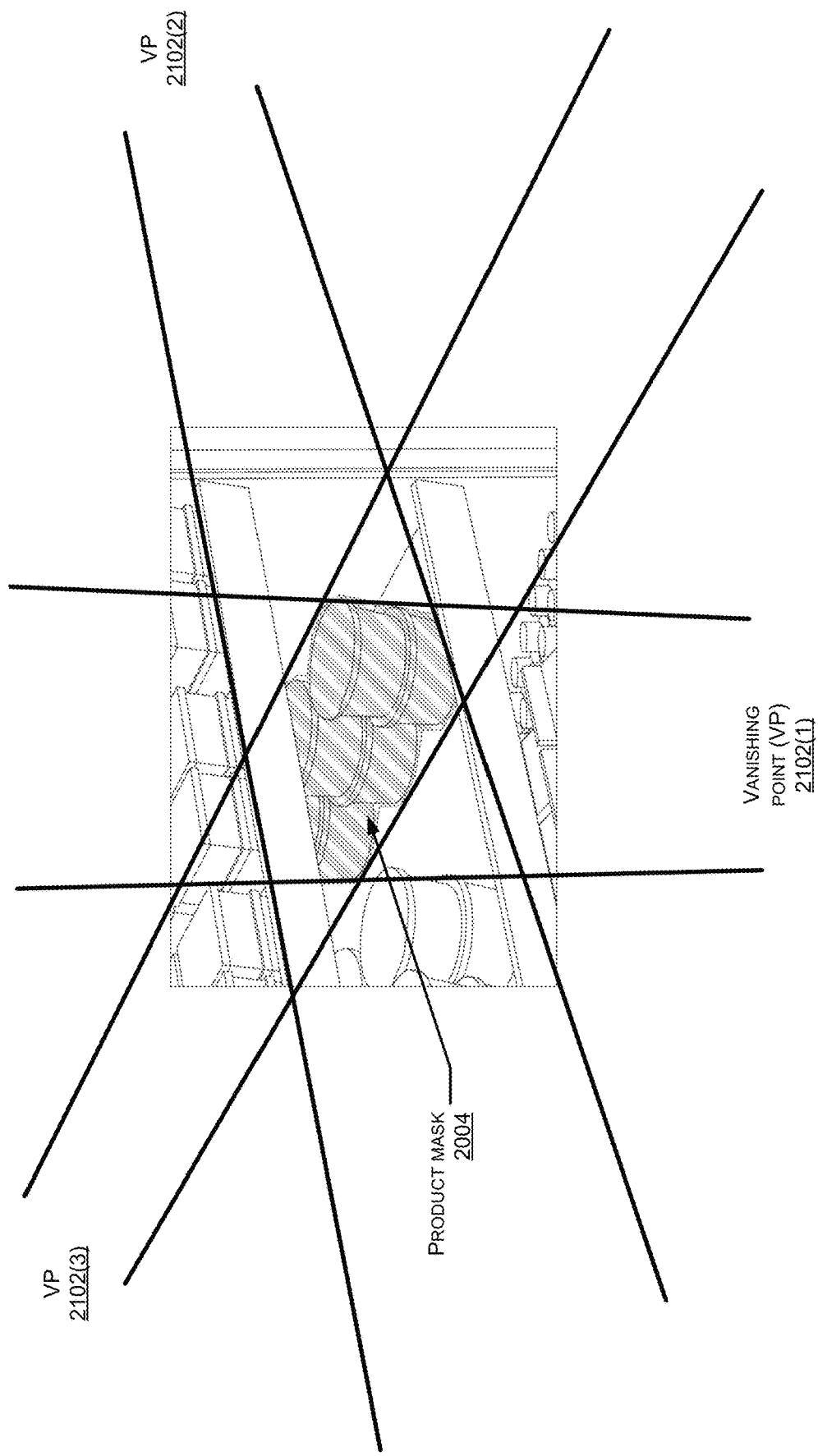
FIG. 22 illustrates casting rays from the determined vanishing points towards tangent lines of the example product mask from FIG. 20 and residing within the merchandising volume of FIG. 21.
Figure 23:
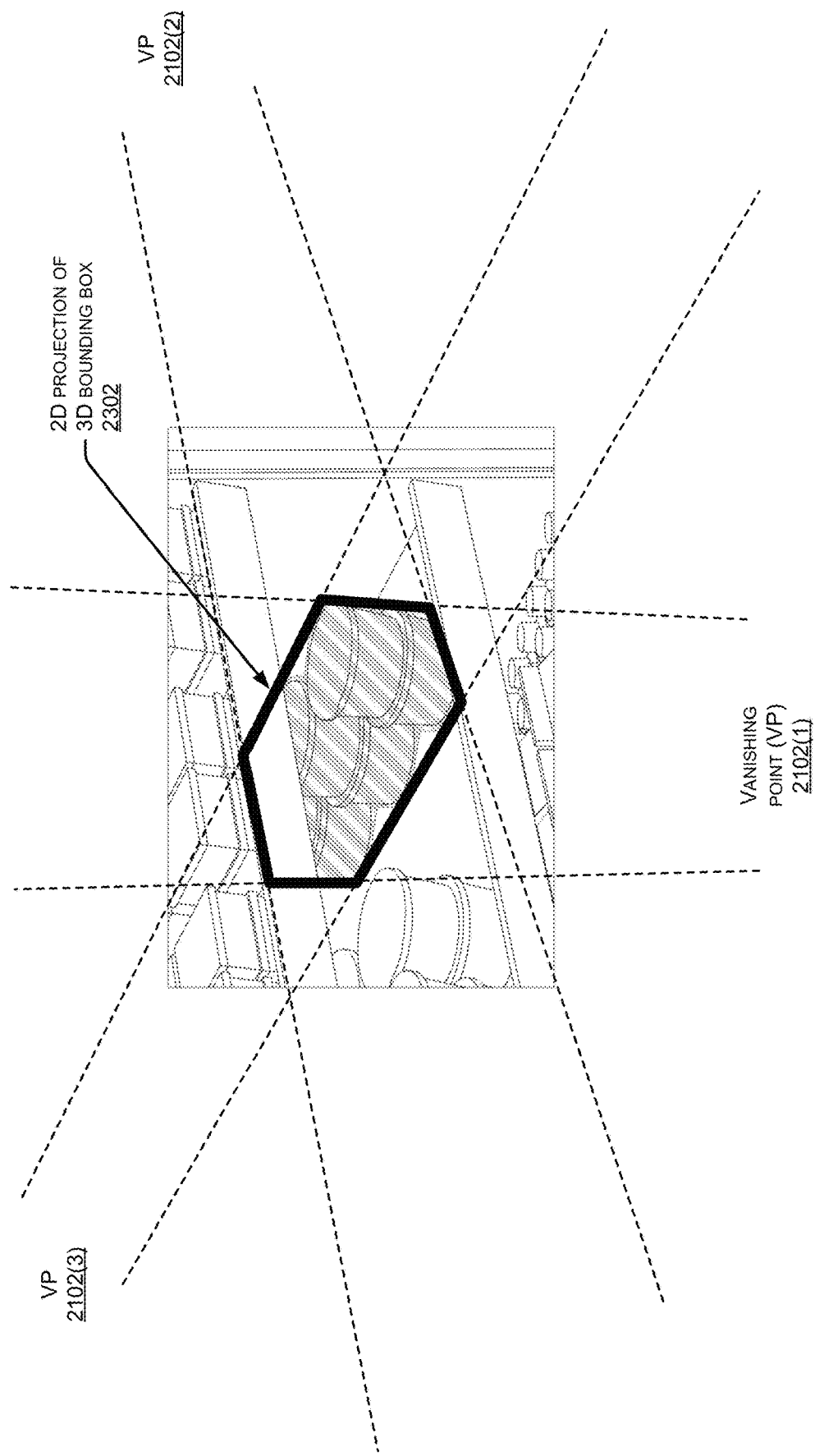
FIG. 23 illustrates that the intersection of the rays casted in FIG. 22 may define a portion of the image data representing the products of the product mask, which may be deemed a two-dimensional (2D) projection of a 3D bounding box of the products.
Figure 24:
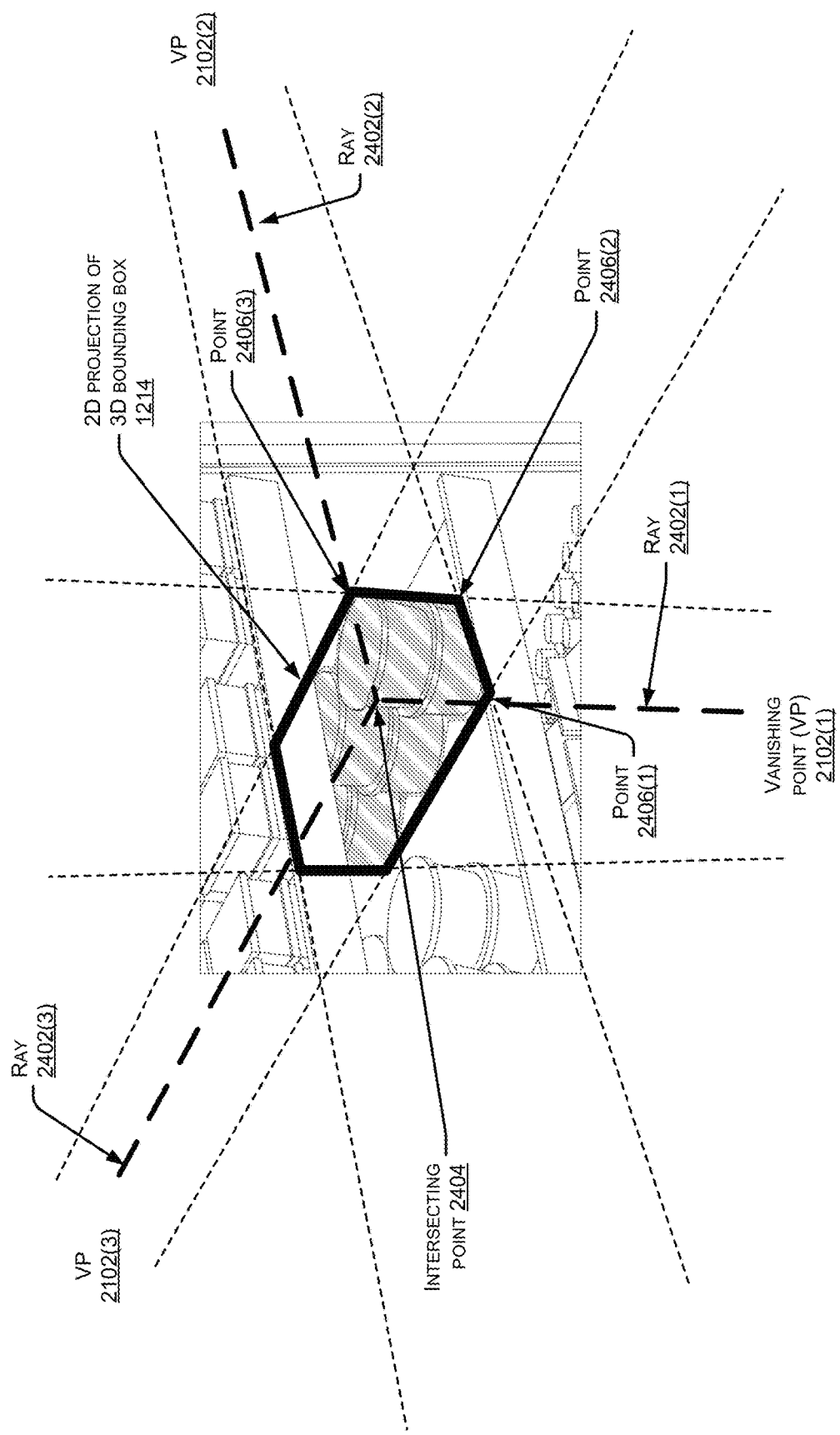
FIG. 24 illustrates casting respective rays from the three vanishing points to a point where these rays intersect within the 2D projection of the 3D bounding box determined from FIG. 23.
Figure 25:
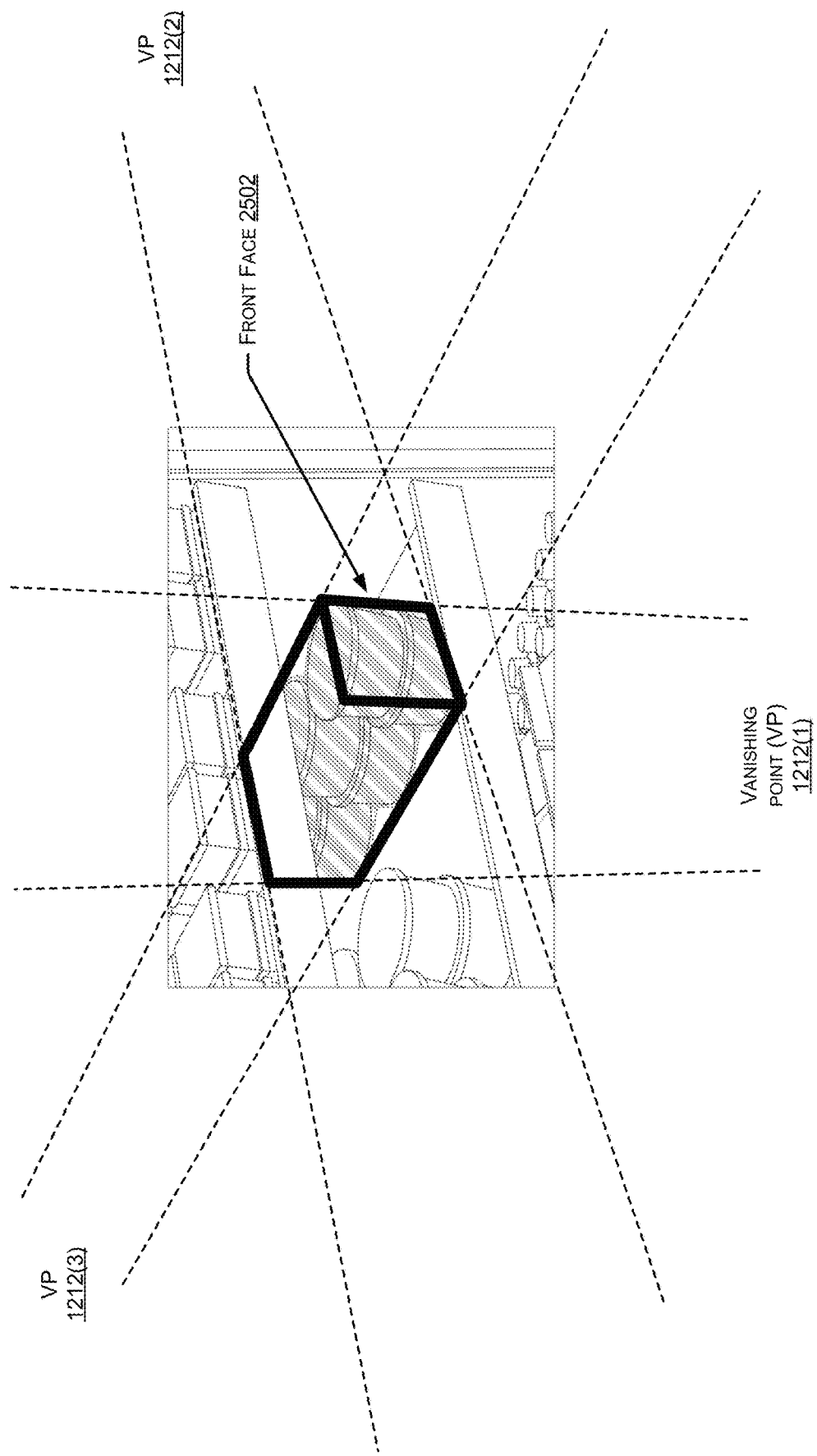
FIG. 25 illustrates using the point determine at FIG. 23 and three additional points from the 2D projection of the 3D bounding box to determine a front face of the 2D projection of the 3D bounding box.

FIG. 22 illustrates that the product-volume detection component 1112 may thereafter cast two rays from each of these respective vanishing points 2102(1), 2012(2), and 2102(3) as tangent lines to the product mask 2004 that resides within the merchandising volume 1302(1). FIG. 23 illustrates that the intersection of these six tangent lines may define a contour representing a 2D projection of the 3D bounding box 2302. FIG. 24 illustrates that after determining this 2D projection 2302, the product-volume detection component 1112 may also cast a respective ray 2402(1), 2402(2), and 2402(3) from each respective vanishing point 2102(1), 2102(2), and 2102(3) to a point 2404 that is within the contour defining the 2D projection 2302 and at which each of these three rays intersect with one another. This point, along with three points 2406(1), 2406(2), and 2406(3) from the determined contour, may be used to define a particular face of a bounding box generated from the 2D projection, such as a top face or a bottom face. FIG. 25, for instance, illustrates, that the intersecting point 2404 and the three points 2406(1), 2406(2), and 2406(3) may define a front face 2502. This face 2502 and the 2D projection of the 3D bounding box 2302 may be used to generate a bounding box that generally encapsulates the products associated with the product mask.

Returning to FIG. 19, an operation 1408(2) comprises performing multi-view 3D triangulation. This operation 1408(2) may first include determining a predefined point on each of the resulting bounding boxes determined from performing single-view product space modeling on a product mask determined from different images.

Figure 26:
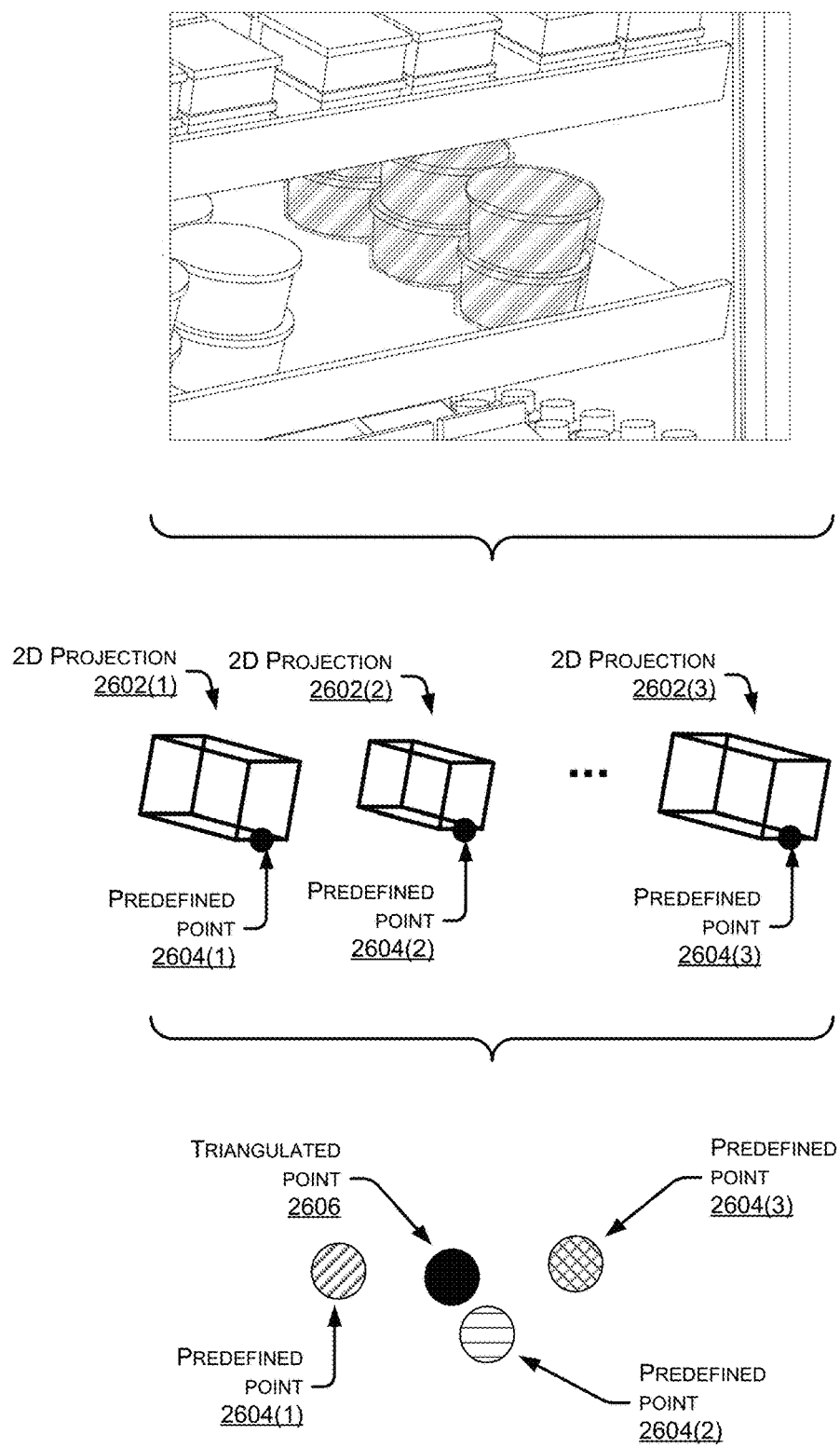
FIG. 26 represents an example of performing multi-view 3D triangulation. As illustrated, this figure includes three example different 2D projections of a 3D bounding box for a particular product mask determined from different respective cameras. As illustrated, a predefined point may be determined for each 2D projection of the 3D bounding box, such as a bottom, middle point of the front face.

FIG. 26 represents an example of performing multi-view 3D triangulation. As illustrated, this figure includes three example different 2D projections of a 3D bounding box for a particular product mask determined from different respective cameras. As illustrated, a predefined point 2604(1), 2604(2), and 2604(3) may be determined for each 2D projection of the 3D bounding box 2602(1), 2602(2), and 2602(3), respectively. This predefined point may comprise a bottom, middle point of the front face. For instance, if the bounding boxes represent products residing on a shelf, the predefined point may represent a point that is on the front face of the bounding box and is at the bottom of the front face in the Y direction and is centered on the front face in the X direction. For products residing on a hook, the predefined point may comprise a point that is on the front face, at a top of the front face in the Y direction, and centered on the front face in the X direction. For products on a table, this predefined point may comprise a point that is on a top face, at a front of the top face in the Y direction, and centered on the top face in the X direction. Of course, while a few examples are described, any other predefined point may be used.

After determining the predefined point in each bounding box 2602(1), 2602(2), and 2602(3), the product-volume detection component 1112 may determine a value of a triangulated point 2606 using the respective values of these predefined points 2604(1), 2604(2), and 2604(3) (using the example of three bounding boxes). For instance, the value of the triangulated point may comprise an average of the respective values (in X-Y-Z) of the predefined points of the bounding boxes.

Figure 27:
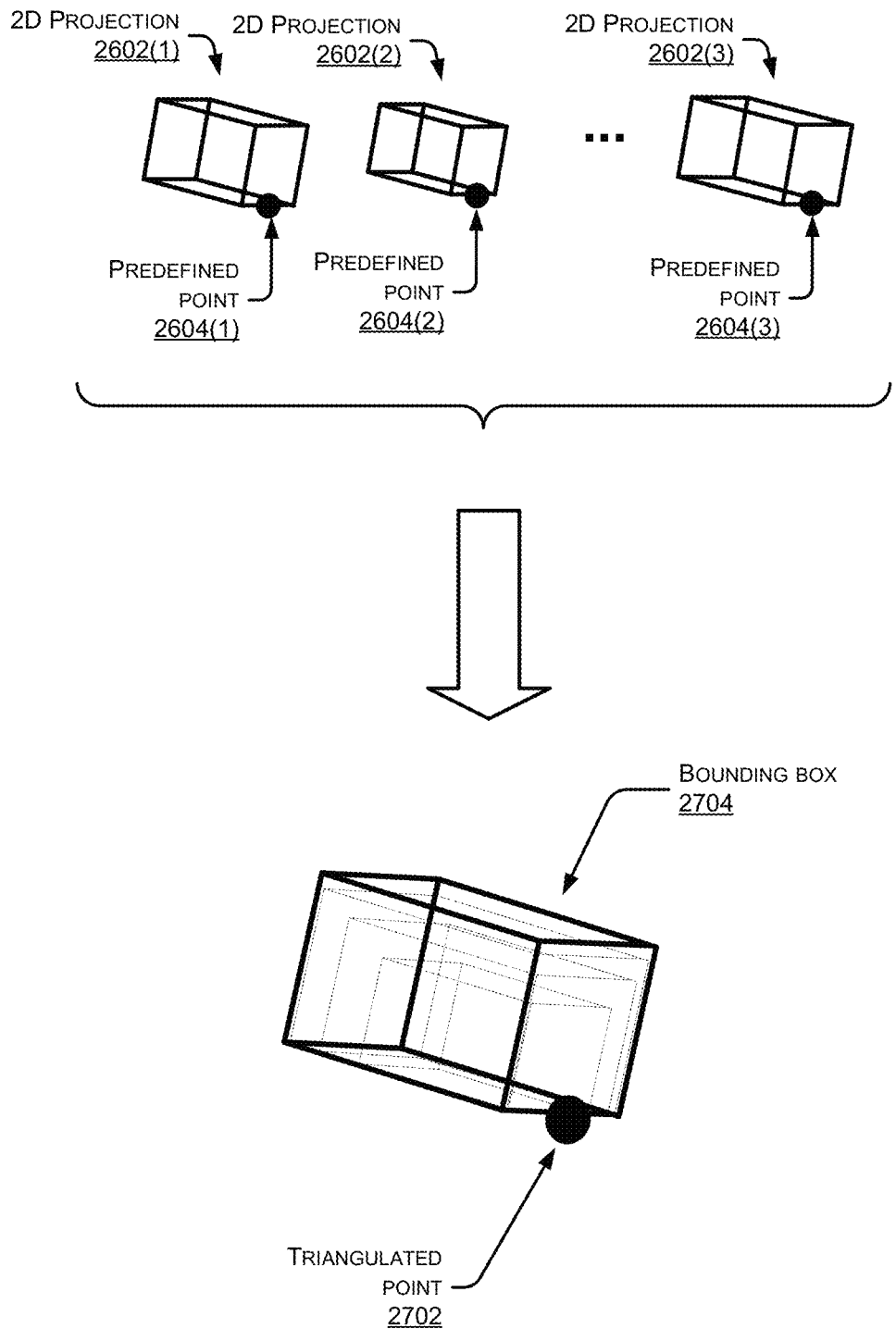
FIG. 27 illustrates an example of performing multi-view 3D merging. As illustrated, this figure includes determining a triangulated point using the three examples predefined points determined at FIG. 26. After determining the triangulated point, the three example 2D projections may be aligned about the triangulated point and a bounding box that most tightly encapsulates all three example 2D projections.

Returning to FIG. 19, after determining the triangulated point 2606, an operation 1408(3) represents the product-volume detection component 1112 performing multi-view 3D merging. FIG. 27, for instance, illustrates an example of performing multi-view 3D merging. As illustrated, after determining the triangulated point 2606, the three example 2D projections 2602(1), 2602(2), and 2602(3) may be aligned about the triangulated point 2606. In addition, the product-volume detection component 1112 may compute coordinates of a bounding box 2704 that most tightly encapsulates all three example 2D projections 2602(1), 2602(2), and 2602(3). That is, the product-volume detection component 1112 may determine a cuboid that most tightly encapsulates each of the "n" number of bounding boxes aligned about the triangulated point 2606. The product-volume detection component 1112 may then store an indication of this bounding box 2704 (e.g., by storing the X-Y-Z coordinates of the bounding box 2704).

Returning to FIG. 19, an operation 1408(4) comprises performing product-volume refinement in order to, potentially, generate a refined bounding box that more tightly encapsulates the products associated with the bounding box. For instance, the product-volume detection component 1112 may alter coordinates associated with each of the six faces of the bounding box determined via the operation 1408(3), such as the bounding box 2704, to determine whether these faces can be altered without overlapping the product mask of the product(s) associated with the bounding box 2704. For instance, the product-volume detection component 1112 may project the bounding box 2702 determined as part of multi-view merging on each image data from which the product mask was determined. For instance, if first image data generated by a first camera 122(*a*) was used to determine a first product mask and second image data generated by a second camera 122(*b*) was used to determine a second product mask, the product-volume detection component 1112 may project the bounding box onto the first and second image data. The product-volume detection component 1112 may then determine whether a face of the current bounding box already overlaps a product mask in one or both of the first and second image data. If so, then the product-volume detection component 1112 may move the face outwards until the face no longer overlaps the mask in either image data. That is, the product-volume detection component 1112 may stop movement of the face as soon as the face does not overlap the product mask in any view.

If, however, the initial bounding box does not overlap the product mask in any view, then the product-volume detection component 1112 may move the face inwards in each view until the face touches the product mask in any view. The product-volume detection component 1112 may then perform this process for each of the six faces of the bounding box 2704 to determine a refined bounding box that comprises a cuboid that most tightly encloses the product masks in each view. As will be appreciated, determining this bounding box may comprise storing an indication of 3D coordinates of the bounding box. Further, moving a face of the bounding box may comprise altering 3D coordinates of a plane of the bounding box corresponding to the current face being analyzed.

Figure 28:
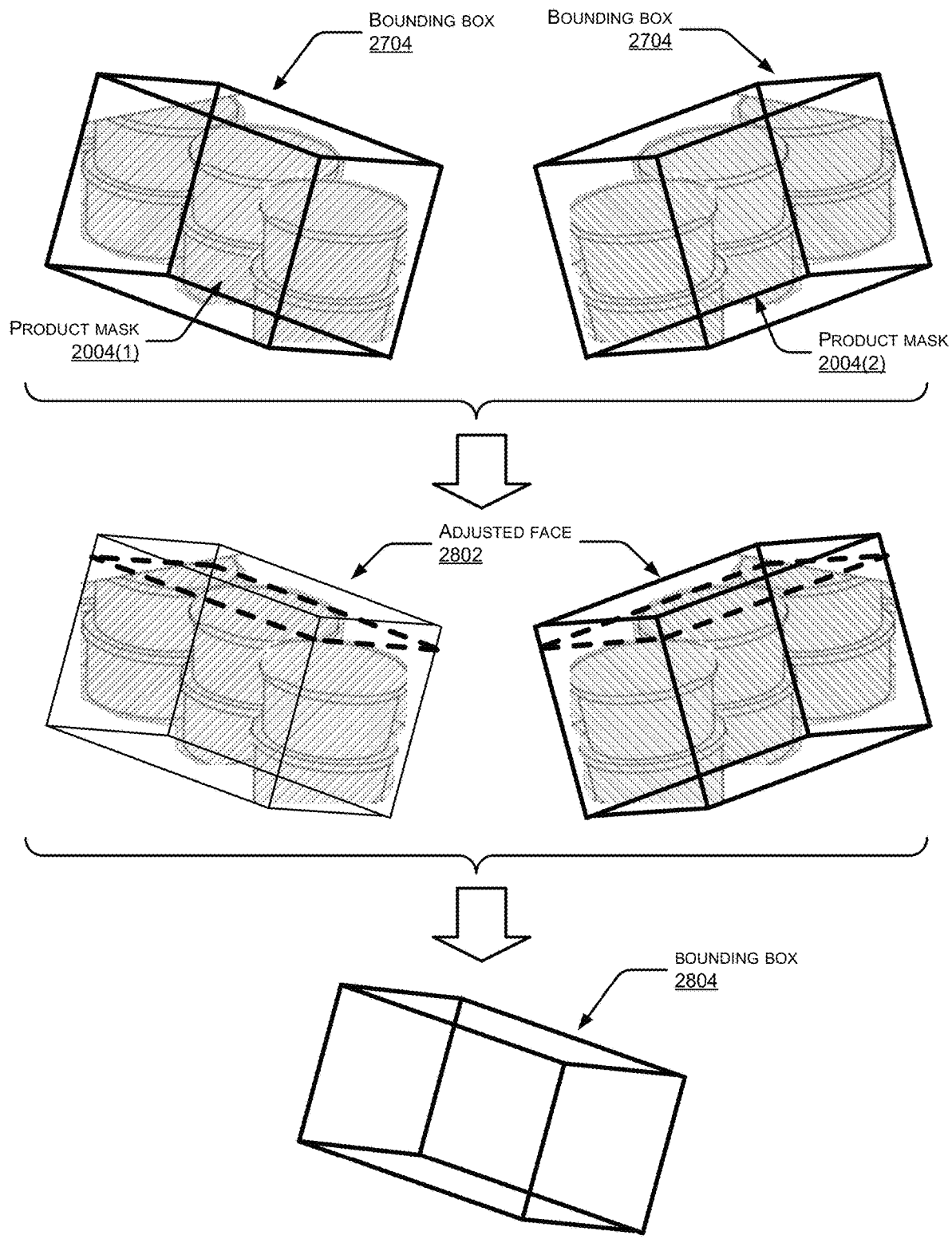
FIG. 28 illustrates an example of performing product-volume refinement. As illustrated, this figure includes adjusting each of the six faces of the bounding box determined at FIG. 27 from the perspective of each camera perspective until the corresponding face touches the corresponding product mask. As illustrated, this process may result a refined bounding box.

FIG. 28, for instance, illustrates, the product-volume detection component 1112 projecting the bounding box 2704 onto a first product mask 2004(1) determined based on first image data generated by a first camera 122(*a*) and onto second image data generated by a second camera 122(*b*). After doing so, the product-volume detection component 1112 attempts to adjust each of the six faces, one at time, in both of the projections. For instance, FIG. 28 illustrates the product-volume detection component 1112 adjusting inwardly an example face 2802.

If, prior to adjusting the respective face, the face already overlaps, or juts into, the product mask in one or more of the projections, then the product-volume detection component 1112 adjusts the face outwardly until it no longer overlaps any of the product masks. If, however, the face does not overlap or touch any of the product masks, then the product-volume detection component 1112 may adjust the face inwardly until it touches one of the product masks, at which point the product-volume detection component 1112 may proceed to attempt to adjust a subsequent face of the bounding box. After adjusting each fact such that it encapsulates the product masks as tightly as possible without overlapping or jutting into a product mask in any of the views, the product-volume detection component 1112 may store an indication of the refined bounding box 2804, representing a product volume.

Returning to FIG. 19, an operation 1408(5) represents performing multi-view rotation refinement. In some instances, the products associated with the particular product mask may reside on a platform or shelf having an angled bottom surface, such as a shelf that is higher in the back than in the front. In these instances, the product-volume detection component 1112 may perform the operation 1408(5) again, but after having rotated the initial bounding box (e.g., bounding box 2704) according to the angle of the platform. In some instances, as mentioned above, the platform may include a sensor (e.g., a load cell) that is associated with a known angle or plane in the environment. In these instances, the product-volume detection component 1112 may perform multi-view rotation refinement by performing the aforementioned rotation refinement after rotating the bounding box 2704. In some instances, multi-view rotation refinement may generate a bounding box that even more tightly encapsulates the product(s).

Finally, FIG. 19 illustrates that at an operation 1408(6) the product-volume detection component 1112 may perform one or more 3D post-processing techniques before storing the bounding box, and other bounding boxes associated with other product(s), as product volumes that collectively define the planogram data 1114. For instance, the product-volume detection component may use the determined 3D product groups 1502 to identify those bounding boxes associated with a common group. After doing so, the product-volume detection component may use determine a bottom (for shelf-based fixtures) or top (for hook-based fixtures) plane upon which these bounding boxes should be aligned. For instance, the product-volume detection component 1112 may determine that three bounding boxes are associated with a common group and that these products reside on a shelf. The product-volume detection component 1112 may then determine a median bottom plane by averaging the values of the bottom planes of the three bounding boxes and may set align these three bounding boxes along this median plane. In other instances, meanwhile, the product-volume detection component 1112 may determine a bottom plane of these three example bounding boxes by determining coordinates associated with a sensor that resides in the platform upon which the corresponding products reside.

In addition, the operation of 3D post-processing may include altering coordinates of the bounding box(es) to extend to a back surface of the merchandising volume 1302(1) within which the bounding boxes reside. For instance, if a particular refined bounding box ends before the back surface of the merchandising volume 1302(1), or extends beyond the back surface of the merchandising volume 1302(1), the coordinates of the back surface of the bounding box may be altered to correspond to the coordinates of the back surface of the merchandising volume 1302(1).

In addition, the 3D post-processing may include altering front faces of one or more bounding boxes similar to the altering of the back or bottom faces of these bounding boxes. For instance, the 3D post-processing may determine a median value of the front faces of the bounding boxes of a particular 3D group and may assign this median value as coordinates of the front face of each of the bounding boxes. In another example, the product-volume-detection component 1112 may alter (e.g., extend or retract) the value of each front face of the bounding boxes to correspond to the front face of the merchandising volume 1302(1).

In addition, the 3D post-processing step may include generating bounding boxes for empty spaces in the merchandising volume having a threshold size or expanding existing bounding boxes when the empty spaces are not of the threshold size. For instance, if a first bounding box associated with first product(s) is adjacent (e.g., bottom- or top-surface aligned) to a second bounding box associated with second product(s), the product-volume detection component 1112 may determine whether a distance between these bounding boxes is greater than a threshold distance. If not, then the product-volume detection component 1112 may alter one or both of the first and second bounding boxes to include this empty space. That is, the product-volume detection component 1112 may change the coordinates of one or both of the side faces of the bounding boxes that face the empty space so as to "stretch" these bounding boxes to include the empty space. If, however, the distance between the first and second bounding boxes is greater than the threshold distance, than the product-volume detection component 1112 may generate a new bounding box corresponding to the empty space. For instance, the created bounding box may be defined by coordinates corresponding to side faces that touch the side faces of the first and second bounding boxes, a bottom and front face that corresponds, respectively, to the aligned bottom and front faces of the first and second bounding boxes, a top face that is based on one or both of the first or second bounding boxes (and/or the merchandising volume 1302(1)), and a back face that is defined by the back surfaces of the merchandising volume 1302(1).

Figure 29:
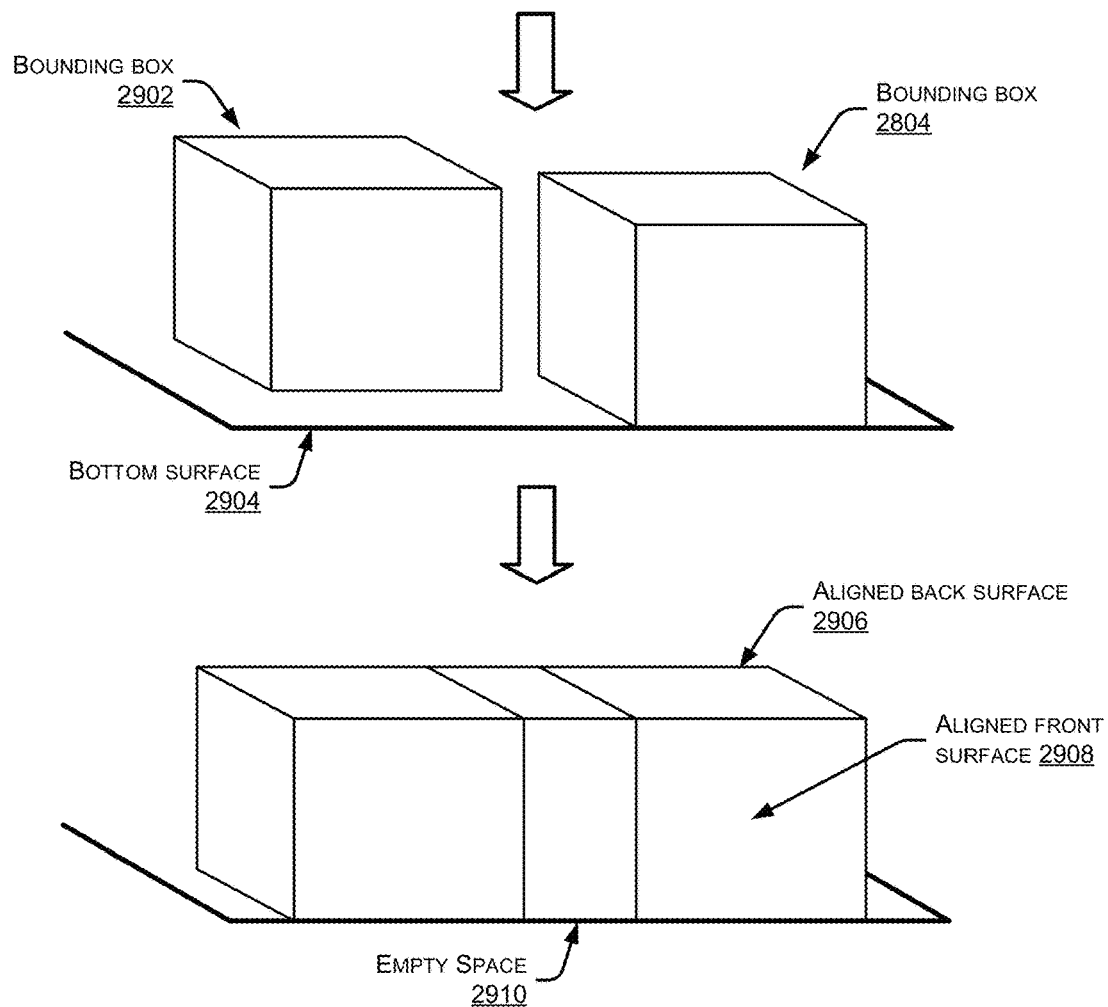
FIG. 29 illustrates performing 3D post-processing on the refined bounding box of FIG. 28 and one or more other bounding boxes. As illustrated, the post-processing may include aligning multiple bounding boxes associated with a common 3D product group on a bottom surface, aligning front surfaces of the multiple bounding boxes, generating respective bounding boxes of any empty spaces, stretching bounding boxes to a back of the merchandising volume, and/or performing other post-processing techniques.

FIG. 29, for instance, illustrates an example performing 3D post-processing on the refined bounding box 2804 and one or more other bounding boxes. As illustrated, the post-processing may include aligning multiple bounding boxes, including the bounding box 2804, that are associated with a common 3D product group on a bottom surface, aligning front surfaces of the multiple bounding boxes, generating respective bounding boxes of any empty spaces, stretching bounding boxes to a back of the merchandising volume, and/or performing other post-processing techniques. For instance, FIG. 29 illustrates determining that the bounding box 2804 (associated with the product mask 2004) and another bounding box 2902 (associated with an adjacent set of products) are associated with a common 3D product group. As such, the product-volume-detection component 1112 may align each of these bounding boxes with a bottom surface 1904, which may be based on coordinates of a sensor, an average of bottom-surface coordinates of bounding boxes of the 3D group, or the like.

In addition, the product-volume-detection component 1112 may expand or contract each back surface of the bounding box to correspond to back surface of the merchandising volume 1302(1). In addition, the product-volume-detection component 1112 may align the front faces of the bounding boxes of the 3D group together, as illustrated via aligned front face 2908. As described above, this may comprise an average front face of the bounding boxes of the 3D group, a front plane of the corresponding merchandising volume 1302(1), a front plane associated with bounding box associated with a sensor residing in or adjacent to the shelf on which the products sit, or the like. FIG. 29 further illustrates that the product-volume-detection component 1112 may determine that the distance between the bounding box 2902 and the bounding box 2804 is greater than a threshold distance and, thus, the product-volume-detection component 1112 may generate a bounding box 2910 corresponding to this empty space. Thus, the planogram data may store this product volume in association with an indication that this area is empty and not associated with a product.

In addition to aligning the back, front, and/or bottom faces of the bounding boxes, the product-volume detection component 1112 may align the top and/or side faces. For example, the product-volume detection component 1112 may align the outer two bounding boxes on a shelf with the merchandising volume or a bounding box associated with the a sensor residing on, in, or under the platform on which the bottom faces of these bounding boxes sit. In some instances, these exterior bounding boxes, such example bounding boxes 2804 and 2902, may effectively be "stretched" to align with the sides of the merchandising volume or the bounding box associated with the underlying sensor. The top faces, meanwhile, may or not may be aligned with one another. If aligned, the aligned top faces may correspond to the top of the merchandising volume, the top of the bounding box associated with the sensor, or the like.

Figure 30A:
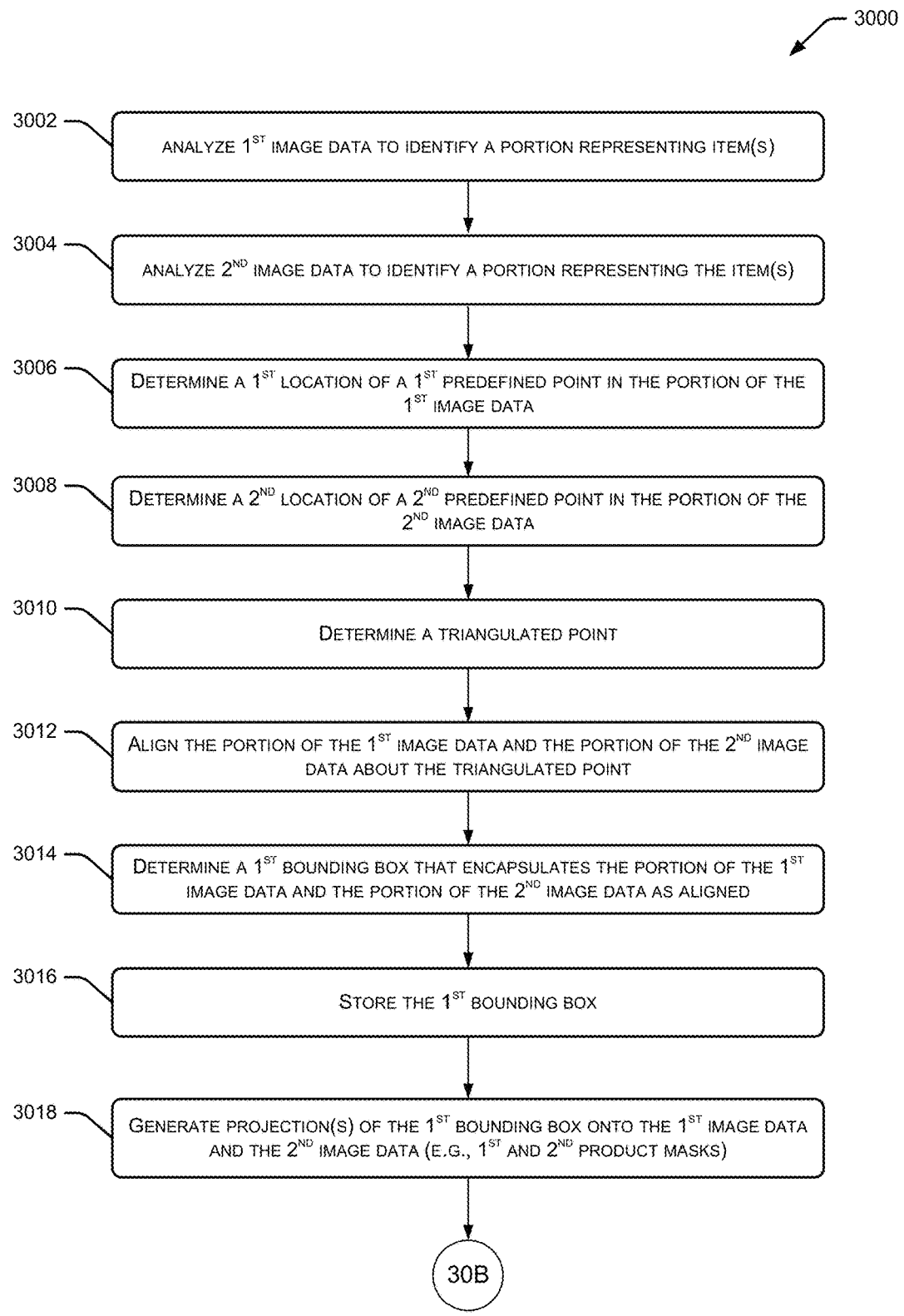
FIGS. 30A-C collectively illustrate a flow diagram illustrating an example process for performing product-volume detection using the techniques described herein.
Figure 30B:
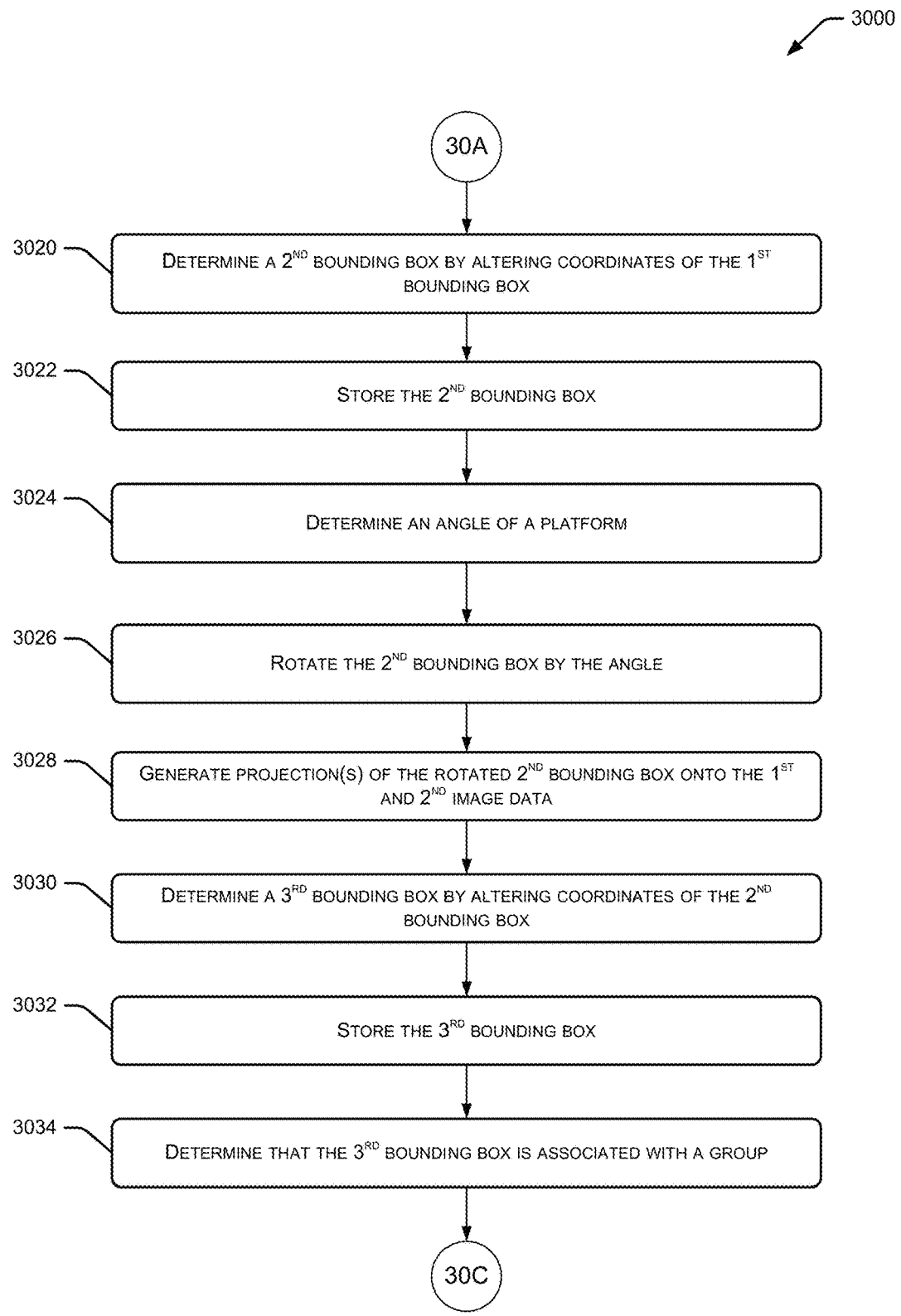
Figure 30C:
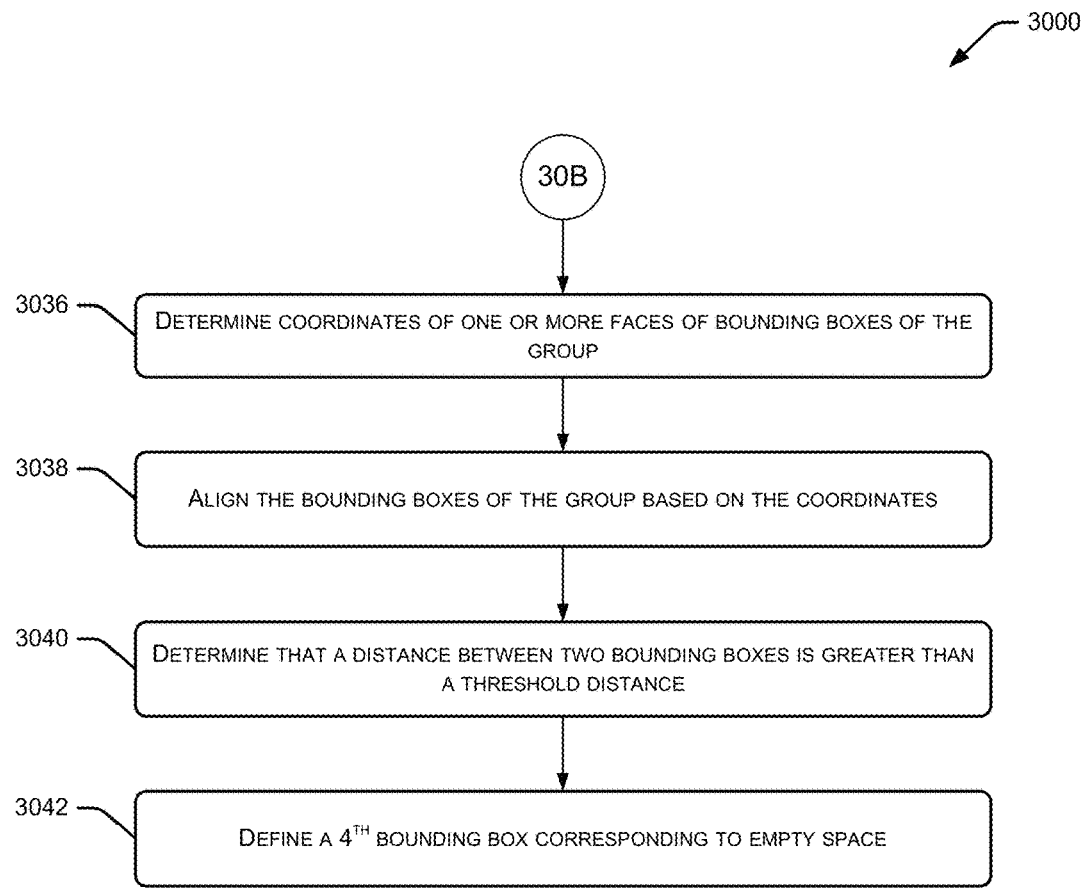

FIGS. 30A-C collectively illustrate a flow diagram illustrating an example process 3000 for performing product-volume detection using the techniques described herein. The process 3000, as well as each process described herein, may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

An operation 3002 represents analyzing first image data generated by a first camera in a facility to identify a portion of the first image data representing one or more items. In some instances, this operation comprises estimating a two-dimensional (2D) projection of a bounding box (e.g., a cuboid) in the first image data that encapsulates the one or more items, such as using the techniques discussed above with reference to FIGS. 20-25.

An operation 3004 represents analyzing second image data generated by a second camera in the facility to identify a portion of the second image data representing the one or more items. In some instances, this operation comprises estimating a two-dimensional (2D) projection of a bounding box (e.g., a cuboid) in the second image data that encapsulates the one or more items, such as using the techniques discussed above with reference to FIGS. 20-25.

An operation 3006 represents determining a first location of a first predefined point of the portion of the first image data. For instance, this may comprise a point on a front face that is centered left-to-right and at a bottom of the front face. Of course, the predefined point may comprise any other point, which may be determined based upon the fixtured being analyzed.

An operation 3008 represents determining a second location of a second predefined point of the portion of the second image data. For instance, this may comprise a point on a front face that is centered left-to-right and at a bottom of the front face. Of course, the predefined point may comprise any other point, which may be determined based upon the fixtured being analyzed.

An operation 3010 represents determining a triangulated point using the first location of the first predefined point in the portion of the first image data and the second location of the second predefined point in the portion of the second image data. This operation may comprise determining coordinates of the first predefined point in the portion of the first image data and coordinates of the second predefined point in the portion of the second image data (and potentially other predefined points associated with other portions of image data) and averaging these values to determine the triangulated point.

An operation 3012 represents aligning the portion of the first image data and the portion of the second image data using the triangulated point. For instance, the portion of the first image data and the portion of the second image data may be moved so that their initial predefined point corresponds to the triangulated point.

An operation 3014 represents determining a first bounding box that encapsulates the portion of the first image data and the portion of the second image data as aligned using the triangulated point. In some instances, this operation comprises determining a cuboid that encapsulates the 2D projection of a first cuboid determined at the operation 3002 and the 2D projection of the second cuboid determined at the operation 3004.

An operation 3016 represents storing an indication of the first bounding box. For instance, the 3D coordinates of the first bounding box may be stored as an initial product volume.

An operation 3018 represents generating one or more projection(s) of the first bounding box onto the first image data and onto the second image data, such as onto a first product mask and a second product mask.

FIG. 30B continues the illustration of the process 3000 and includes, at an operation 3020, determining a second bounding box by altering one or more coordinates associated with the first bounding box based at least in part on the projecting. For instance, this operation may comprise adjusting coordinates associated with each of the six faces of the first bounding box, one at a time, until the respective face touches at least one of the product masks but does not overlap either of the product masks. Thus, this operation may comprise tightening the bounding box about the two or more product masks.

An operation 3022 represents storing an indication of the second bounding box. For instance, the 3D coordinates of the second bounding box may be stored as a refined product volume.

An operation 3024 represents determining an angle of a platform in the facility upon which the one or more items reside. For instance, this operation may comprise determining a sensor associated with the platform and determine an angle associated with the sensor.

An operation 3026 represents rotating the second bounding box by the angle, while an operation 3028 represents generating one or more projections, after the rotating, of the second bounding box onto the first image data and onto the second image data. For instance, this may comprise projecting the second bounding box, as rotated, onto the first and second product masks.

An operation 3030 represents determining a third bounding box by altering one or more coordinates associated with the first bounding box or the second bounding box based at least in part on the projecting of the first bounding box or the second bounding box. For instance, this operation may comprise adjusting coordinates associated with each of the six faces of the first bounding box, one at a time, until the respective face touches at least one of the product masks but does not overlap either of the product masks. Thus, this operation may comprise tightening the bounding box about the two or more product masks.

An operation 3032 represents storing an indication of the third bounding box. For instance, this operation may comprise storing 3D coordinates associated with the third bounding box as a refined product volume.

An operation 3034 represents determining that the third bounding box, which is associated with one or more second items, are associated with a common group. For instance, this operation may comprise determining that the third bounding box is associated with a 3D product group determined using the techniques described with reference to FIGS. 15-18.

FIG. 30C concludes the process 3000 and includes, at an operation 3036, determining coordinates associated with one or more faces of the bounding boxes of the group, such as front faces, back faces, or the like.

An operation 3038 represents aligning the bounding boxes of the group based on the coordinates. For instance, front faces and/or back faces of the bounding boxes may be aligned based on these coordinates, a merchandising volume of the space, and/or the like.

An operation 3040 represents determining that a distance between two bounding boxes of the group is greater than a threshold distance. An operation 3042, meanwhile, represents defining a fourth bounding box, representing, an empty space, between the two bounding boxes. For instance, this operation may comprise storing the 3D coordinates of this empty space as part of the planogram data. That is, the planogram data may be updated to indicate that the bounding box associated with the corresponding 3D coordinates is an empty space on the shelf or other fixture.

Figure 31:
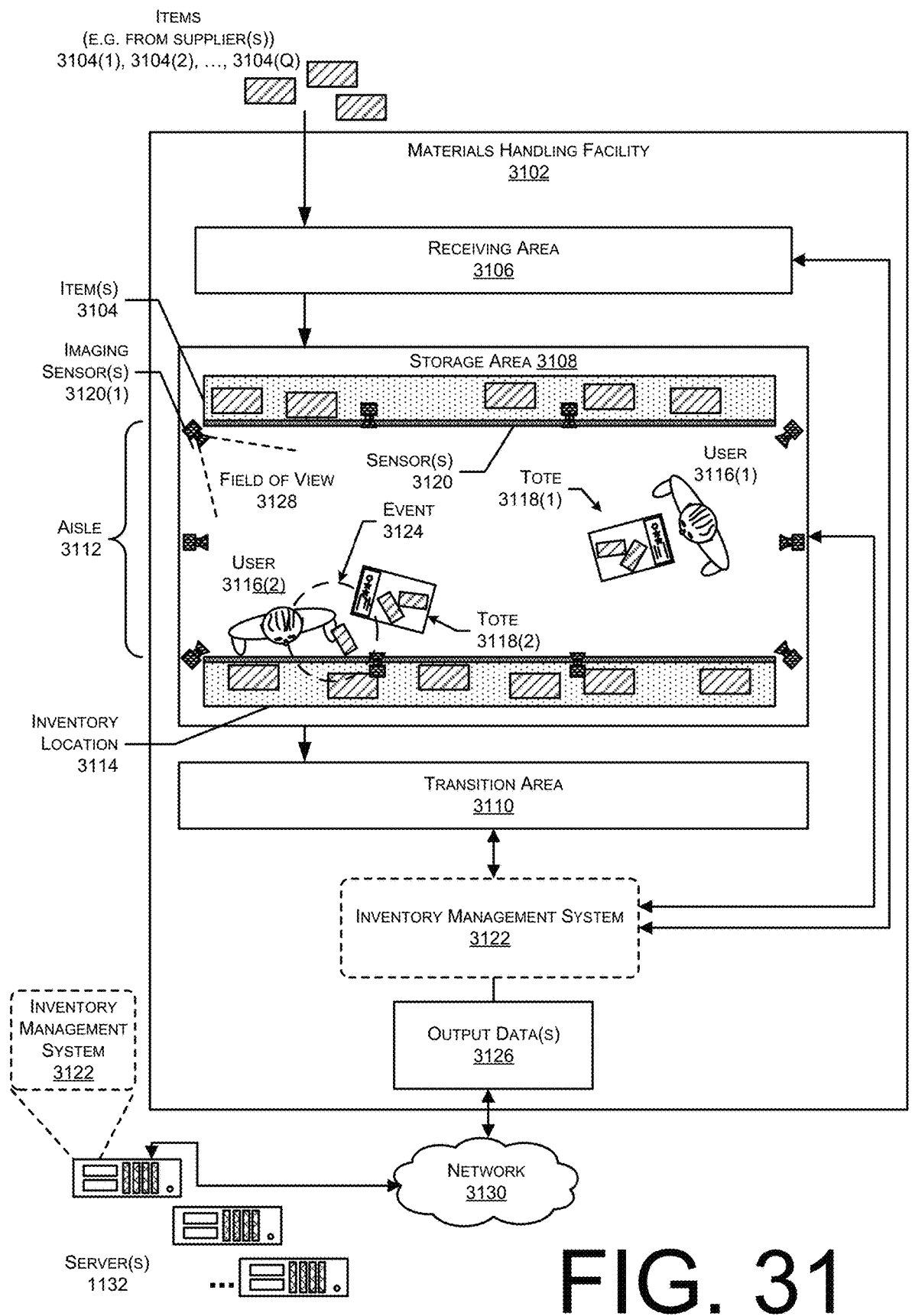
FIG. 31 illustrates an example materials handling facility in which the described techniques may be implemented.
Figure 32:
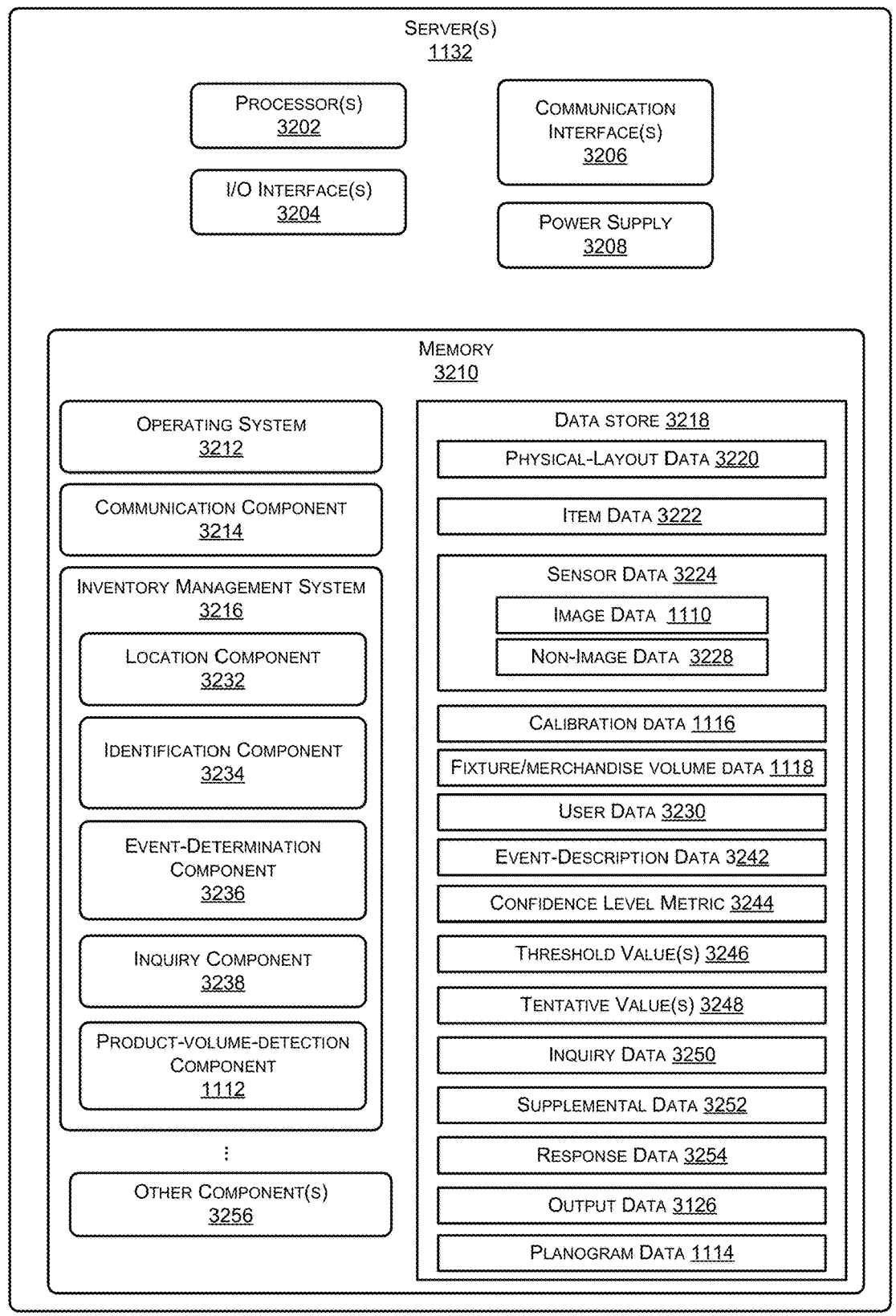
FIG. 32 illustrates example components of one or more systems configured to support an inventory-management system that may, in part, be configured to update planogram data using the techniques described herein.

FIGS. 31 and 32 represent an illustrative material handing environment 3102 in which the described techniques may be used. However, the following description is merely one illustrative example of an industry and environment in which the techniques described herein may be utilized.

The materials handling facility 3102 (or "facility") comprises one or more physical structures or areas within which one or more items 3104(1), 3104(2), . . . , 3104(Q) (generally denoted as 1104) may be held. As used in this disclosure, letters in parenthesis such as "(Q)" indicate an integer result. The items 3104 comprise physical goods, such as books, pharmaceuticals, repair parts, electronic gear, groceries, and so forth.

The facility 3102 may include one or more areas designated for different functions with regard to inventory handling. In this illustration, the facility 3102 includes a receiving area 3106, a storage area 3108, and a transition area 3110. The receiving area 3106 may be configured to accept items 3104, such as from suppliers, for intake into the facility 3102. For example, the receiving area 3106 may include a loading dock at which trucks or other freight conveyances unload the items 3104.

The storage area 3108 is configured to store the items 3104. The storage area 3108 may be arranged in various physical configurations. In one implementation, the storage area 3108 may include one or more aisles 3112. An aisle 3112 may be configured with, or defined by, inventory locations 3114 on one or both sides of the aisle 3112. The inventory locations 3114 may include one or more of shelves, racks, cases, cabinets, bins, floor locations, or other suitable storage mechanisms for holding or storing the items 3104. The inventory locations 3114 may be affixed to the floor or another portion of the facility's structure, or may be movable such that the arrangements of aisles 3112 may be reconfigurable. In some implementations, the inventory locations 3114 may be configured to move independently of an outside operator. For example, the inventory locations 3114 may comprise a rack with a power source and a motor, operable by a computing device to allow the rack to move from one location within the facility 3102 to another.

One or more users 3116(1), 3116(2), . . . , 3116(U), totes 3118(1), 3118(2), . . . , 3118(T) (generally denoted as 3116 and 3118, respectively) or other material handling apparatus may move within the facility 3102. For example, the users 3116 may move about within the facility 3102 to pick or place the items 3104 in various inventory locations 3114, placing them on totes 3118 for ease of transport. An individual tote 3118 is configured to carry or otherwise transport one or more items 3104. For example, a tote 3118 may include a basket, a cart, a bag, and so forth.

In other implementations, other agencies such as robots, forklifts, cranes, aerial drones, and so forth, may move about the facility 3102 picking, placing, or otherwise moving the items 3104.

One or more sensors 3120 may be configured to acquire information in the facility 3102. The sensors 3120 in the facility 3102 may include sensors fixed in the environment (e.g., ceiling-mounted cameras) or otherwise, such as sensors in the possession of users (e.g., mobile phones, tablets, etc.). The sensors 3120 may include, but are not limited to, cameras 3120(1), weight sensors, radio frequency (RF) receivers, temperature sensors, humidity sensors, vibration sensors, and so forth. The sensors 3120 may be stationary or mobile, relative to the facility 3102. For example, the inventory locations 3114 may contain cameras 3120(1) configured to acquire images of pick or placement of items 3104 on shelves, of the users 3116(1) and 3116(2) in the facility 3102, and so forth. In another example, the floor of the facility 3102 may include weight sensors configured to determine a weight of the users 3116 or other object thereupon.

During operation of the facility 3102, the sensors 3120 may be configured to provide information suitable for tracking how objects move or other occurrences within the facility 3102. For example, a series of images acquired by a camera 3120(1) may indicate removal of an item 3104 from a particular inventory location 3114 by one of the users 3116 and placement of the item 3104 on or at least partially within one of the totes 3118. Images may also be analyzed as described above to determine locations of products within the facility 3102 and to update a facility planogram to indicate the locations.

While the storage area 3108 is depicted as having one or more aisles 3112, inventory locations 3114 storing the items 3104, sensors 3120, and so forth, it is understood that the receiving area 3106, the transition area 3110, or other areas of the facility 3102 may be similarly equipped. Furthermore, the arrangement of the various areas within the facility 3102 is depicted functionally rather than schematically. For example, multiple different receiving areas 1106, storage areas 1108, and transition areas 3110 may be interspersed rather than segregated in the facility 3102.

The facility 3102 may include, or be coupled to, an inventory management system 3122. The inventory management system 3122 may maintain a virtual cart of each user 3116 within the facility 3102. The inventory management system 3122 may also store an identifier corresponding to an account of each user 3116, the location of each of these identifiers, and whether the user 3116 is eligible to exit the facility 3102 with one or more items 3104 without performing a manual checkout of the items 3104. The inventory management system 3122 may also generate and output notification data to the users 3116, indicating whether or not they are so eligible. It is to be appreciated that the system may locate the identifier within the facility 3102, but that this identifier may be free from information of an identity of a user. That is, the system may locate identifiers associated with accounts, rather than locate identified users within the facility.

As illustrated, the inventory management system 3122 may reside at the facility 3102 (e.g., as part of on-premises servers), on the servers 3132 that are remote from the facility 3102, a combination thereof. In each instance, the inventory management system 3122 is configured to identify interactions and events with and between users 3116, devices such as sensors 3120, robots, material handling equipment, computing devices, and so forth, in one or more of the receiving area 3106, the storage area 3108, or the transition area 3110. As described above, some interactions may further indicate the existence of one or more events 3124—or predefined activities of interest. For example, the events 3124 may include the entry of the user 3116 to the facility 3102, stocking of items 3104 at an inventory location 3114, picking of an item 3104 from an inventory location 3114, returning of an item 3104 to an inventory location 3114, placement of an item 3104 within a tote 3118, movement of users 3116 relative to one another, gestures by the users 3116, and so forth. Other events 3124 involving users 3116 may include the user 3116 providing authentication information in the facility 3102, using a computing device at the facility 3102 to authenticate identity to the inventory management system 3122, and so forth. Some events 3124 may involve one or more other objects within the facility 3102. For example, the event 3124 may comprise movement within the facility 3102 of an inventory location 3114, such as a counter mounted on wheels. Events 3124 may involve one or more of the sensors 3120. For example, a change in operation of a sensor 3120, such as a sensor failure, change in alignment, and so forth, may be designated as an event 3124. Continuing the example, movement of a camera 3120(1) resulting in a change in the orientation of the field of view 3128 (such as resulting from someone or something bumping the camera 3120(1)) may be designated as an event 3124.

As described herein, the inventory management system 3122 may also analyze images captured within the facility 3102 to determine locations of products within the facility 3102. In some cases, this analysis may be performed in response to detected changes within the facility, such as inventory locations 3114 being moved and/or items 3104 being moved.

By determining the occurrence of one or more of the events 3124, the inventory management system 3122 may generate output data 3126. The output data 3126 comprises information about the event 3124. For example, where the event 3124 comprises an item 3104 being removed from an inventory location 3114, the output data 3126 may comprise an item identifier indicative of the particular item 3104 that was removed from the inventory location 3114 and a user identifier of a user that removed the item. Output data may also include planogram data, such as coordinates of product volumes within the facility 3102.

The inventory management system 3122 may use one or more automated systems to generate the output data 3126. For example, an artificial neural network, one or more classifiers, or other automated machine learning techniques may be used to process the sensor data from the one or more sensors 3120 to generate output data 3126. For example, the inventory management system may perform techniques for generating and utilizing a classifier for identifying user activity in image data. The automated systems may operate using probabilistic or non-probabilistic techniques. For example, the automated systems may use a Bayesian network. In another example, the automated systems may use support vector machines to generate the output data 3126 or the tentative results. The automated systems may generate confidence level data that provides information indicative of the accuracy or confidence that the output data 3126 or the tentative data corresponds to the physical world.

The confidence level data may be generated using a variety of techniques, based at least in part on the type of automated system in use. For example, a probabilistic system using a Bayesian network may use a probability assigned to the output as the confidence level. Continuing the example, the Bayesian network may indicate that the probability that the item depicted in the image data corresponds to an item previously stored in memory is 95%. This probability may be used as the confidence level for that item as depicted in the image data.

In another example, output from non-probabilistic techniques such as support vector machines may have confidence levels based on a distance in a mathematical space within which the image data of the item and the images of previously stored items have been classified. The greater the distance in this space from a reference point such as the previously stored image to the image data acquired during the occurrence, the lower the confidence level.

In yet another example, the image data of an object such as an item 3104, user 3116, and so forth, may be compared with a set of previously stored images. Differences between the image data and the previously stored images may be assessed. For example, differences in shape, color, relative proportions between features in the images, and so forth. The differences may be expressed in terms of distance with a mathematical space. For example, the color of the object as depicted in the image data and the color of the object as depicted in the previously stored images may be represented as coordinates within a color space.

The confidence level may be determined based at least in part on these differences. For example, the user 3116 may pick an item 3104(1) such as a perfume bottle that is generally cubical in shape from the inventory location 3114. Other items 3104 at nearby inventory locations 3114 may be predominately spherical. Based on the difference in shape (cube vs. sphere) from the adjacent items, and the correspondence in shape with the previously stored image of the perfume bottle item 3104(1) (cubical and cubical), the confidence level that the user 3116 has picked up the perfume bottle item 3104(1) is high.

In some situations, the automated techniques may be unable to generate output data 3126 with a confidence level above a threshold result. For example, the automated techniques may be unable to distinguish which user 3116 in a crowd of users 3116 has picked up the item 3104 from the inventory location 3114. In other situations, it may be desirable to provide human confirmation of the event 3124 or of the accuracy of the output data 3126. For example, some items 3104 may be deemed age restricted such that they are to be handled only by users 3116 above a minimum age threshold.

In instances where human confirmation is desired, sensor data associated with an event 3124 may be processed to generate inquiry data. The inquiry data may include a subset of the sensor data associated with the event 3124. The inquiry data may also include one or more of one or more tentative results as determined by the automated techniques, or supplemental data. The subset of the sensor data may be determined using information about the one or more sensors 3120. For example, camera data such as the location of the camera 3120(1) within the facility 3102, the orientation of the camera 3120(1), and a field of view 3128 of the camera 3120(1) may be used to determine if a particular location within the facility 3102 is within the field of view 3128. The subset of the sensor data may include images that may show the inventory location 3114 or that the item 3104 was stowed. The subset of the sensor data may also omit images from other cameras 3120(1) that did not have that inventory location 3114 in the field of view 3128. The field of view 3128 may comprise a portion of the scene in the facility 3102 that the sensor 3120 is able to generate sensor data about.

Continuing the example, the subset of the sensor data may comprise a video clip acquired by one or more cameras 3120(1) having a field of view 3128 that includes the item 3104. The tentative results may comprise the "best guess" as to which items 3104 may have been involved in the event 3124. For example, the tentative results may comprise results determined by the automated system that have a confidence level above a minimum threshold.

The facility 3102 may be configured to receive different kinds of items 3104 from various suppliers and to store them until a customer orders or retrieves one or more of the items 3104. Specifically, the items 3104 may be received from one or more suppliers, such as manufacturers, distributors, wholesalers, and so forth, at the receiving area 3106. In various implementations, the items 3104 may include merchandise, commodities, perishables, or any suitable type of item 3104, depending on the nature of the enterprise that operates the facility 3102. The receiving of the items 3104 may comprise one or more events 3124 for which the inventory management system 3122 may generate output data 3126.

Upon being received from a supplier at receiving area 3106, the items 3104 may be prepared for storage. For example, items 3104 may be unpacked or otherwise rearranged. The inventory management system 3122 may include one or more software applications executing on a computer system to provide inventory management functions based on the events 3124 associated with the unpacking or rearrangement. These inventory management functions may include maintaining information indicative of the type, quantity, condition, cost, location, weight, or any other suitable parameters with respect to the items 3104. The items 3104 may be stocked, managed, or dispensed in terms of countable, individual units or multiples, such as packages, cartons, crates, pallets, or other suitable aggregations. Alternatively, some items 3104, such as bulk products, commodities, and so forth, may be stored in continuous or arbitrarily divisible amounts that may not be inherently organized into countable units. Such items 3104 may be managed in terms of measurable quantity such as units of length, area, volume, weight, time, duration, or other dimensional properties characterized by units of measurement. Generally speaking, a quantity of an item 3104 may refer to either a countable number of individual or aggregate units of an item 3104 or a measurable amount of an item 3104, as appropriate.

After arriving through the receiving area 3106, items 3104 may be stored within the storage area 3108. In some implementations, like items 3104 may be stored or displayed together in the inventory locations 3114 such as in bins, on shelves, hanging from pegboards, and so forth. In this implementation, all items 3104 of a given kind are stored in one inventory location 3114. In other implementations, like items 3104 may be stored in different inventory locations 3114. For example, to optimize retrieval of certain items 3104 having frequent turnover within a large physical facility 3102, those items 3104 may be stored in several different inventory locations 3114 to reduce congestion that might occur at a single inventory location 3114. Storage of the items 3104 and their respective inventory locations 3114 may comprise one or more event 3124.

When a customer order specifying one or more items 3104 is received, or as a user 3116 progresses through the facility 3102, the corresponding items 3104 may be selected or "picked" from the inventory locations 3114 containing those items 3104. In various implementations, item picking may range from manual to completely automated picking. For example, in one implementation, a user 3116 may have a list of items 3104 they desire and may progress through the facility 3102 picking items 3104 from inventory locations 3114 within the storage area 3108, and placing those items 3104 into a tote 3118. In other implementations, employees of the facility 3102 may pick items 3104 using written or electronic pick lists derived from customer orders. These picked items 3104 may be placed into the tote 3118 as the employee progresses through the facility 3102. Picking may comprise one or more events 3124, such as the user 3116 in moving to the inventory location 3114, retrieval of the item 3104 from the inventory location 3114, and so forth.

After items 3104 have been picked, they may be processed at a transition area 3110. The transition area 3110 may be any designated area within the facility 3102 where items 3104 are transitioned from one location to another or from one entity to another. For example, the transition area 3110 may be a packing station within the facility 3102. When the item 3104 arrives at the transition area 3110, the items 3104 may be transitioned from the storage area 3108 to the packing station. The transitioning may comprise one or more events 3124. Information about the transition may be maintained by the inventory management system 3122 using the output data 3126 associated with those events 3124.

In another example, if the items 3104 are departing the facility 3102 a list of the items 3104 may be obtained and used by the inventory management system 3122 to transition responsibility for, or custody of, the items 3104 from the facility 3102 to another entity. For example, a carrier may accept the items 3104 for transport with that carrier accepting responsibility for the items 3104 indicated in the list. In another example, a customer may purchase or rent the items 3104 and remove the items 3104 from the facility 3102. The purchase or rental may comprise one or more events 3124.

The inventory management system 3122 may access or generate sensor data about the facility 3102 and the contents therein including the items 3104, the users 3116, the totes 3118, and so forth. The sensor data may be acquired by one or more of the sensors 3120, data provided by other systems, and so forth. For example, the sensors 3120 may include cameras 3120(1) configured to acquire image data of scenes in the facility 3102. The image data may comprise still images, video, or a combination thereof. The image data may be processed by the inventory management system 3122 to determine a location of the user 3116, the tote 3118, and so forth.

The inventory management system 3122, or systems coupled thereto, may be configured to determine an account identifier corresponding to the user 3116 to distinguish the user 3116 from other users located in the environment based on these respective account identifiers. In some cases, for example, the inventory management system 122 may detect that a person is entering the facility and may assign a unique identifier to that person such that the identifier is located within the facility. This identifier may be associated to that person based on information provided by the person in some instances. Again, it is to be appreciated that this identifier may be generic and free from information outwardly identifying the person, and that this identifier may be located within the facility rather than information identifying the person.

In some instances, the inventory management system may group users within the facility into respective sessions. That is, the inventory management system 3122 may utilize the sensor data to determine groups of users that are effectively "together" (e.g., shopping together). In some instances, a particular session may include multiple users that entered the facility 3102 together and, potentially, that navigate the facility together. For example, when a family of two adults and two children enter the facility together, the inventory management system may associate each user with a particular session. Locating sessions in addition to individual users may help in determining the outcome of individual events, given that users within a session may not only individually pick or return or otherwise interact with items, but may also pass the items back and forth amongst each other. For instance, a child in the above example may pick the box of cereal before handing the box to her mother, who may place it in her tote 3118. Noting the child and the mother as belonging to the same session may increase the chances of successfully adding the box of cereal to the virtual shopping cart of the mother.

By determining the occurrence of one or more events 3124 and the output data 3126 associated therewith, the inventory management system 3122 is able to provide one or more services to the users 3116 of the facility 3102. By utilizing one or more human associates to process inquiry data and generate response data that may then be used to produce output data 3126, overall accuracy of the system may be enhanced. The enhanced accuracy may improve the user experience of the one or more users 3116 of the facility 3102. In some examples, the output data 3126 may be transmitted over a network 1130 to one or more servers 3132.

FIG. 32 illustrates a block diagram of the one or more servers 3132. The servers 3132 may be physically present at the facility 3102, may be accessible by the network 1106, or a combination of both. The servers 3132 do not require end-user knowledge of the physical location and configuration of the system that delivers the services. Common expressions associated with the servers 3132 may include "on-demand computing," "software as a service (SaaS)," "cloud services," "data centers," and so forth. Services provided by the servers 3132 may be distributed across one or more physical or virtual devices.

The servers 3132 may include one or more hardware processors 3202 (processors) configured to execute one or more stored instructions. The processors 3202 may comprise one or more cores. The servers 3132 may include one or more input/output (I/O) interface(s) 3204 to allow the processor 3202 or other portions of the servers 3132 to communicate with other devices. The I/O interfaces 3204 may comprise Inter-Integrated Circuit (I2C), Serial Peripheral Interface bus (SPI), Universal Serial Bus (USB) as promulgated by the USB Implementers Forum, and so forth.

The servers 3132 may also include one or more communication interfaces 3206. The communication interfaces 3206 are configured to provide communications between the servers 3132 and other devices, such as the sensors 3120, the interface devices, routers, and so forth. The communication interfaces 3206 may include devices configured to couple to personal area networks (PANs), wired and wireless local area networks (LANs), wired and wireless wide area networks (WANs), and so forth. For example, the communication interfaces 3206 may include devices compatible with Ethernet, Wi-Fi™, and so forth. The servers 3132 may also include one or more busses or other internal communications hardware or software that allow for the transfer of data between the various modules and components of the servers 3132.

The servers 3132 may also include a power supply 3208. The power supply 3208 is configured to provide electrical power suitable for operating the components in the servers 3132.

The servers 3132 may further include one or more memories 3210. The memory 3210 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 3210 provides storage of computer-readable instructions, data structures, program modules, and other data for the operation of the servers 3132. A few example functional modules are shown stored in the memory 3210, although the same functionality may alternatively be implemented in hardware, firmware, or as a system on a chip (SOC).

The memory 3210 may include at least one operating system (OS) component 1212. The OS component 3212 is configured to manage hardware resource devices such as the I/O interfaces 3204, the communication interfaces 3206, and provide various services to applications or components executing on the processors 3202. The OS component 3212 may implement a variant of the FreeBSD™ operating system as promulgated by the FreeBSD Project; other UNIX™ or UNIX-like variants; a variation of the Linux™ operating system as promulgated by Linus Torvalds; the Windows® Server operating system from Microsoft Corporation of Redmond, Washington, USA; and so forth.

One or more of the following components may also be stored in the memory 3210. These components may be executed as foreground applications, background tasks, daemons, and so forth. A communication component 3214 may be configured to establish communications with one or more of the sensors 3120, one or more of the devices used by associates, other servers 3132, or other devices. The communications may be authenticated, encrypted, and so forth.

The memory 3210 may store an inventory management system 3216. The inventory management system 3216 is configured to provide the inventory functions as described herein with regard to the inventory management system 3122. For example, the inventory management system 3216 may track movement of items 3104 in the facility 3102, generate user interface data, determine product locations/coordinates, determine product volumes to update a planogram, and so forth.

The inventory management system 3216 may access information stored in one or more data stores 3218 in the memory 3210. The data store 3218 may use a flat file, database, linked list, tree, executable code, script, or other data structure to store the information. In some implementations, the data store 3218 or a portion of the data store 3218 may be distributed across one or more other devices including other servers 3132, network attached storage devices, and so forth.

The data store 3218 may include physical layout data 3220. The physical layout data 3220 provides a mapping of physical locations within the physical layout of devices and objects such as the sensors 3120, inventory locations 3114, and so forth. The physical layout data 3220 may indicate the coordinates within the facility 3102 of an inventory location 3114, sensors 3120 within view of that inventory location 3114, and so forth. For example, the physical layout data 3220 may include camera data comprising one or more of a location within the facility 3102 of a camera 3120(1), orientation of the camera 3120(1), the operational status, and so forth. Continuing the example, the physical layout data 3220 may indicate the coordinates of the camera 3120(1), pan and tilt information indicative of a direction that the field of view 3128 is oriented along, whether the camera 3120(1) is operating or malfunctioning, and so forth. The physical-layout data 3220 may include planogram data indicating the physical coordinates or different product lanes, as described above, relative to the cameras and other devices.

In some implementations, the inventory management system 3216 may access the physical layout data 3220 to determine if a location associated with the event 3124 is within the field of view 3128 of one or more sensors 3120. Continuing the example above, given the location within the facility 3102 of the event 3124 and the camera data, the inventory management system 3216 may determine the cameras 3120(1) that may have generated images of the event 3124.

The item data 3222 comprises information associated with the items 3104. The information may include information indicative of one or more inventory locations 3114 at which one or more of the items 3104 are stored. In some implementation, planogram data may be included in the item data to indicate the locations of the inventory locations 3114. The item data 3222 may also include order data, SKU or other product identifier, price, quantity on hand, weight, expiration date, images of the item 3104, detail description information, ratings, ranking, and so forth. The inventory management system 3216 may store information associated with inventory management functions in the item data 3222.

The data store 3218 may also include sensor data 3224. The sensor data 3224 comprises information acquired from, or based on, the one or more sensors 3120. For example, the sensor data 3224 may comprise 3D information about an object in the facility 3102. As described above, the sensors 3120 may include a camera 3120(1), which is configured to acquire one or more images. These images may be stored as the image data 1110. The image data 1110 may comprise information descriptive of a plurality of picture elements or pixels. Non-image data 3228 may comprise information from other sensors 3120, such as input from the microphones, weight sensors, item dispensers, and so forth.

User data 3230 may also be stored in the data store 3218. The user data 3230 may include identity data, information indicative of a profile, purchase history, location data, images of the user 3116, demographic data, and so forth. Individual users 3116 or groups of users 3116 may selectively provide user data 3230 for use by the inventory management system 3122. The individual users 3116 or groups of users 3116 may also authorize collection of the user data 3230 during use of the facility 3102 or access to user data 3230 obtained from other systems. For example, the user 3116 may opt-in to collection of the user data 3230 to receive enhanced services while using the facility 3102.

In some implementations, the user data 3230 may include information designating a user 3116 for special handling. For example, the user data 3230 may indicate that a particular user 3116 has been associated with an increased number of errors with respect to output data 3126. The inventory management system 3216 may be configured to use this information to apply additional scrutiny to the events 3124 associated with this user 3116. For example, events 3124 that include an item 3104 having a cost or result above the threshold amount may be provided to the associates for processing regardless of the determined level of confidence in the output data 3126 as generated by the automated system.

The inventory management system 3216 may include one or more of a location component 3232, identification component 3234, event-determination component 3236, inquiry component 3238, and a planogram component 1205, amongst other components 1256. The inventory management system 3216 may include a planogram component 1205 that is responsible for determining product volumes and for updating planogram data.

The location component 3232 functions to locate items or users within the environment of the facility to allow the inventory management system 3216 to assign certain events to the correct users. The location component 3232 may assign unique identifiers to users as they enter the facility and, with the users' consent, may locate the users throughout the facility 3102 over the time they remain in the facility 3102. The location component 3232 may perform this locating using sensor data 3224, such as the image data 1110. For example, the location component 3232 may receive the image data 1110 and may use recognition techniques to identify users from the images. After identifying a particular user within the facility, the location component 3232 may then locate non-personally-identifying information associated with the user within the images as the user moves throughout the facility 3102.

Therefore, upon receiving the indication of the time and location of the event in question, the location component 3232 may query the data store 3218 to determine which one or more users were at or within a threshold distance of the location of the event at the particular time of the event. Further, the location component 3232 may assign different confidence levels to different users, with the confidence levels indicating how likely it is that each corresponding user is the user that is in fact associated with the event of interest.

The location component 3232 may access the sensor data 3224 in order to determine this location data of the user and/or items. The location data provides information indicative of a location of an object, such as the item 3104, the user 3116, the tote 3118, and so forth. The location data may include planogram data, such as the planogram data 1114. I some instances, the planogram data comprises coordinates of the bounding boxes or product volumes described above, with each bounding box or product volume associated with a particular item identifier. The specified locations of the planogram data may be absolute with respect to the facility 3102 or relative to another object or point of reference. Absolute terms may comprise a latitude, longitude, and altitude with respect to a geodetic reference point. Relative terms may include a location of 25.4 meters (m) along an x-axis and 75.2 m along a y-axis as designated by a floor plan of the facility 3102, 5.2 m from an inventory location 3114 along a heading of 169°, and so forth. For example, the location data may indicate that the user 3116(1) is 25.2 m along the aisle 1112(1) and standing in front of the inventory location 3114. In comparison, a relative location may indicate that the user 3116(1) is 32 cm from the tote 3118 at a heading of 73° with respect to the tote 3118. The location data may include orientation information, such as which direction the user 3116 is facing. The orientation may be determined by the relative direction the user's body is facing. In some implementations, the orientation may be relative to the interface device. Continuing the example, the location data may indicate that the user 3116(1) is oriented with a heading of 0°, or looking north. In another example, the location data may indicate that the user 3116 is facing towards the interface device.

The identification component 3234 is configured to identify an object. In one implementation, the identification component 3234 may be configured to identify an item 3104. In another implementation, the identification component 3234 may be configured to identify the user 3116. For example, the identification component 3234 may use recognition techniques to process the image data 1110 and determine the identity data of the user 3116 depicted in the images by comparing the characteristics in the image data 1110 with previously stored results. The identification component 3234 may also access data from other sensors 3120, such as from an RFID reader, an RF receiver, fingerprint sensors, and so forth.

The event-determination component 3236 is configured to process the sensor data 3224 and generate output data 3226. The event-determination component 3236 may access information stored in the data store 3218 including, but not limited to, event description data 1242, confidence levels 3244, or threshold values 1246. The event-determination component 3236 may be configured to create and utilize event classifiers for identifying events (e.g., predefined activity) within image data, potentially without use of other sensor data acquired by other sensors in the environment.

The event description data 3242 comprises information indicative of one or more events 3124. For example, the event description data 3242 may comprise predefined profiles that designate movement of an item 3104 from an inventory location 3114 with the event 3124 of "pick". The event description data 1242 may be manually generated or automatically generated. The event description data 1242 may include data indicative of triggers associated with events occurring in the facility 3102. An event may be determined as occurring upon detection of the trigger. For example, sensor data 3224 such as a change in weight from a weight sensor 3120(6) at an inventory location 3114 may trigger detection of an event of an item 3104 being added or removed from the inventory location 3114. In another example, the trigger may comprise an image of the user 3116 reaching a hand toward the inventory location 3114. In yet another example, the trigger may comprise two or more users 3116 approaching to within a threshold distance of one another.

The event-determination component 3236 may process the sensor data 3224 using one or more techniques including, but not limited to, artificial neural networks, classifiers, decision trees, support vector machines, Bayesian networks, and so forth. For example, the event-determination component 3236 may use a decision tree to determine occurrence of the "pick" event 3124 based on sensor data 3224. The event-determination component 3236 may further use the sensor data 3224 to determine one or more tentative results 3248. The one or more tentative results 3248 comprise data associated with the event 3124. For example, where the event 3124 comprises a disambiguation of users 3116, the tentative results 3248 may comprise a list of possible user identities. In another example, where the event 3124 comprises a disambiguation between items 3104, the tentative results 3248 may comprise a list of possible item identifiers. In some implementations, the tentative result 3248 may indicate the possible action. For example, the action may comprise the user 3116 picking, placing, moving an item 3104, damaging an item 3104, providing gestural input, and so forth.

In some implementations, the tentative results 3248 may be generated by other components. For example, the tentative results 3248 such as one or more possible identities or locations of the user 3116 involved in the event 3124 may be generated by the location component 3232. In another example, the tentative results 3248 such as possible items 3104 that may have been involved in the event 3124 may be generated by the identification component 3234.

The event-determination component 3236 may be configured to provide a confidence level 3244 associated with the determination of the tentative results 3248. The confidence level 3244 provides indicia as to the expected level of accuracy of the tentative result 3248. For example, a low confidence level 3244 may indicate that the tentative result 3248 has a low probability of corresponding to the actual circumstances of the event 3124. In comparison, a high confidence level 3244 may indicate that the tentative result 3248 has a high probability of corresponding to the actual circumstances of the event 3124.

In some implementations, the tentative results 3248 having confidence levels 3244 that exceed the threshold may be deemed to be sufficiently accurate and thus may be used as the output data 3126. For example, the event-determination component 3236 may provide tentative results 3248 indicative of the three possible items 3104(1), 3104(2), and 3104(3) corresponding to the "pick" event 3124. The confidence levels 3244 associated with the possible items 3104(1), 904(2), and 1104(3) may be 25%, 70%, 92%, respectively. Continuing the example, the threshold result 1246 may be set such that confidence level 3244 of 90% are deemed to be sufficiently accurate. As a result, the event-determination component 3236 may designate the "pick" event 3124 as involving item 3104(3).

The inquiry component 3238 may be configured to use at least a portion of the sensor data 3224 associated with the event 3124 to generate inquiry data 3250. In some implementations, the inquiry data 3250 may include one or more of the tentative results 3248 or supplemental data 3252. The inquiry component 3238 may be configured to provide inquiry data 3250 to one or more devices associated with one or more human associates.

An associate user interface is presented on the respective devices of associates. The associate may generate response data 3254 by selecting a particular tentative result 3248, entering new information, indicating that they are unable to answer the inquiry, and so forth.

The supplemental data 3252 comprises information associated with the event 3124 or that may be useful in interpreting the sensor data 3224. For example, the supplemental data 3252 may comprise previously stored images of the items 3104. In another example, the supplemental data 3252 may comprise one or more graphical overlays. For example, the graphical overlays may comprise graphical user interface elements such as overlays depicting indicia of an object of interest. These indicia may comprise highlights, bounding boxes, arrows, and so forth, that have been superimposed or placed atop the image data during presentation to an associate.

The inquiry component 3238 processes the response data 3254 provided by the one or more associates. The processing may include calculating one or more statistical results associated with the response data 3254. For example, statistical results may include a count of the number of times associates selected a particular tentative result 3248, determination of a percentage of the associates that selected a particular tentative result 3248, and so forth.

The inquiry component 3238 is configured to generate the output data 3126 based at least in part on the response data 3254. For example, given that a majority of the associates returned response data 3254 indicating that the item 3104 associated with the "pick" event 3124 is item 3104(5), the output data 3126 may indicate that the item 3104(5) was picked.

The inquiry component 3238 may be configured to selectively distribute inquiries to particular associates. For example, some associates may be better suited to answering particular types of inquiries. Performance data, such as statistical data about the performance of the associates, may be determined by the inquiry component 3238 from the response data 3254 provided by the associates. For example, information indicative of a percentage of different inquiries in which the particular associate selected response data 3254 that disagreed with the majority of associates may be maintained. In some implementations, test or practice inquiry data 3250 having a previously known correct answer may be provided to the associate for training or quality assurance purposes. The determination of the set of associates to use may be based at least in part on the performance data.

By using the inquiry component 3238, the event-determination component 3236 may be able to provide high reliability output data 3126 that accurately represents the event 3124. The output data 3126 generated by the inquiry component 3238 from the response data 3254 may also be used to further train the automated systems used by the inventory management system 3216. For example, the sensor data 3224 and the output data 3126, based on response data 3254, may be provided to one or more of the components of the inventory management system 3216 for training in process improvement. Continuing the example, this information may be provided to an artificial neural network, Bayesian network, and so forth, to further train these systems such that the confidence level 3244 and the tentative results 3248 produced in the future for the same or similar input is improved. Finally, as FIG. 12 illustrates, the servers 3132 may store and/or utilize other data 3258.

The product-volume-detection component 1112, meanwhile, may perform some or all of the operations described above with reference to the processes 200, 600, 900, and 3000 of FIGS. 2, 6, 9, and 30 respectively. For instance, the product-volume-detection component 1112 may be used to determine product volumes associated with different products within the facility 3102. The product-volume-detection component 1112 may also be referenced by other components to provide product location information. In some embodiments, the functionality of the product-volume-detection component 1112 may be implemented by other components, such as by the location component and the identification component.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet. Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
analyzing first image data generated by a first camera in a facility to identify a portion of the first image data representing one or more items;
analyzing second image data generated by a second camera in the facility to identify a portion of the second image data representing the one or more items;
determining a first location of a first predefined point of the portion of the first image data;
determining a second location of a second predefined point of the portion of the second image data;
determining a triangulated point using at least the first location of the first predefined point of the portion of the first image data and the second location of the second predefined point of the portion of the second image data;
aligning the portion of the first image data and the portion of the second image data using the triangulated point;
determining a first bounding box that encapsulates the portion of the first image data and the portion of the second image data as aligned using the triangulated point;
projecting the first bounding box onto the first image data and onto the second image data;
determining a second bounding box by altering one or more coordinates associated with the first bounding box based at least in part on the projecting; and
storing an indication of the second bounding box.

2. The method as recited in claim 1, further comprising:
determining an angle of a platform in the facility upon which the one or more items reside;
rotating the second bounding box by the angle;
projecting, after the rotating, the second bounding box onto at least a portion of the first image data and onto at least a portion of the second image data;
determining a third bounding box by altering one or more coordinates associated with the second bounding box based least in at part on the projecting of the second bounding box; and
storing an indication of the third bounding box.

3. The method as recited in claim 1, wherein the one or more items comprise one or more first items, and further comprising:
- determining that the second bounding box and a third bounding box, associated with one or more second items, are associated with a common group;
- based at least in part on determining that the second bounding box and the third bounding box are associated with the common group, aligning coordinates associated with a bottom surface of the second bounding box with coordinates associated with a bottom surface of the third bounding box.

4. The method as recited in claim 1, wherein the one or more items comprise one or more first items, and further comprising:
- determining that the second bounding box and a third bounding box, associated with one or more second items, are associated with a common group;
- based at least in part on determining that the second bounding box and the third bounding box are associated with the common group:
  - determining first coordinates associated with a front face of the second bounding box;
  - determining second coordinates associated with a front face of the third bounding box;
  - determining third coordinates using the first coordinates and the second coordinates; and
  - aligning the front face of the second bounding box and the front face of the third bounding box using the third coordinates.

5. The method as recited in claim 1, wherein the one or more items comprise one or more first items, and further comprising:
- determining that the second bounding box and a third bounding box, associated with one or more second items, are associated with a common group;
- determining that a distance between the second bounding box and the third bounding box is greater than a threshold distance; and
- defining a fourth bounding box between the second bounding box and the third bounding box.

6. A method comprising:
- analyzing first image data generated by a first camera in a facility to identify a portion of the first image data representing one or more items;
- analyzing second image data generated by a second camera in the facility to identify a portion of the second image data representing the one or more items;
- determining a first location of a first predefined point of the portion of the first image data;
- determining a second location of a second predefined point of the portion of the second image data;
- determining a triangulated point using the first location of the first predefined point in the portion of the first image data and the second location of the second predefined point in the portion of the second image data;
- aligning the portion of the first image data and the portion of the second image data using the triangulated point;
- determining a bounding box that encapsulates the portion of the first image data and the portion of the second image data as aligned using the triangulated point; and
- storing data identifying coordinates of the bounding box.

7. The method as recited in claim 6, wherein:
- the analyzing the first image data comprises estimating a two-dimensional (2D) projection of a bounding box in the first image data that encapsulates the one or more items; and
- the analyzing the second image data comprises estimating a 2D projection of a bounding box in the second image data that encapsulates the one or more items.

8. The method as recited in claim 6, wherein:
- the analyzing the first image data comprises estimating a two-dimensional (2D) projection of a first cuboid in the first image data that encapsulates the one or more items;
- the analyzing the second image data comprises estimating a 2D projection of a second cuboid in the second image data that encapsulates the one or more items; and
- the determining the bounding box comprises determining a cuboid that encapsulates the 2D projection of the first cuboid and the 2D projection of the second cuboid.

9. The method as recited in claim 6, wherein the data comprises first data, the coordinates comprise first coordinates, the bounding box comprises a first bounding box, and further comprising:
- generating a projection of the first bounding box onto the first image data and onto the second image data;
- determining a second bounding box by altering one or more coordinates associated with the first bounding box; and
- storing second data identifying second coordinates of the second bounding box.

10. The method as recited in claim 6, wherein the data comprises first data, the coordinates comprise first coordinates, the bounding box comprises a first cuboid, and further comprising:
- receiving second data identifying second coordinates of a first mask comprising a portion of the first image data that encapsulates the one or more items in the first image data;
- receiving third data identifying third coordinates of a second mask comprising a portion of the second image data that encapsulates the one or more items in the second image data;
- generating a first projection of the first cuboid onto the second coordinates of the first mask;
- generating a second projection of the first cuboid onto the third coordinates of the second mask;
- altering coordinates associated with at least one face of the cuboid to define a second cuboid that encapsulates the second coordinates of the first mask and the third coordinate of the second mask; and
- storing fourth data identifying fourth coordinates defining the second cuboid.

11. The method as recited in claim 6, the data comprises first data, the coordinates comprise first coordinates, and further comprising:
- determining an angle of a platform in the facility upon which the one or more items reside;
- rotating the first bounding box or a second bounding box by the angle;
- generating a first projection, after the rotating, of the first bounding box or the second bounding box onto the first image data;
- generating a second projection, after the rotating, of the first bounding box or the second bounding box onto the second image data;
- determining a third bounding box by altering one or more coordinates associated with the first bounding box or the second bounding box; and
- storing second data identifying second coordinates of the third bounding box.

12. The method as recited in claim 6, wherein the one or more items comprise one or more first items, and further comprising:
   determining that: (i) the first bounding box or a second bounding box, and (ii) a third bounding box, associated with one or more second items, are associated with a common group; and
   aligning: (i) coordinates associated with a bottom surface of the first bounding box or the second bounding box with (ii) coordinates associated with a bottom surface of the third bounding box.

13. The method as recited in claim 6, wherein the coordinates comprise first coordinates, the one or more items comprise one or more first items, and further comprising:
   determining that: (i) the first bounding box or a second bounding box, and (ii) a third bounding box, associated with one or more second items, are associated with a common group;
   determining second coordinates associated with a front face of the first bounding box or the second bounding box;
   determining third coordinates associated with a front face of the third bounding box;
   determining fourth coordinates using the first coordinates and the second coordinates; and
   aligning: (i) the front face of the first bounding box or the second bounding box, and (ii) the front face of the third bounding box using the fourth coordinates.

14. The method as recited in claim 6, wherein the one or more items comprise one or more first items, and further comprising:
   determining that: (i) the first bounding box or a second bounding box, and (ii) a third bounding box, associated with one or more second items, are associated with a common group;
   determining that a distance between: (i) the first bounding box or the second bounding box, and (ii) the third bounding box is greater than a threshold distance; and
   defining a fourth bounding box between: (i) the first bounding box or the second bounding box, and (ii) the third bounding box.

15. A system comprising:
   one or more processors; and
   one or more computer-readable media storing computer-executable instructions that, when caused cause the one or more processors to perform acts comprising:
      analyzing first image data generated by a first camera in a facility to identify a portion of the first image data representing one or more items;
      analyzing second image data generated by a second camera in the facility to identify a portion of the second image data representing the one or more items;
      determining a first location of a first predefined point of the portion of the first image data;
      determining a second location of a second predefined point of the portion of the second image data;
      determining a triangulated point using the first location of the first predefined point in the portion of the first image data and the second location of the second predefined point in the portion of the second image data;
      aligning the portion of the first image data and the portion of the second image data using the triangulated point;
      determining a bounding box that encapsulates the portion of the first image data and the portion of the second image data as aligned using the triangulated point; and
      storing data identifying coordinates of the bounding box.

16. The system as recited in claim 15, wherein:
   the analyzing the first image data comprises estimating a two-dimensional (2D) projection of a bounding box in the first image data that encapsulates the one or more items; and
   the analyzing the second image data comprises estimating a 2D projection of a bounding box in the second image data that encapsulates the one or more items.

17. The system as recited in claim 15, wherein:
   the analyzing the first image data comprises estimating a two-dimensional (2D) projection of a first cuboid in the first image data that encapsulates the one or more items;
   the analyzing the second image data comprises estimating a 2D projection of a second cuboid in the second image data that encapsulates the one or more items; and
   the determining the bounding box comprises determining a cuboid that encapsulates the 2D projection of the first cuboid and the 2D projection of the second cuboid.

18. The system as recited in claim 15, wherein the data comprises first data, the coordinates comprise first coordinates, the bounding box comprises a first bounding box, and the one or more computer-readable media further store computer-executable instructions that, when executed, cause the one or more processor to perform acts comprising:
   generating a projection of the first bounding box onto the first image data and onto the second image data;
   determining a second bounding box by altering one or more coordinates associated with the first bounding box; and
   storing second data identifying second coordinates of the second bounding box.

19. The system as recited in claim 15, wherein the data comprises first data, the coordinates comprise first coordinates, the bounding box comprises a first cuboid, and the one or more computer-readable media further store computer-executable instructions that, when executed, cause the one or more processor to perform acts comprising:
   receiving second data identifying second coordinates of a first mask comprising a portion of the first image data that encapsulates the one or more items in the first image data;
   receiving third data identifying third coordinates of a second mask comprising a portion of the second image data that encapsulates the one or more items in the second image data;
   generating a first projection of the first cuboid onto the second coordinates of the first mask;
   generating a second projection of the first cuboid onto the third coordinates of the second mask;
   altering coordinates associated with at least one face of the cuboid to define a second cuboid that encapsulates the second coordinates of the first mask and the third coordinates of the second mask; and
   storing fourth data identifying fourth coordinates of the second cuboid.

20. The system as recited in claim 15, wherein the data comprises first data, the coordinates comprise first coordinates, the bounding box comprises a first bounding box, and the one or more computer-readable media further store computer-executable instructions that, when executed, cause the one or more processor to perform acts comprising:
- determining second coordinates associated with a bottom surface of the first bounding box;
- determining third coordinates associated with a bottom surface of a second bounding box;
- determining that the second coordinates and the third coordinates are within a threshold value of one another; and
- storing second data indicating that the first bounding box and the second bounding box are part of a common group.

* * * * *